United States Patent
Si et al.

(10) Patent No.: US 10,715,371 B2
(45) Date of Patent: Jul. 14, 2020

(54) METHOD AND APPARATUS OF NR RMSI CORESET CONFIGURATION IN MIB

(71) Applicant: Samsung Electronics Co., Ltd., Suwon-si, Gyeonggi-do (KR)

(72) Inventors: Hongbo Si, Plano, TX (US); Young-Han Nam, Plano, TX (US); Youngbum Kim, Seoul (KR); Taehyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/122,367

(22) Filed: Sep. 5, 2018

(65) Prior Publication Data

US 2019/0132170 A1 May 2, 2019

Related U.S. Application Data

(60) Provisional application No. 62/713,071, filed on Aug. 1, 2018, provisional application No. 62/673,444, filed (Continued)

(51) Int. Cl.
*H04B 1/06* (2006.01)
*H04L 27/26* (2006.01)
(Continued)

(52) U.S. Cl.
CPC .......... *H04L 27/266* (2013.01); *H04L 5/0007* (2013.01); *H04L 27/2657* (2013.01);
(Continued)

(58) Field of Classification Search
CPC . H04L 27/266; H04L 5/0007; H04L 27/2666; H04L 27/2657; H04W 72/0453;
(Continued)

(56) References Cited

U.S. PATENT DOCUMENTS 9,160,485 B2 * 10/2015 Kim ..................... H04L 1/004
2014/0119315 A1 * 5/2014 Darwood ............ H04W 72/042
370/329

(Continued)

OTHER PUBLICATIONS

D1: R1-1717050: 3GPP TSG RAN WG1 Meeting 90bis, Prague, Czech Republic, Oct. 9-13, 2017 (Year: 2017).*

(Continued)

*Primary Examiner* — Sithu Ko

(57) ABSTRACT

A method of a BS for control information configuration comprises determining a frequency offset including an RB and RE level frequency offset, wherein the frequency offset is determined based on a lowest RE of an SS/PBCH block and a lowest RE of CORESET for RMSI, jointly configuring, using a first field of 4 bits, the RB level frequency offset with a multiplexing pattern of the SS/PBCH block and the CORESET, a BW of the CORESET, and a number of symbols for the CORESET for a combination of a SCS of the SS/PBCH block and a SCS of the CORESET, configuring using a second field of the 4 bits generating an MIB including the RB level frequency offset and the RE level frequency offset; and transmitting, to a UE, the MIB over a PBCH.

20 Claims, 39 Drawing Sheets

Related U.S. Application Data on May 18, 2018, provisional application No. 62/653,220, filed on Apr. 5, 2018, provisional application No. 62/624,931, filed on Feb. 1, 2018, provisional application No. 62/620,000, filed on Jan. 22, 2018, provisional application No. 62/597,480, filed on Dec. 12, 2017, provisional application No. 62/593,430, filed on Dec. 1, 2017, provisional application No. 62/592,926, filed on Nov. 30, 2017, provisional application No. 62/592,192, filed on Nov. 29, 2017, provisional application No. 62/590,792, filed on Nov. 27, 2017, provisional application No. 62/589,750, filed on Nov. 22, 2017, provisional application No. 62/583,162, filed on Nov. 8, 2017, provisional application No. 62/580,174, filed on Nov. 1, 2017.

(51) Int. Cl.

| | | |
|---|---|---|
| *H04W 56/00* | (2009.01) | |
| *H04W 48/12* | (2009.01) | |
| *H04W 72/04* | (2009.01) | |
| *H04L 5/00* | (2006.01) | |
| *H04W 88/08* | (2009.01) | |
| *H04W 88/02* | (2009.01) | |

(52) U.S. Cl.
CPC ......... *H04L 27/2666* (2013.01); *H04W 48/12* (2013.01); *H04W 56/001* (2013.01); *H04W 72/0453* (2013.01); *H04W 72/0406* (2013.01); *H04W 88/02* (2013.01); *H04W 88/08* (2013.01)

(58) Field of Classification Search
CPC ... H04W 48/12; H04W 56/001; H04W 88/02; H04W 72/0406; H04W 88/08
See application file for complete search history.

(56) References Cited

U.S. PATENT DOCUMENTS

| | | | | |
|---|---|---|---|---|
| 2015/0289097 | A1* | 10/2015 | Rudow | G01S 19/25 455/404.2 |
| 2018/0270799 | A1* | 9/2018 | Noh | H04L 27/261 |
| 2019/0053239 | A1* | 2/2019 | Zhou | H04W 48/12 |
| 2019/0069322 | A1* | 2/2019 | Davydov | H04W 74/006 |
| 2019/0097874 | A1* | 3/2019 | Zhou | H04B 7/0695 |
| 2019/0140880 | A1* | 5/2019 | Li | H04W 48/12 |
| 2019/0182016 | A1* | 6/2019 | Guo | H04L 5/0094 |
| 2019/0238270 | A1* | 8/2019 | Pan | H03M 13/09 |
| 2019/0288813 | A1* | 9/2019 | John Wilson | H04L 5/0048 |

OTHER PUBLICATIONS

D2: R1-1717461: 3GPP TSG RAN WG1 Meeting #90bis, Prague, Czech Republic, Oct. 9-13, 2017 (Year: 2017).*
ISA/KR, International Search Report for International Application No. PCT/KR2018/013055 dated Feb. 22, 2019, 3 pages.
CATT, "Offline summary for AI 7.12.2 Remaining details on Remaining Minimum System Information," R1-1719198, 3GPP TSG RAN WG1#90bis, Prague, Czech Republic, Oct. 9-13, 2017, 16 pages.
Nokia, et al., "Remaining details on NR-PBCH," R1-1716524, 3GPP TSG-RAN WG1 NR AH#3, Nagoya, Japan, Sep. 18-21, 2017, 13 pages.
NTT Docomo, Inc., "Discussion on remaining details on RMSI delivery," R1-1718181, 3GPP TSG RAN WG1#90bis, Prague, Czech Republic, Oct. 9-13, 2017, 8 pages.
Samsung, "Remaining details on remaining minimum system information delivery," R1-1717578, 3GPP TSG RAN WG1#90bis, Prague, Czech Republic, Oct. 9-13, 2017, 10 pages.
Vivo, "Discussion on Remaining Minimum System Information," R1-1717461, 3GPP TSG RAN WG1#90b, Prague, Czech Republic, Oct. 9-13, 2017, 16 pages.
"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.
"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.
"3rd Generation Partnership Project; Technical Specification Group Radio Access Network; Evolved Universal Terrestrial Radio Access (E-UTRA); Physical Layer Procedures (Release 13)," 3GPP TS 36.213, V13.2.0, Jun. 2016, 381 pages.
"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.
"3rd Generation Partnership Project; Technical Specification Group Radio Access Network; Evolved Universal Terrestrial Radio Access (E-UTRA); Radio Resource Control (RRC) Protocol Specification (Release 13)," 3GPP TS 36.331, V13.2.0, Jun. 2016, 623 pages.

* cited by examiner

METHOD AND APPARATUS OF NR RMSI CORESET CONFIGURATION IN MIB

CROSS-REFERENCE TO RELATED APPLICATION(S) AND CLAIM OF PRIORITY

The present application claims priority to:
U.S. Provisional Patent Application Ser. No. 62/580,174, filed on Nov. 1, 2017;
U.S. Provisional Patent Application Ser. No. 62/583,162, filed on Nov. 8, 2017;
U.S. Provisional Patent Application Ser. No. 62/589,750, filed on Nov. 22, 2017;
U.S. Provisional Patent Application Ser. No. 62/590,792, filed on Nov. 27, 2017;
U.S. Provisional Patent Application Ser. No. 62/592,192, filed on Nov. 29, 2017;
U.S. Provisional Patent Application Ser. No. 62/592,926, filed on Nov. 30, 2017;
U.S. Provisional Patent Application Ser. No. 62/593,430, filed on Dec. 1, 2017;
U.S. Provisional Patent Application Ser. No. 62/597,480, filed on Dec. 12, 2017;
U.S. Provisional Patent Application Ser. No. 62/620,000, filed on Jan. 22, 2018;
U.S. Provisional Patent Application Ser. No. 62/624,931, filed on Feb. 1, 2018;
U.S. Provisional Patent Application Ser. No. 62/653,220, filed on Apr. 5, 2018;
U.S. Provisional Patent Application Ser. No. 62/673,444, filed on May 18, 2018; and
U.S. Provisional Patent Application Ser. No. 62/713,071, filed on Aug. 1, 2018.
The content of the above-identified patent documents is incorporated herein by reference.

TECHNICAL FIELD

The present disclosure relates generally to wireless communication systems and, more specifically, to RMSI CORESET configuration in an advanced wireless communication system.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an NR-SS burst set design in an advanced wireless communication system.

In one embodiment, a user equipment (UE) for control information configuration in a wireless communication system is provided. The UE comprises a transceiver configured to receive, from a base station (BS), a master information block (MIB) over a physical broadcasting channel (PBCH). The UE further comprises a processor operably connected to the transceiver, the processor configured to determine a frequency offset from the received MIB. The frequency offset is determined based on a lowest RE of a synchronization signal/physical broadcast channel (SS/PBCH) block and a lowest RE of control resource set (CORESET) for remaining minimum system information (RMSI). The frequency offset includes a resource block (RB) level frequency offset and a resource element (RE) level frequency offset. The RB level frequency offset is jointly configured, using a first field of 4 bits, with a multiplexing pattern of the SS/PBCH block and the CORESET, a bandwidth (BW) of the CORESET, and a number of symbols for the CORESET for a combination of a subcarrier spacing (SCS) of the SS/PBCH block and a SCS of the CORESET. The RE level frequency offset is configured using a second field of the 4 bits.

In another embodiment, a base station (BS) for control information configuration in a wireless communication system is provided. The BS comprises a processor configured to determine a frequency offset including a resource block (RB) level frequency offset and a resource element (RE) level frequency offset, wherein the frequency offset is determined based on a lowest RE of a synchronization signal/physical broadcast channel (SS/PBCH) block and a lowest RE of a control resource set (CORESET) for remaining minimum system information (RMSI), jointly configure, using a first field of 4 bits, the RB level frequency offset with a multiplexing pattern of the SS/PBCH block and the CORESET, a bandwidth (BW) of the CORESET, and a number of symbols for the CORESET, for a combination of a subcarrier spacing (SCS) of the SS/PBCH block and a SCS of the CORESET, configure using a second field of the 4 bits, and generate a master information block (MIB) including the configured RB level frequency offset and the configured RE level frequency offset. The BS further comprises a transceiver operably connected to the processor, the transceiver configured to transmit, to a user equipment (UE), the MIB over a PBCH.

In yet another embodiment, a method of a base station (BS) for control information configuration in a wireless communication system is provided. The method comprises determining a frequency offset including a resource block (RB) level frequency offset and a resource element (RE) level frequency offset, wherein the frequency offset is determined based on a lowest RE of a synchronization signal/physical broadcast channel (SS/PBCH) block and a lowest RE of control resource set (CORESET) for remaining minimum system information (RMSI), jointly configuring, using a first field of 4 bits, the RB level frequency offset with a multiplexing pattern of the SS/PBCH block and the CORESET, a bandwidth (BW) of the CORESET, and a number of symbols for the CORESET for a combination of a subcarrier spacing (SCS) of the SS/PBCH block and a SCS of the CORESET, configuring a second filed of the 4 bits, generating a master information block (MIB) including the RB level frequency offset and the RE level frequency offset, and transmitting, to a user equipment (UE), the MIB over a PBCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 27F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0 "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
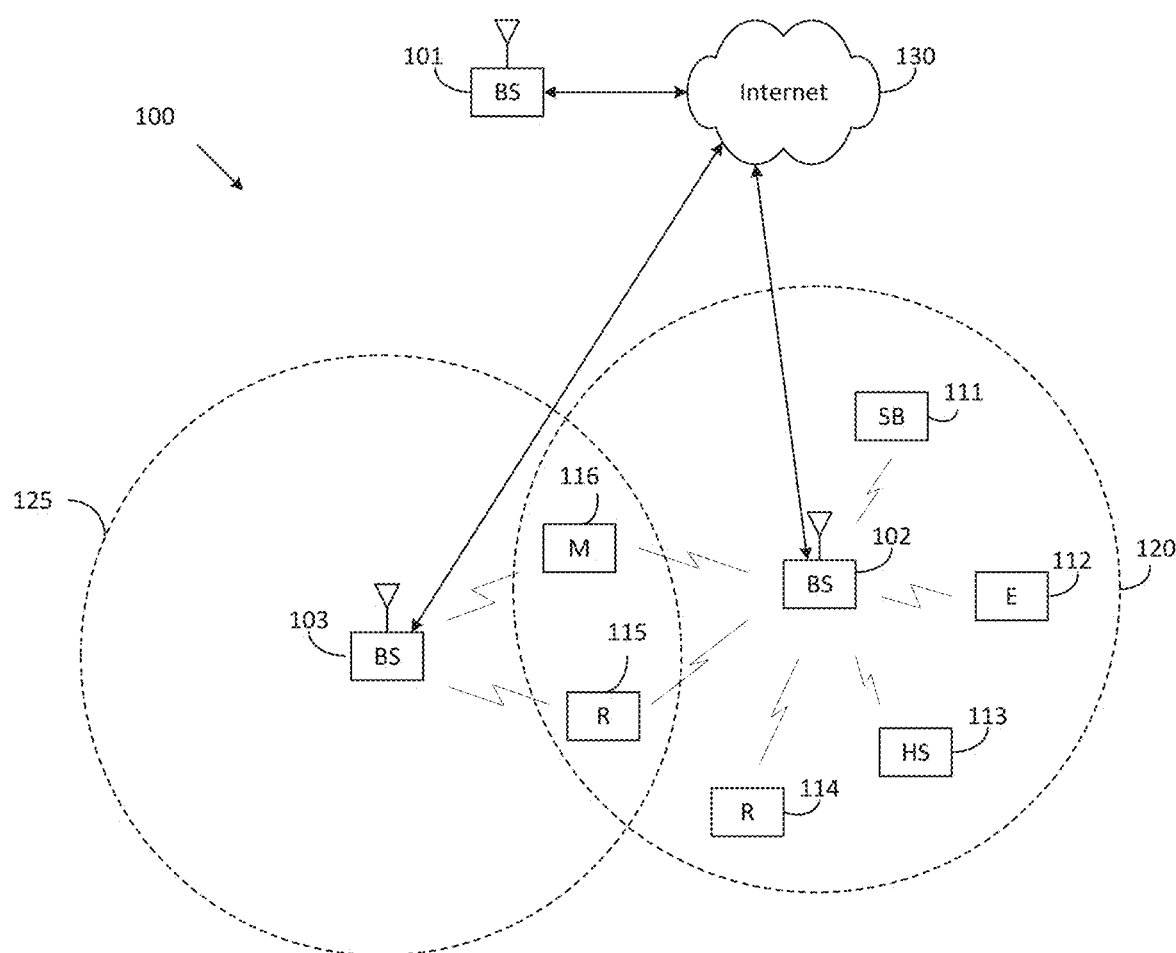
FIG. 1 illustrates an example wireless network according to embodiments of the present disclosure.
Figure 2:
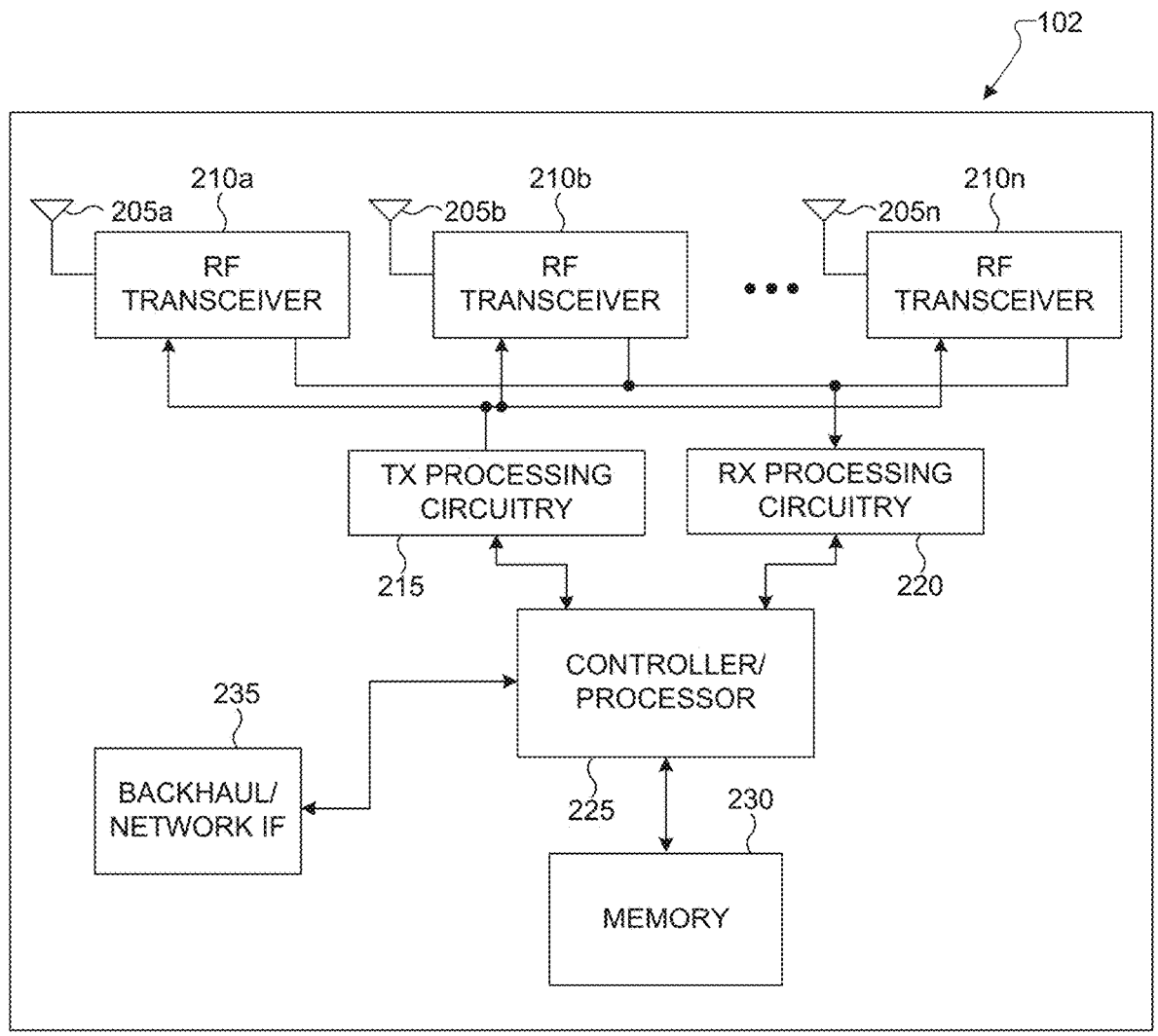
FIG. 2 illustrates an example eNB according to embodiments of the present disclosure.
Figure 3:
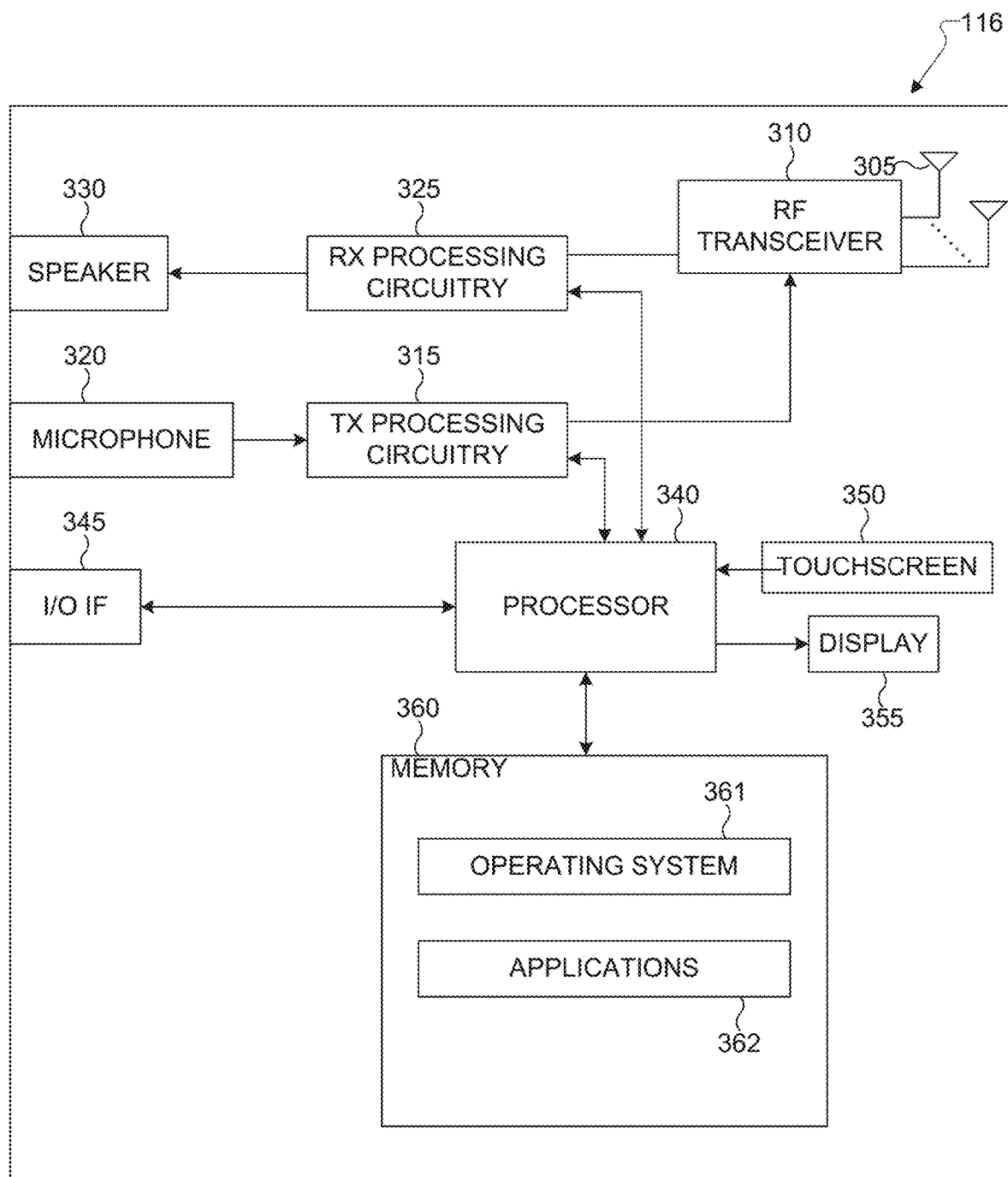
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient NR RMSI CORESET configuration in an advanced wireless communication system. In certain embodiments, and one or more of the eNBs 101-103 includes circuitry, programming, or a combination thereof, for NR RMSI CORESET configuration in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
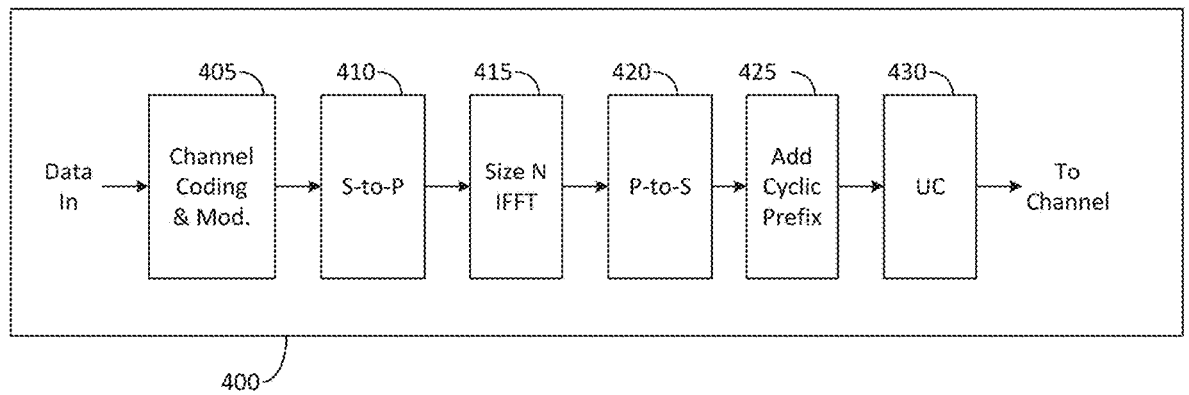
FIG. 4A illustrates a high-level diagram of an orthogonal frequency division multiple access transmit path according to embodiments of the present disclosure.
Figure 4B:
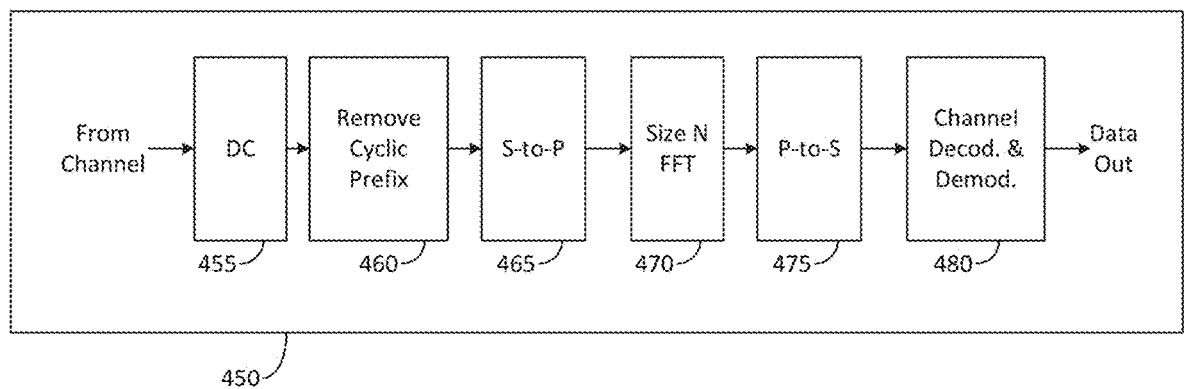
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL} - N_{SRS})$, where $N_{SRS}=1$ if a last subframe symbol is used to transmit SRS and $N_{SRS}=0$ otherwise.

Figure 5:
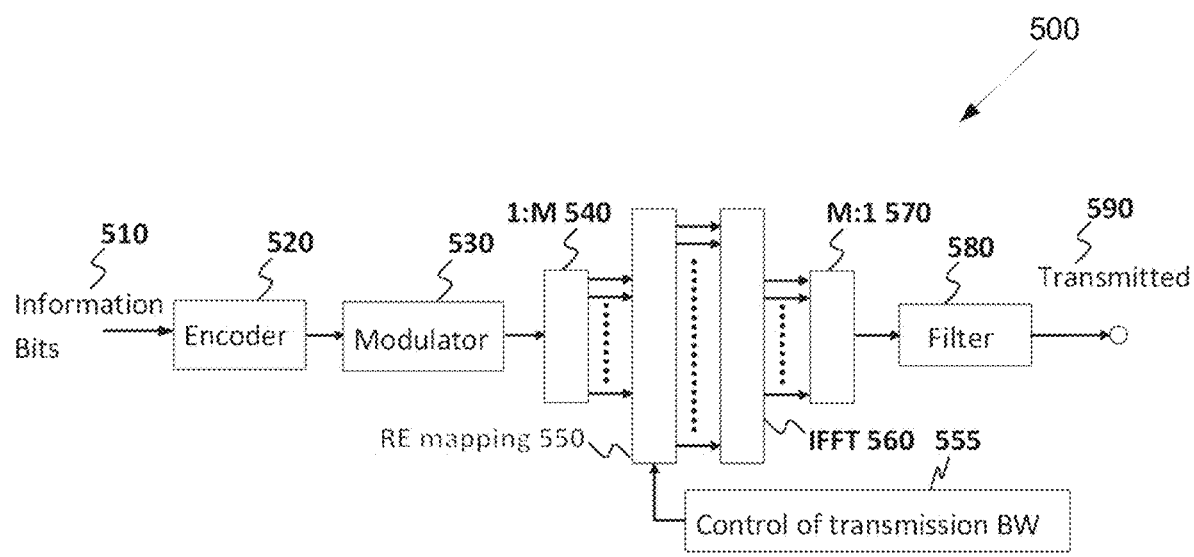
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
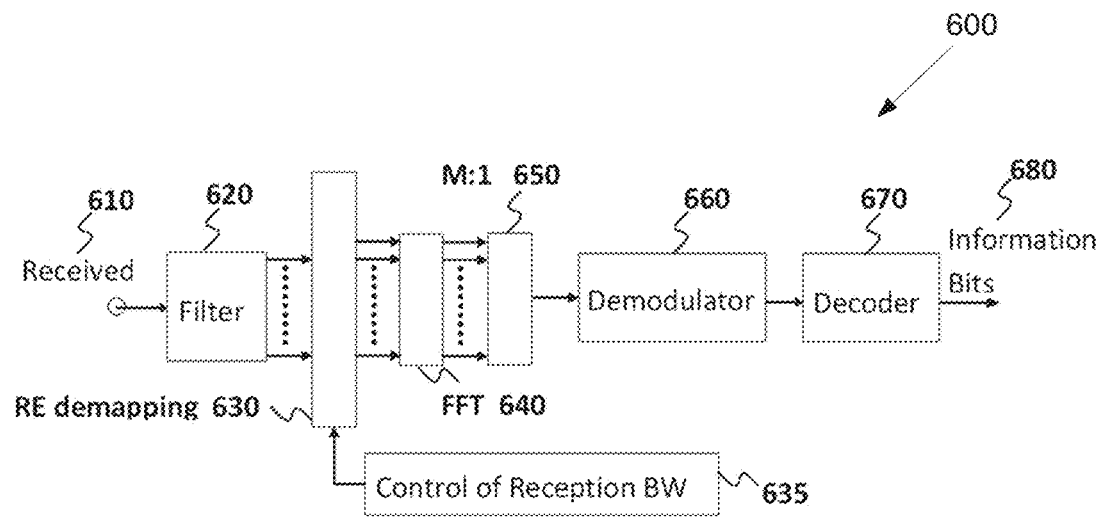
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
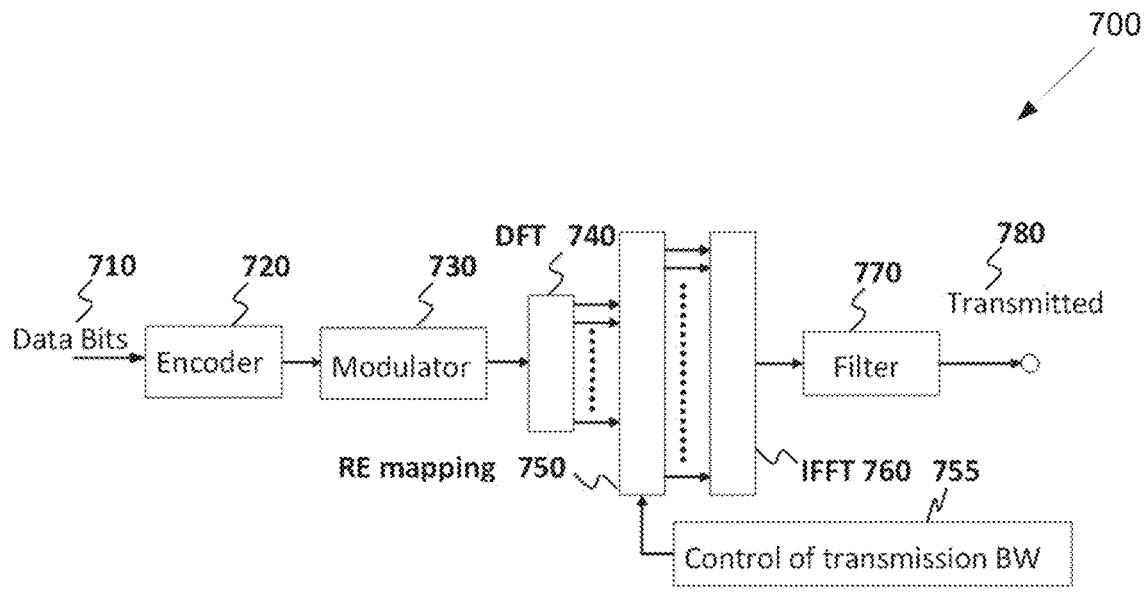
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
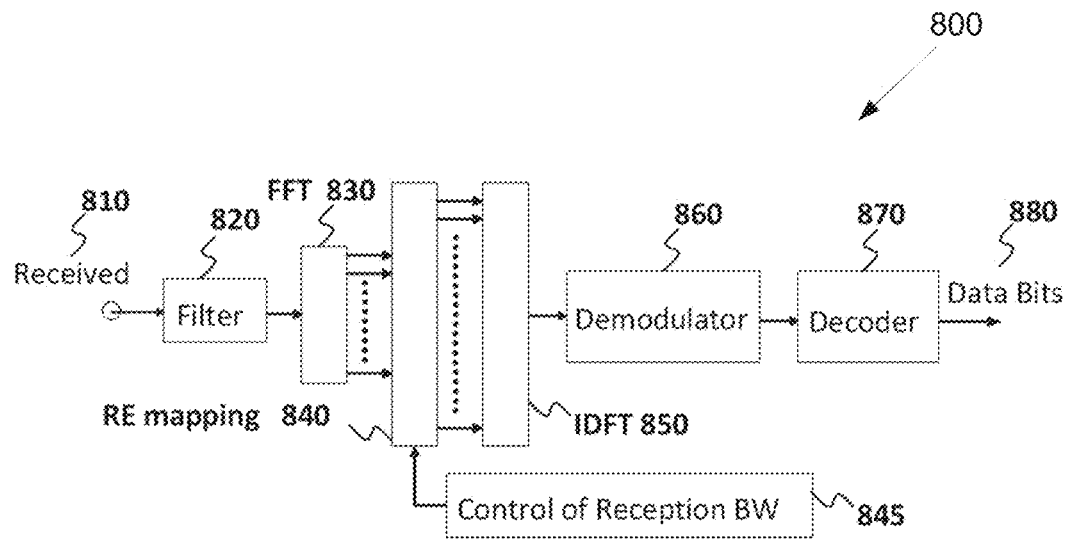
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one scheme has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
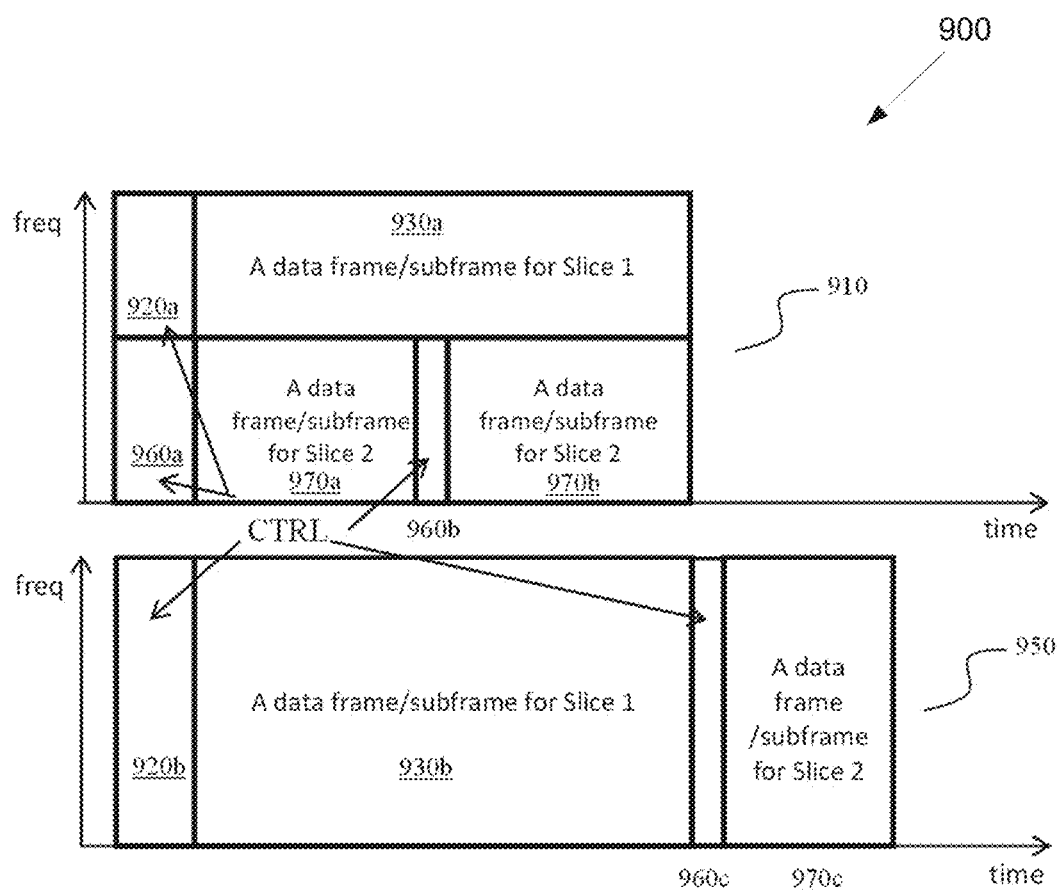
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
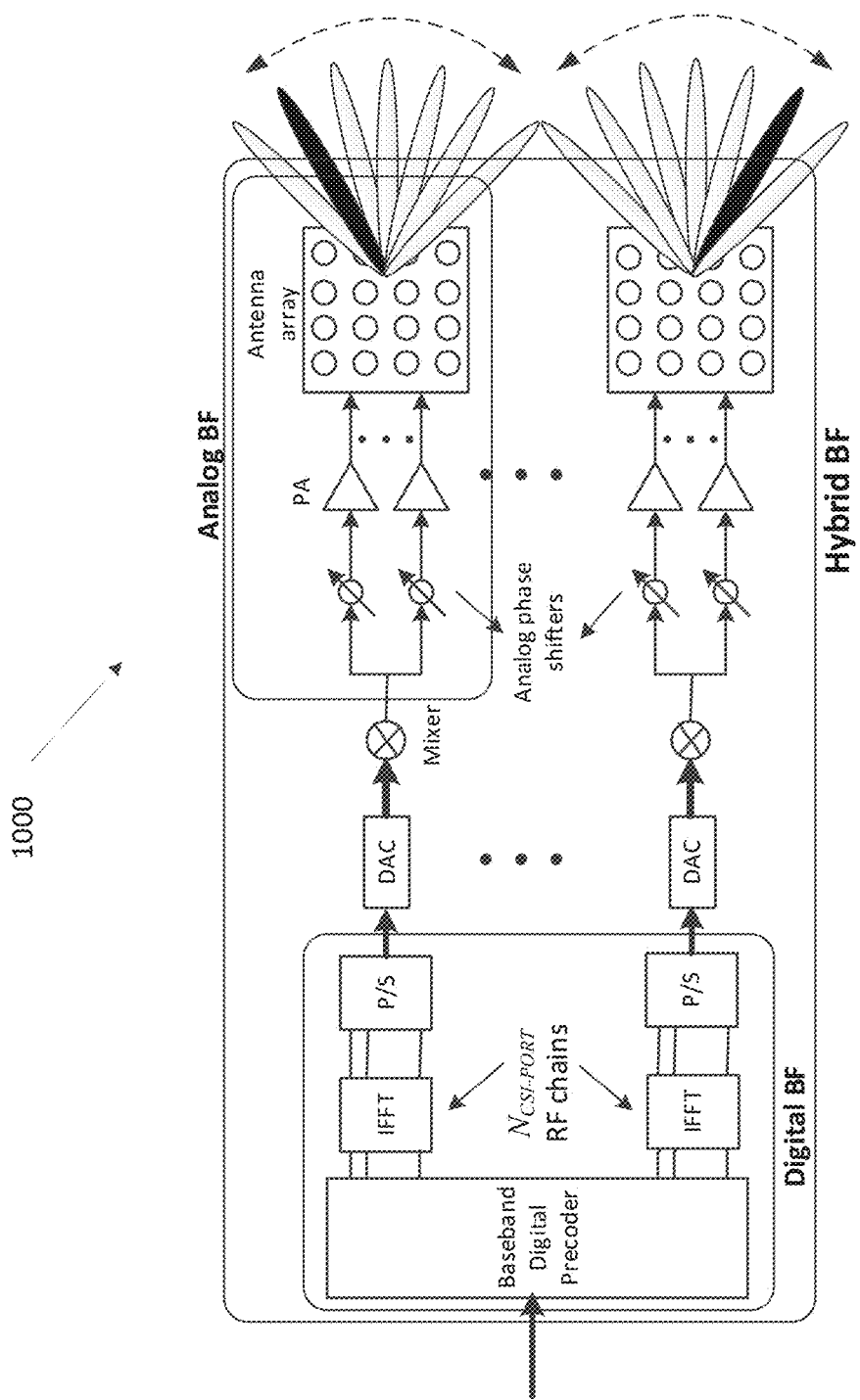
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
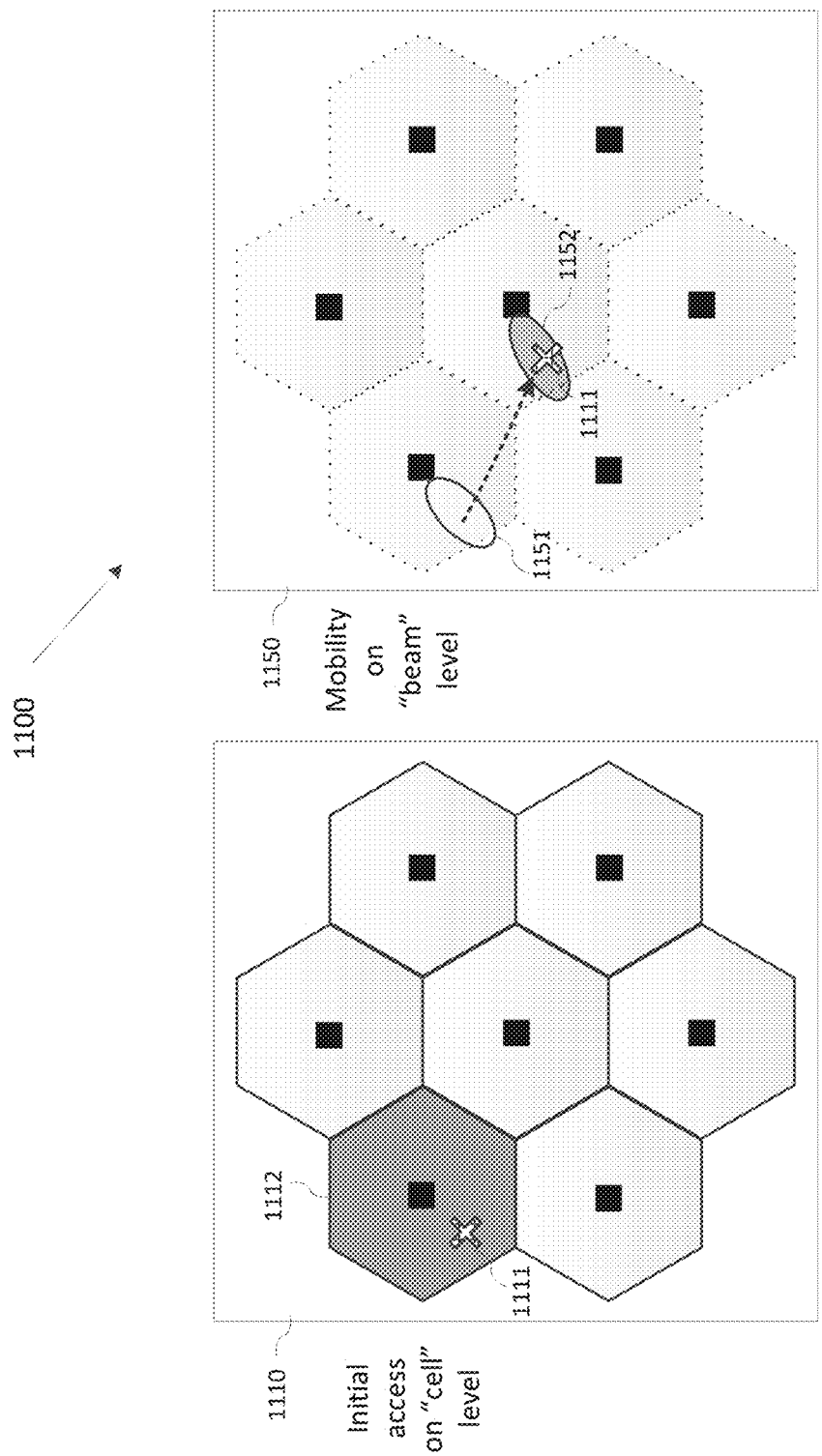
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
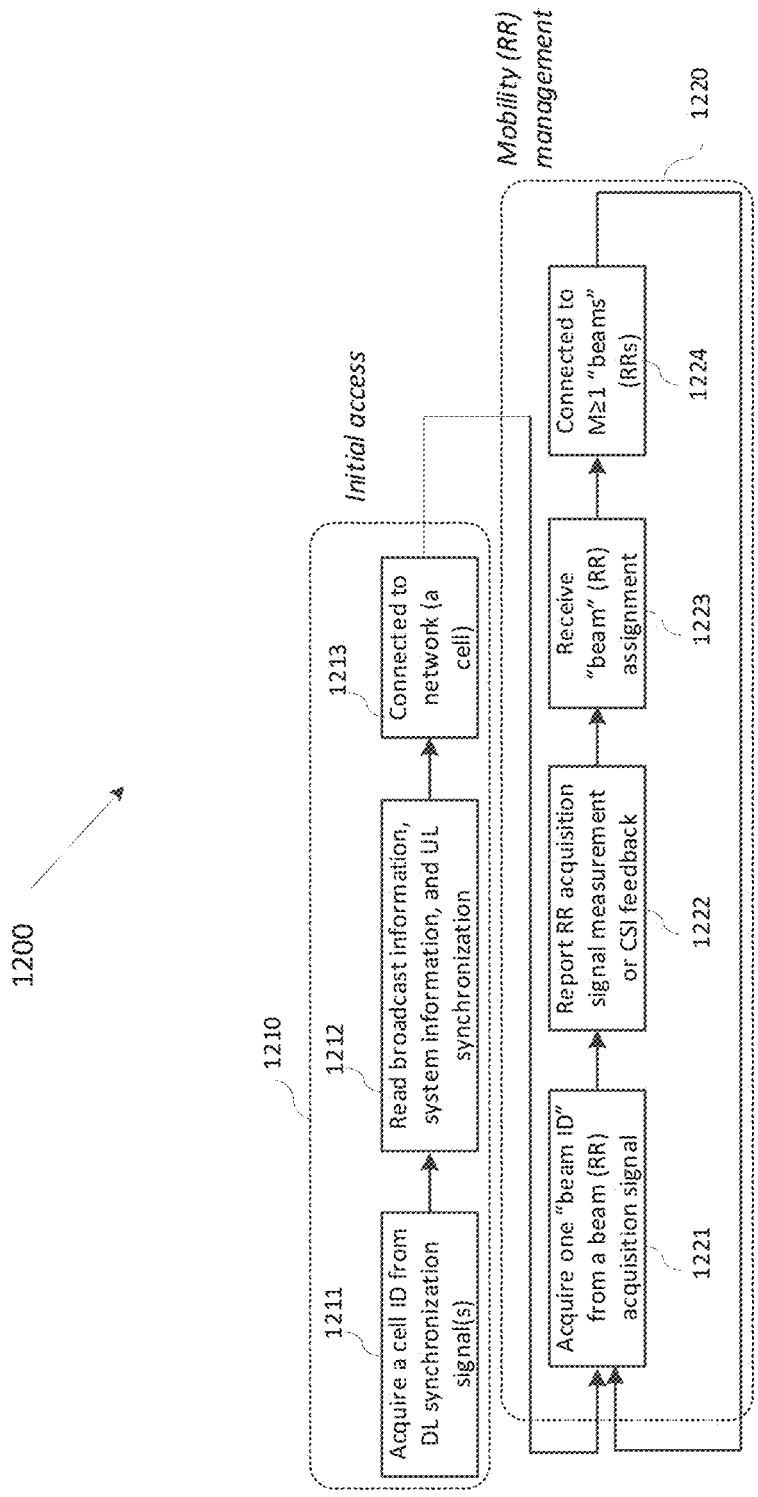
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

For certain scenarios such as asynchronous networks, the UE can fall back to cell ID based or cell-level mobility management similar to 3GPP LTE system. Therefore, only one of the two levels of radio resource entity (cell) is applicable. When a two-level ("cell" and "beam") radio resource entity or management is utilized, synchronization signal(s) can be designed primarily for initial access into the network. For mmWave systems where analog beam sweeping (as shown in FIG. 12) or repetition may be used for enhancing the coverage of common signals (such as synchronization signal(s) and broadcast channel), synchronization signals can be repeated across time (such as across OFDM symbols or slots or subframes). This repetition factor, however, is not necessarily correlated to the number of supported "beams" (defined as radio resource units, to be differentiated with the analog beams used in beam sweeping) per cell or per TRP. Therefore, beam identification (ID) is not acquired or detected from synchronization signal(s). Instead, beam ID is carried by a beam (RR) acquisition signal such as measurement RS. Likewise, beam (RR) acquisition signal does not carry cell ID (hence, cell ID is not detected from beam or RR acquisition signal).

Therefore, considering the above new challenges in initial access procedure and RRM for the new radio access technology (NR), there is a need for designing synchronization signals (along with their associated UE procedures) and primary broadcast channel which carries broadcast information (e.g., master information block or MIB).

For LTE NR, synchronization signals and PBCH block (NR-SS/PBCH block) is designed for enhanced Mobile Broadband (eMBB) purpose and for licensed bands only. Each NR-SS/PBCH block compromises of one symbol for NR-PSS, one symbol for NR-SSS multiplexed with part of NR-PBCH in frequency-domain, and two symbols for the remaining of NR-PBCH, wherein the four symbols are mapped consecutively and time division multiplexed.

NR-SS/PBCH is a unified design, including the NR-PSS and NR-SSS sequence design, for all the supported carrier frequency ranges in NR. The transmission bandwidth of NR-PSS and NR-SSS (e.g. 12 PRBs) is smaller than the transmission bandwidth of NR-PBCH (e.g. 20 PRBs), and the total transmission bandwidth of NR-SS/PBCH block is same as the one of NR-PBCH (e.g. 20 PRBs). In initial cell selection for NR, a UE assumes the default NR-SS/PBCH burst set periodicity as 20 ms, and for detecting non-standalone NR cells, network provides one NR-SS/PBCH burst set periodicity information per frequency carrier to the UE and information to derive measurement timing/duration if possible.

For NR unlicensed spectrum (including shared spectrum), due to the uncertainty of channel access, the transmission of NR-SS/PBCH block can be cancelled or delayed based on the clear channel assessment (CCA) results in listen-before-talk (LBT). For V2X sidelink synchronization or URLLC system, the synchronization delay requirement is much more restricted than LTE NR, which requires more accurate synchronization performance in one-shot detection to avoid larger number of combining of NR-SS/PBCH blocks and reduce the synchronization latency. For MTC or IoT systems, the operating SNR region is much lower than LTE NR, which also required better one-shot detection performance to avoid significant weak coverage issue.

For at least one of the above-mentioned systems, if the synchronization signals for those systems remains the same as in LTE NR, the performance (e.g. detection accuracy and synchronization latency) may degrade. Hence, there is a need for NR-SS/PBCH block enhancement and/or modification for at least one of the above-mentioned systems (different system may use the same or different enhancement schemes discussed in this disclosure). For example, the enhancement and/or modification can aim at increasing the channel access opportunity, e.g. for unlicensed spectrum. For another example, the enhancement and/or modification can aim at improving the one-shot detection accuracy of cell search and/or broadcasting, e.g. for unlicensed/V2X/URLLC/MTC/IoT system.

The principal design consideration is whether to adopt a unified enhanced NR-SS/PBCH block design (e.g. composition and/or mapping and/or multiplexing in an enhanced NR-SS/PBCH block) for different the application scenarios, where the scenarios include different carrier frequency ranges, standalone or non-standalone, and etc.

In one embodiment, the design of composition/mapping/multiplexing in an enhanced NR-SS/PBCH block can be unified for all carrier frequency ranges (e.g. 5 GHz, 6 GHz, and 60 GHz unlicensed spectrums use the same design) and both standalone and non-standalone scenarios. The unified design is beneficial for minimizing the detector complexity. Note that the unified design of enhanced NR-SS/PBCH block does not exclude possible different design of transmission periodicity and/or LBT of the enhanced NR-SS/PBCH block. For example, although utilizing the same composition/mapping/multiplexing in an enhanced NR-SS/PBCH block, different transmission periodicity and/or LBT procedure (if applicable) can be utilized for different carrier frequency ranges and/or standalone and non-standalone scenarios.

In another embodiment, the design of composition/mapping/multiplexing in an enhanced NR-SS/PBCH block is unified for all carrier frequency ranges (e.g. 5 GHz, 6 GHz, and 60 GHz unlicensed spectrums use the same design), but different for standalone and non-standalone scenarios. For example, a unified design of composition/mapping/multiplexing in an enhanced NR-SS/PBCH block is utilized for a standalone scenario and all carrier frequency ranges, and another unified design of composition/mapping/multiplexing in an enhanced NR-SS/PBCH block is utilized for non-standalone scenario and all carrier frequency ranges. Note that the unified design of enhanced NR-SS/PBCH block does not exclude possible different design of transmission periodicity and/or LBT procedure (if applicable) for the enhanced NR-SS/PBCH block.

In yet another embodiment, the composition/mapping/multiplexing in an enhanced NR-SS/PBCH block is unified for standalone and non-standalone scenarios, but different for different carrier frequency ranges (e.g. 5 GHz, 6 GHz, and 60 GHz unlicensed spectrums use different designs). Note that the unified design of enhanced NR-SS/PBCH block does not exclude possible different design of transmission periodicity and/or LBT procedure (if applicable) for the enhanced NR-SS/PBCH block. For example, although utilizing the same composition/mapping/multiplexing in an enhanced NR-SS/PBCH block, different transmission periodicity and/or LBT procedure (if applicable) can be utilized for standalone and non-standalone scenarios.

In yet another embodiment, the composition/mapping/multiplexing in an enhanced NR-SS/PBCH block is specific for each carrier frequency range (e.g. 5 GHz, 6 GHz, and 60 GHz unlicensed spectrums use different designs) and standalone/non-standalone scenario.

Another important design consideration is the default periodicity of the enhanced NR-SS/PBCH block (or equivalently as the default periodicity of the enhanced NR-SS/PBCH burst set) from the detector perspective. Note that for the enhanced NR-SS/PBCH blocks transmitted within a DRS measurement timing configuration (DMTC), the default periodicity of the enhanced NR-SS/PBCH block (or equivalently as the default periodicity of the enhanced NR-SS/PBCH burst set) can be considered as the default periodicity of DMTC, although the actual transmission of the enhanced NR-SS/PBCH blocks may not be strictly periodic.

In one embodiment, to enhance the channel access opportunities (e.g. for NR unlicensed spectrum), the default periodicity of the enhanced NR-SS/PBCH block (or equivalently as the default periodicity of the enhanced NR-SS/PBCH burst set or the default periodicity of DMTC) can be reduced as compared to NR licensed spectrum. For example, the default periodicity can be reduced to 10 ms or 5 ms.

In another embodiment, the default periodicity of the enhanced NR-SS/PBCH block (or equivalently as the default periodicity of the enhanced NR-SS/PBCH burst set or the default periodicity of DMTC) can remain the same as LTE NR (e.g. 20 ms). For example, the duration of LBT procedure for the enhanced NR-SS/PBCH block can be minimized to enhance the channel access opportunity for NR unlicensed spectrum.

The next design consideration is repetitive and/or additional and/or enhanced transmission of NR-PSS/SSS/PBCH (termed as NR-ePSS/eSSS/ePBCH) within an enhanced NR-SS/PBCH block, in order to enhance the one-shot synchronization/broadcasting performance (note that the signal/channel design of the NR-ePSS/eSSS/ePBCH can be the same as NR-PSS/SSS/PBCH or can be the same as NR-PSS/SSS/PBCH for certain scenarios).

In one embodiment, the enhanced NR-SS/PBCH block only consists of NR-ePSS/eSSS/ePBCH.

In one example, NR-ePSS/eSSS/ePBCH are time division multiplexed (wherein NR-eSSS and part of the NR-ePBCH can be frequency division multiplexed in the same symbol). For example, NR-PSS/SSS/PBCH are replaced by NR-ePSS/eSSS/ePBCH but multiplexed and mapped the same way as LTE NR-SS/PBCH block.

In another example, NR-ePSS/eSSS/ePBCH are multiplexed and/or mapped differently from LTE NR-SS/PBCH block. For example, NR-ePSS/eSSS/ePBCH are frequency division multiplexed, or a mixture of time division and frequency division multiplexed.

In another embodiment, the enhanced NR-SS/PBCH block consists of both at least one of NR-PSS/SSS/PBCH and at least one of their enhancement NR-ePSS/eSSS/ePBCH.

In another embodiment, NR-ePSS/eSSS/ePBCH are time division multiplexed with NR-PSS/SSS/PBCH (note that there can be symbols in the enhanced NR-SS/PBCH block containing FDMed NR-SSS/NR-PBCH and/or FDMed NR-eSSS/NR-ePBCH).

In one example, when both NR-ePSS and NR-PSS are supported in an enhanced NR-SS/PBCH block, the symbols mapped for NR-ePSS and NR-PSS correspondingly are TDMed and consecutive, e.g. in order to easy the implementation of NR-PSS/NR-ePSS joint detection in time domain.

In another example, when more than one NR-ePSS are supported in an enhanced NR-SS/PBCH block, the symbols mapped for NR-ePSS are TDMed and consecutive, e.g. in order to easy the implementation of NR-ePSS joint detection in time domain.

In yet another example, when both NR-eSSS and NR-SSS are supported in an enhanced NR-SS/PBCH block, the symbols mapped for NR-eSSS and NR-SSS correspondingly are TDMed and non-consecutive, e.g. symbol(s) between NR-eSSS and NR-SSS can be mapped to NR-PBCH/NR-ePBCH.

In yet another example, when more than one NR-eSSS are supported in an enhanced NR-SS/PBCH block, the symbols mapped for NR-eSSS are TDMed and non-consecutive, e.g. symbol(s) among NR-eSSS can be mapped to NR-PBCH/NR-ePBCH.

In one embodiment, NR-ePSS/eSSS/ePBCH are frequency division multiplexed with LTE NR-PSS/SSS/PBCH.

In another embodiment, NR-ePSS/eSSS/ePBCH are multiplexed with LTE NR-PSS/SSS/PBCH in a mixture way of time division multiplexing and frequency division multiplexing.

In yet another embodiment, the enhanced NR-SS/PBCH block only consists of LTE NR-PSS/SSS/PBCH. For example, enhanced NR-SS/PBCH block on the unlicensed spectrum only consists of NR-PSS and NR-SSS for certain application scenarios (e.g. non-standalone scenario).

In yet another embodiment, the NR-PSS/SSS/PBCH within the enhanced NR-SS/PBCH block are time division multiplexed.

Note that combined with the previous design considerations, the above embodiments can apply to different application scenarios. For example, enhanced NR-SS/PBCH block consisting of LTE NR-PSS/SSS/PBCH only is utilized for non-standalone scenario, and NR-SS/PBCH block consisting of both LTE NR-PSS/SSS/PBCH and their enhancement NR-ePSS/eSSS/ePBCH is utilized for standalone scenario.

Another design consideration for the enhanced NR-SS/PBCH block is the mapping scheme impacted by possible LBT and/or possible additional transmission of enhanced NR-PSS/SSS/PBCH and/or transmission of control channels and/or reserved as empty (e.g. due to AGC issue or reserved for CORESET). For LTE NR-SS/PBCH block, NR-PSS/SSS/PBCH are mapped to 4 consecutive symbols. For enhanced NR-SS/PBCH block, due to possible introduction of enhanced NR-PSS/SSS/PBCH, one enhanced NR-SS/PBCH block may occupy more symbols compared to LTE NR-SS/PBCH block. In addition, due to the potential LBT between neighboring transmission of the enhanced NR-SS/PBCH blocks (e.g. if considering the utilization scenario of unlicensed spectrum), and reserving possible locations for CORESET or control signals, the mapping of enhanced NR-SS/PBCH block to slot may be different from LTE NR-SS/PBCH block (e.g. mapped to non-consecutive symbols or mapped in different order comparing to LTE NR-SS/PBCH block).

In one embodiment, it is beneficial to design the enhanced NR-SS/PBCH block composited from consecutive symbols. For example, if considering the utilization scenario of unlicensed spectrum, there is no requirement for LBT within the enhanced NR-SS/PBCH block.

In another embodiment, if taking into account the reservation for CORESET or control channels and coexistence issue of multiple numerologies, it may also be likely that the enhanced NR-SS/PBCH block consists of non-consecutive symbols. In one example, if considering the utilization scenario of unlicensed spectrum, the gap between symbol groups within an enhanced NR-SS/PBCH block is shorter than the maximum gap without performing LBT (e.g. 16 us for 5 GHz, or 8 us for 60 GHz), such that no LBT is needed in the gap within the enhanced NR-SS/PBCH block. In another example, if considering the utilization scenario of unlicensed spectrum, the gap between symbol groups within an enhanced NR-SS/PBCH block is longer than the maximum gap without performing LBT (e.g. 16 us for 5 GHz, or 8 us for 60 GHz), then LBT is required in the gap within the enhanced NR-SS/PBCH block to perform a transmission.

In yet another embodiment, due to possible gaps within the enhanced NR-SS/PBCH blocks, the design across different enhanced NR-SS/PBCH blocks may not be same. For example, although the components of the enhanced NR-SS/PBCH blocks (e.g. signals/channels within an enhanced NR-SS/PBCH block) are the same, the gap location within the enhanced NR-SS/PBCH block can be different for different the enhanced NR-SS/PBCH blocks.

In general, an enhanced NR-SS/PBCH block can composite of 0-1 symbol mapped for NR-PSS, 0-1 symbol mapped for NR-SSS (wherein within each symbol the enhanced NR-SS/PBCH block may be FDMed with NR-PBCH or NR-ePBCH), 0-2 symbols mapped for NR-ePSS, 0-2 symbols mapped for NR-eSSS (wherein within each symbol the enhanced NR-SS/PBCH block may be FDMed with NR-PBCH or NR-ePBCH), 0-2 symbols fully mapped for NR-PBCH (including enhanced NR-SS/PBCH block's DMRS) or 0-8 symbols fully mapped for NR-ePBCH (including enhanced NR-SS/PBCH block's DMRS), as well as 0-G symbols for gap (G is an integer).

The particular number of symbols for each signal/channel/gap can be determined from application scenarios (e.g. utilization scenarios including at least one of unlicensed spectrum/V2X sidelink/URLLC/MTC/IoT, and/or carrier frequency range, and/or standalone/non-standalone). Examples of enhanced NR-SS/PBCH block composition/mapping/multiplexing are illustrated as in FIG. 13 to FIG. 19, corresponding to the enhanced NR-SS/PBCH block with 2 to 8 symbols (symbols for gap not counted) respectively, and more examples of enhanced NR-SS/PBCH block composition/mapping/multiplexing are illustrated as in FIG. 20, corresponding to the enhanced NR-SS/PBCH block with 14 symbols (i.e., a slot, including potential empty symbols reserved), wherein the above design considerations have been taken into account.

In one embodiment, all signals and/or channels in the enhanced NR-SS/PBCH block are transmitted using the same antenna port. Note that FIG. 13 to FIG. 20 may not be an exclusive illustration of all supported designs covered by this disclosure.

Note that if a wider BW can be supported for enhanced NR-SS/PBCH block, the BW of each signal/channel in the figures is enlarged accordingly. For example, if the BW of enhanced NR-SS/PBCH block is 40 PRBs, the BW of 20 PRBs in the figures can be replaced by 40 PRBs and/or 12 PRBs can be replaced by 24 PRBs, without change of the time-domain multiplexing pattern.

Note that if a smaller BW is supported for enhanced NR-SS/PBCH block, the BW of each signal/channel in the figures is truncated to the central PRBs corresponding to the supported BW of the enhanced NR-SS/PBCH block. For example, if the BW of enhanced NR-SS/PBCH block is 12 PRBs, all the signals/channels in the figures are truncated to the central 12 PRBs such that there is no FDMed NR-PBCH or NR-ePBCH with NR-SSS or NR-eSSS in the figures.

Note that the symbols or part of symbols mapped for NR-PBCH/NR-ePBCH in the figures can contain the DMRS of NR-PBCH/NR-ePBCH as well, wherein the REs for DMRS can be FDMed with REs for NR-PBCH/NR-ePBCH in one embodiment, or can be TDMed with REs for NR-PBCH/NR-ePBCH in another embodiment.

The control resource set (CORESET) for receiving common control channels, such as remaining minimum system information (RMSI), Other system information (OSI), etc., is required to be configured. One CORESET configuration can be provided via physical broadcast channel (PBCH), e.g. master information block (MIB), for at least RMSI scheduling.

A CORESET may be characterized by slot timing, OFDM symbol numbers in each slot, and frequency resources. These CORESET properties are indicated or pre-configured for each CORESET. For RMSI/OSI scheduling, the CORESET properties can be provided in the PBCH. Among these CORESET properties configured by PBCH, the OFDM symbol numbers and frequency resources can be commonly applicable to all the common channels (e.g., system information block (SIBx), etc.), but the slot timing can be specifically determined for different SIBx.

The present disclosure considers the configuration of frequency/time resources for RMSI and a CORESET containing physical downlink control channel (PDCCH) scheduling RMSI, which can be potentially configured with the slot timing and/or orthogonal frequency division multiplexing (OFDM) symbol numbers together, and the configuration can be possibly reused for SIB as well.

Note that the notation x:y:(x+(n−1)*y) in the present disclosure refers to a length-n vector (x, x+y, x+2y, . . . , x+(n−2)y, x+(n−1)y).

At least the following components in the present disclosure, related to the frequency/time resources for RMSI and CORESET containing PDCCH scheduling RMSI (short for "RMSI resources" in the remaining of this disclosure), are considered to be directly or indirectly configured by bits in MIB of NR-PBCH.

Configuration Components.

A first component for configuring RMSI resources can be the numerology of RMSI resources.

In one embodiment, the numerology of RMSI resources can be configured by 1 separate bit in MIB.

In another embodiment, the numerology of RMSI resources can be configured with other configurations to save the payload size. For example, if the configuration of all RMSI CORESET configurations is captured in an example of table as shown in the present disclosure, by limiting the combination of numerologies of SS/PBCH block and RMSI resources, the effective payload size of the RMSI numerology may be smaller than 1 bit.

A second component for configuring RMSI resources can be the multiplexing pattern of RMSI resources.

Figure 13A:
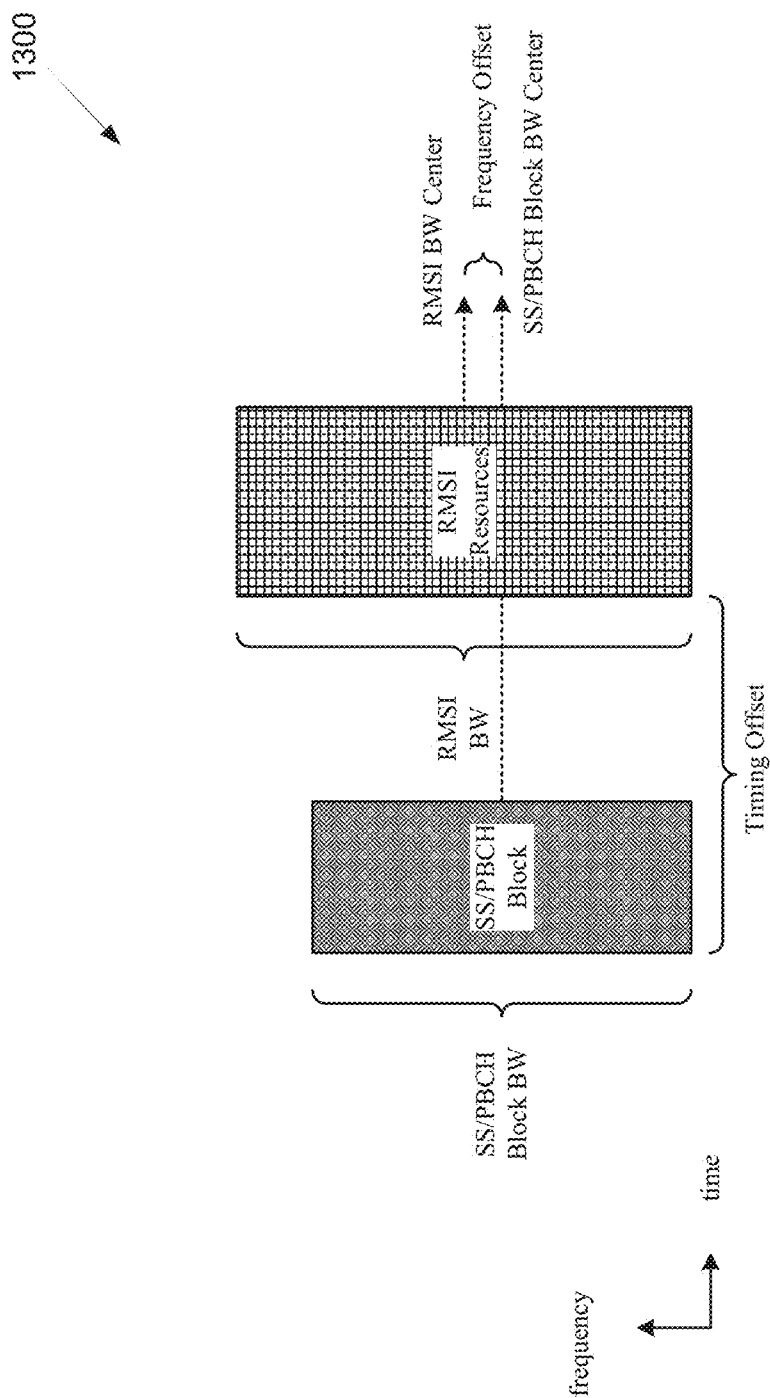
FIG. 13A illustrates an example TDM multiplexing pattern according to embodiments of the present disclosure.

FIG. 13A illustrates an example TDM multiplexing pattern 1300 according to embodiments of the present disclosure. The embodiment of the TDM multiplexing pattern 1300 illustrated in FIG. 13A is for illustration only. FIG. 13A does not limit the scope of this disclosure to any particular implementation.

In one embodiment of the multiplexing pattern, the SS/PBCH block and RMSI resources are TDMed, wherein the center of SS/PBCH block BW and the center of RMSI resources BW may or may not be aligned, and the SS/PBCH block BW may or may not be the same as the RMSI resources BW. An example is shown in FIG. 13A.

Figure 13B:
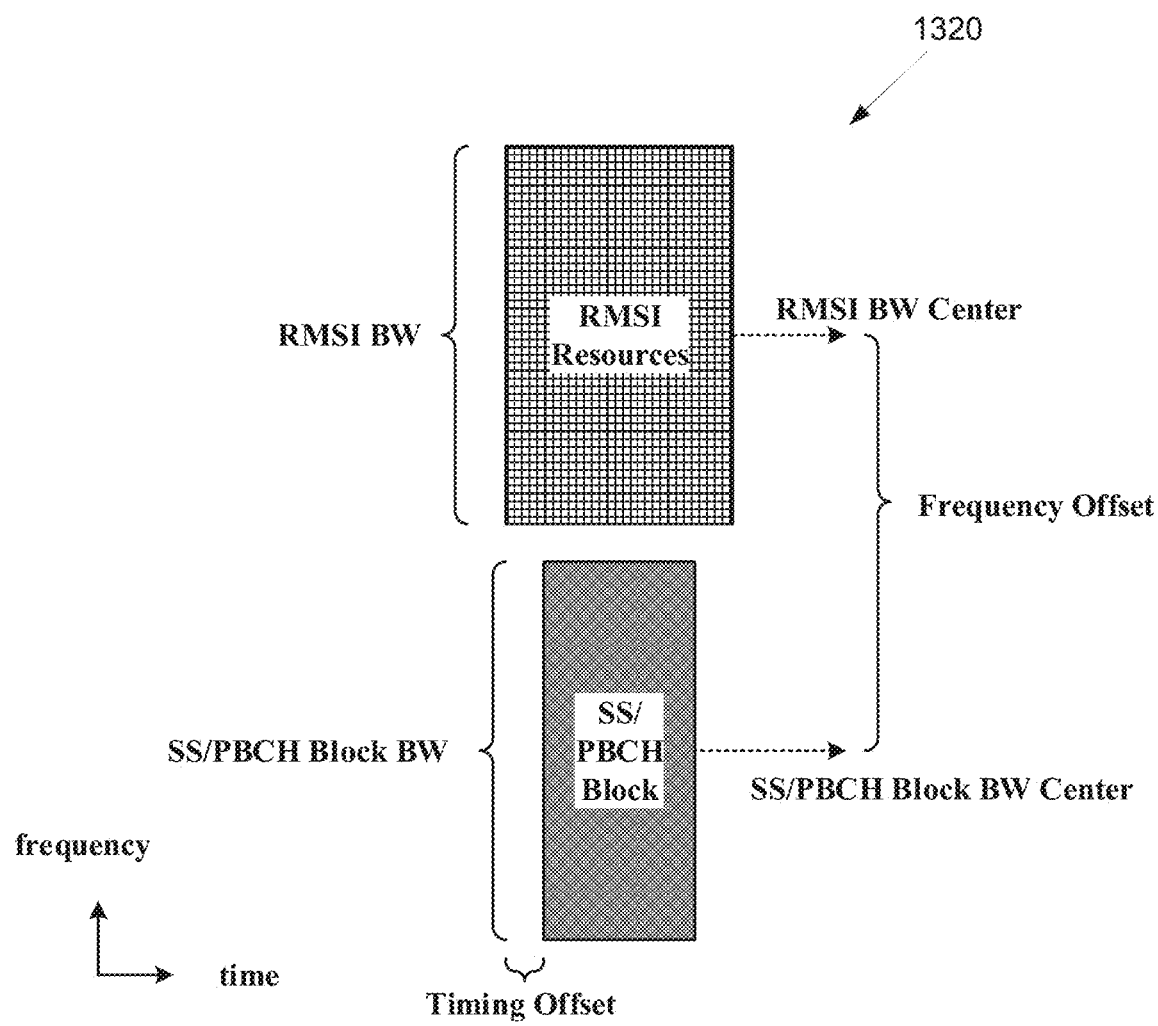
FIG. 13B illustrates an example FDM multiplexing pattern according to embodiments of the present disclosure.

FIG. 13B illustrates an example FDM multiplexing pattern 1320 according to embodiments of the present disclosure. The embodiment of the FDM multiplexing pattern 1320 illustrated in FIG. 13B is for illustration only. FIG. 13B does not limit the scope of this disclosure to any particular implementation.

In another embodiment of the multiplexing pattern, the SS/PBCH block and RMSI resources are FDMed, wherein the symbols for SS/PBCH block and the symbols for RMSI resources may or may not be the same, and the SS/PBCH block BW may or may not be the same as the RMSI resources BW. An example is shown in FIG. 13B.

For one example, the timing offset in FIG. 13B can be 0, such that the CORESET and PDSCH of RMSI are both FDMed with SS/PBCH block.

For another example, the timing offset in FIG. 13B can be greater than 0, such that the CORESET is TDMed and FDMed with SS/PBCH block, and PDSCH of RMSI is FDMed with SS/PBCH block.

Note that no matter the first symbol for SS/PBCH block and the first symbol for RMSI resources are same or not, the frequency offset indication scheme can be the same, e.g. the frequency offset indication scheme for the above two examples of this embodiment can be the same.

Figure 13C:
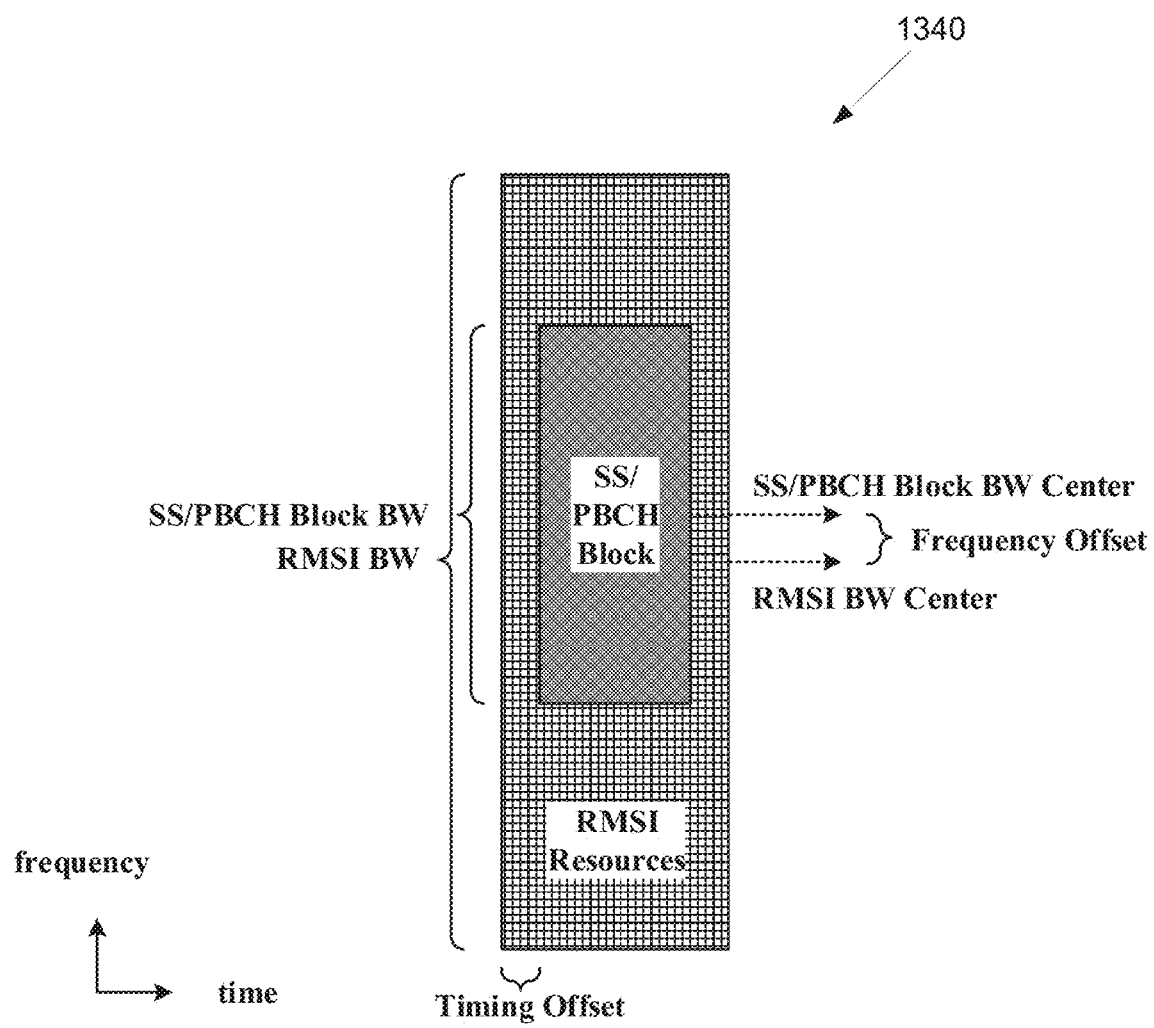
FIG. 13C illustrates an example hybrid TDM and FDM multiplexing pattern according to embodiments of the present disclosure.

FIG. 13C illustrates an example hybrid TDM and FDM multiplexing pattern 1340 according to embodiments of the present disclosure. The embodiment of the hybrid TDM and FDM multiplexing pattern 1340 illustrated in FIG. 13C is for illustration only. FIG. 13C does not limit the scope of this disclosure to any particular implementation.

In yet another embodiment, the SS/PBCH block and RMSI resources are TDMed and FDMed at the same time (e.g. hybrid TDMed and FDMed). An example is shown in FIG. 13C.

One example of this embodiment is, although the RMSI resources are hybrid TDMed and FDMed with SS/PBCH block, the RMSI CORESET can be purely TDMed with SS/PBCH block. In this case, the timing and frequency offset configuration can refer to the TDM case.

Another example of the aforementioned embodiment is, multiple RMSI resource blocks (e.g. two blocks on each side of the SS/PBCH block) are purely FDMed with SS/PBCH block. In this case, the timing and frequency offset configuration can refer to the FDM case, with some proper modifications.

A third component for configuring RMSI resources can be the bandwidth of the CORESET containing PDCCH scheduling RMSI (e.g. RMSI CORESET BW), which can be expressed in the number of physical resource blocks (PRBs) in term of the subcarrier spacing of RMSI.

In one embodiment, the number of PRBs for the CORESET can be configured with the number of OFDM symbols together with the CORESET BW in term of PRBs, if the frequency/time resources for the CORESET are forming a rectangle in the RE grid (e.g. in the pure TDM and FDM cases as in FIG. 13A and FIG. 13B. Note that for a given total number of PRBs for the RMSI CORESET, the CORESET BW can be determined based on the numerology of the RMSI CORESET. One sub-embodiment of this embodiment is, the effective BW of RMSI CORESET is at least 24 PRB in term of SS/PBCH block numerology.

For one example, if the total number of PRBs for the CORESET is configured by 12 PRBs, it can be configured by using 1 OFDM symbol with 12 PRB CORESET BW, or 2 OFDM symbols with 6 PRB CORESET BW.

For another example, if the total number of PRBs for the CORESET is configured by 24 PRBs, it can be configured by using 1 OFDM symbol with 24 PRB CORESET BW, or 2 OFDM symbols with 12 PRB CORESET BW.

For yet another example, if the total number of PRBs for the CORESET is configured by 48 PRBs, it can be configured by using 1 OFDM symbol with 48 PRB CORESET BW, or 2 OFDM symbols with 24 PRB CORESET BW, or 3 symbols with 16 PRB CORESET BW.

For yet another example, if the total number of PRBs for the CORESET is configured by 72 PRBs, it can be configured by using 3 OFDM symbol with 24 PRB CORESET BW.

For yet another example, if the total number of PRBs for the CORESET is configured by 96 PRBs, it can be configured by using 1 OFDM symbol with 96 PRB CORESET BW, or 2 OFDM symbols with 48 PRB CORESET BW, or 3 symbols with 32 PRB CORESET BW.

For yet another example, if the total number of PRBs for the CORESET is configured by 144 PRBs, it can be configured by using 3 OFDM symbol with 48 PRB CORESET BW.

In another embodiment, the number of PRBs for the CORESET can be configured a single number as the total number of PRBs (e.g. N_CORESET_PRB=12 or 24 or 48 or 96 PRBs), and further configured with other components to define the RE mapping pattern.

For example, the total number of PRBs for the CORESET is configured by N_CORESET_PRB PRBs, and it can be further configured with hybrid TDMed and FDMed pattern (e.g. as in FIG. 13C) to define the RE mapping.

A fourth component for configuring RMSI resources can be the timing information for monitoring the RMSI resources.

In one embodiment of this component, one configuration can be the timing offset between SS/PBCH block and RMSI resources, which can be configured by the number of OFDM symbols (e.g., in terms of SS/PBCH block numerology or RMSI CORESET numerology), or by the number of slots (e.g., in terms of SS/PBCH block numerology or RMSI CORESET numerology), or by time (e.g. in term of ms), which refers to the difference between the starting position of SS/PBCH block and RMSI resources (or CORESET location). Note that the configuration of this timing offset can be same or different for TDM/FDM/hybrid cases.

For example, for TDM case, the timing offset can be as large as several ms or larger.

For another example, for FDM case, the timing offset can be as small as α or up to several OFDM symbols.

For yet another example, for hybrid case, the timing offset can be small, similar to FDM case.

In another embodiment of this component, another configuration can be the periodicity of monitoring the RMSI resources in time domain.

A fifth component for configuring RMSI resources can be the frequency offset between SS/PBCH block and RMSI resources (e.g. RMSI CORESET).

The definition of the configuration of frequency offset can be same or different for multiplexing cases, including TDM/FDM/hybrid cases. For example, one of the following embodiments is commonly utilized for TDM/FDM/hybrid cases. For another embodiment, one of the following embodiments is utilized for defining the frequency offset for TDM case, and one of the following embodiments is utilized for FDM/hybrid cases. Also note that the following definitions of frequency offset can be equivalent (one can be deducted from the other) by knowing the SS/PBCH block BW and RMSI resources BW.

In one embodiment, the frequency offset can be defined by the difference between the central of SS/PBCH block BW and the central of RMSI resources BW, which can be in term of number of PRBs or REs or Hz. Note that in some example (e.g. SS/PBCH block BW=20 PRBs and RMSI resources BW is an even number), this definition is the same as the central PRB grid offset between SS/PBCH block BW and RMSI resources BW.

In another embodiment, the frequency offset can be defined by the difference between the lowest/highest RE/PRB grid of SS/PBCH block and the lowest/highest RE/PRB grid of RMSI resources, which can be in term of number of PRBs or REs or Hz.

The frequency offset $\Delta F$ (in term of RMSI CORESET numerology) is defined as $\Delta F = F\_ref + \Delta F'$ where $F\_ref$ refers to the frequency offset reference (in term of RMSI CORESET numerology) and defined as a constant/predefined value in the spec or indicated/configured by other configurations or can be known from other information, and $\Delta F'$ (in term of RMSI CORESET numerology) is the part in need of indication/configuration relative to the frequency offset reference.

The range in need of configuration for the frequency offset $\Delta F$ (e.g. defined as a vector $\Delta F\_Range$), is actually determined by the range for $\Delta F'$ (e.g. defined as a vector $\Delta F'\_Range$), since the frequency offset reference is known, and relationship between the ranges is given by $\Delta F\_Range = F\_ref + \Delta F'\_Range$.

The configuration of frequency offset could also depend on different multiplexing schemes as well as the relationship among numerologies and BWs of SS/PBCH block and RMSI CORESET. The following embodiments for different multiplexing patterns are considered in this disclosure. Note that in one example, multiple Embodiments from TDM and FDM subcases can be supported at the same time.

In TDM Sub-case 1, min channel BW is same as or larger than RMSI CORESET BW.

For this sub-case, multiple embodiments in term of the possible relative location of SS block, RMSI CORESET, and min channel bandwidth are considered, which further determines the frequency offset reference and the frequency offset range needed to be configured (i.e., $\Delta F'\_Range$).

Figure 14:
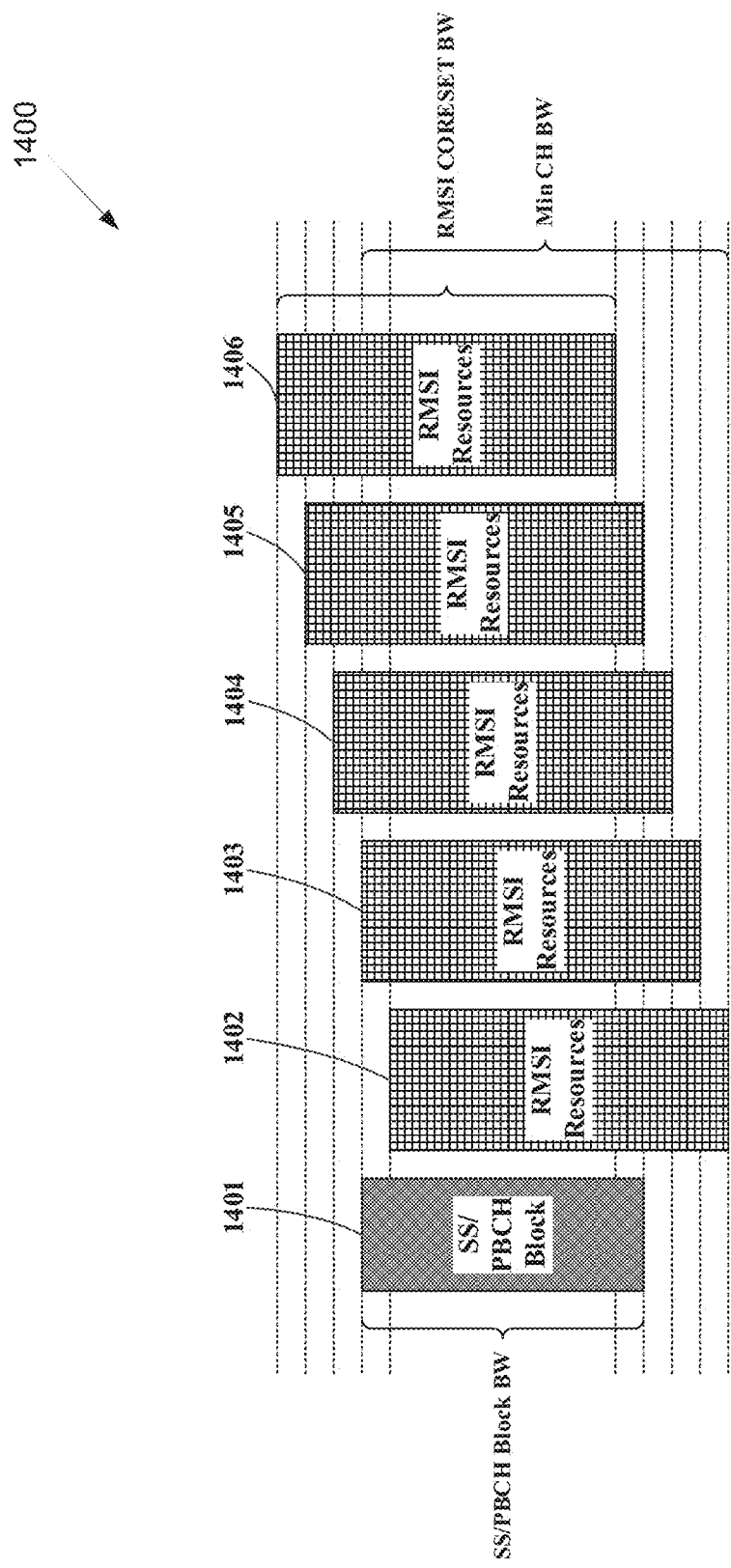
FIG. 14 illustrates an example configuration of frequency offset for a first case of TDM multiplexing pattern according to embodiments of the present disclosure.

FIG. 14 illustrates an example configuration of frequency offset 1400 for a first case of TDM multiplexing pattern according to embodiments of the present disclosure. The embodiment of the configuration of frequency offset 1400 illustrated in FIG. 14 is for illustration only. FIG. 14 does not limit the scope of this disclosure to any particular implementation.

In a first embodiment of TDM Sub-case 1 (e.g. TDM-Embodiment 1.1), the frequency location of RMSI CORESET can be arbitrary within the min channel BW (as illustrated in FIG. 14, wherein 1402, 1403, 1404, 1405, and 1406 are all examples of relative location of RMSI resources considered in this sub-embodiment). In this embodiment, the frequency offset reference can be determined as F_ref=0 (i.e., ΔF=ΔF'), and the frequency offset range for ΔF' can be determined as ΔF'_Range in PRB=(min channel BW in PRB−SS/PBCH block BW in PRB)*R_SCS where min channel BW is defined in SS/PBCH block numerology, and ΔF'_Range is defined in RMSI CORESET numerology, and R_SCS=SCS_SS/SCS_CORESET, is the ratio between subcarrier spacing values of SS/PBCH block and RMSI CORESET.

In a second embodiment of TDM Sub-case 1 (e.g. TDM-Embodiment 1.2), the frequency location of RMSI CORESET can be limited within a subset of the min channel BW (such that the possible frequency locations are a subset of TDM-Embodiment 1.1). For example, the frequency location of RMSI CORESET can be configured such that the SS/PBCH block BW is a subset of RMSI CORESET BW in the PRB-level (Note that this configuration already guarantees that one can obtain the whole RMSI resources within the min channel BW with certain configuration).

Figure 15:
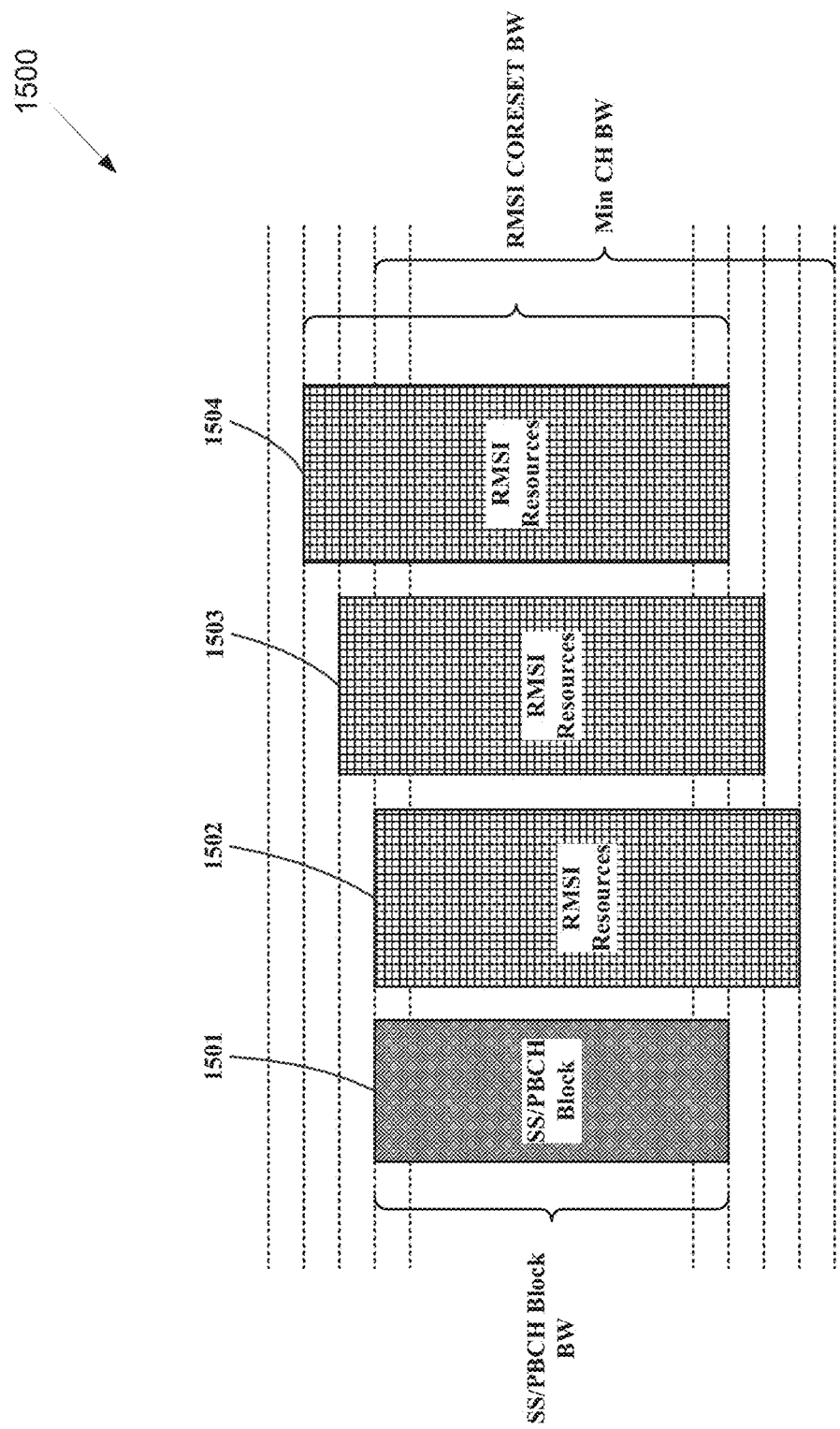
FIG. 15 illustrates an example configuration of frequency offset for a second case of TDM multiplexing pattern according to embodiments of the present disclosure.

FIG. 15 illustrates an example configuration of frequency offset 1500 for a second case of TDM multiplexing pattern according to embodiments of the present disclosure. The embodiment of the configuration of frequency offset 1500 illustrated in FIG. 15 is for illustration only. FIG. 15 does not limit the scope of this disclosure to any particular implementation.

As illustrated in FIG. 15, wherein 1502, 1503, and 1504 are all examples of relative location of RMSI resources considered in this sub-embodiment. In this embodiment, the frequency offset reference can be determined as F_ref=0 (i.e., ΔF=ΔF'), and the frequency offset range for ΔF' can be determined as ΔF'_Range in PRB=max(0, (RMSI CORESET BW in PRB−SS/PBCH block BW in PRB*R_SCS)) where ΔF'_Range is defined in RMSI CORESET numerology, and R_SCS=SCS_SS/SCS_CORESET, is the ratio between subcarrier spacing values of SS/PBCH block and RMSI CORESET. Note that ΔF'_Range in PRB is 0 (meaning no need for PRB-level indication), if RMSI CORESET BW is smaller or equal to SS/PBCH block BW.

Figure 16:
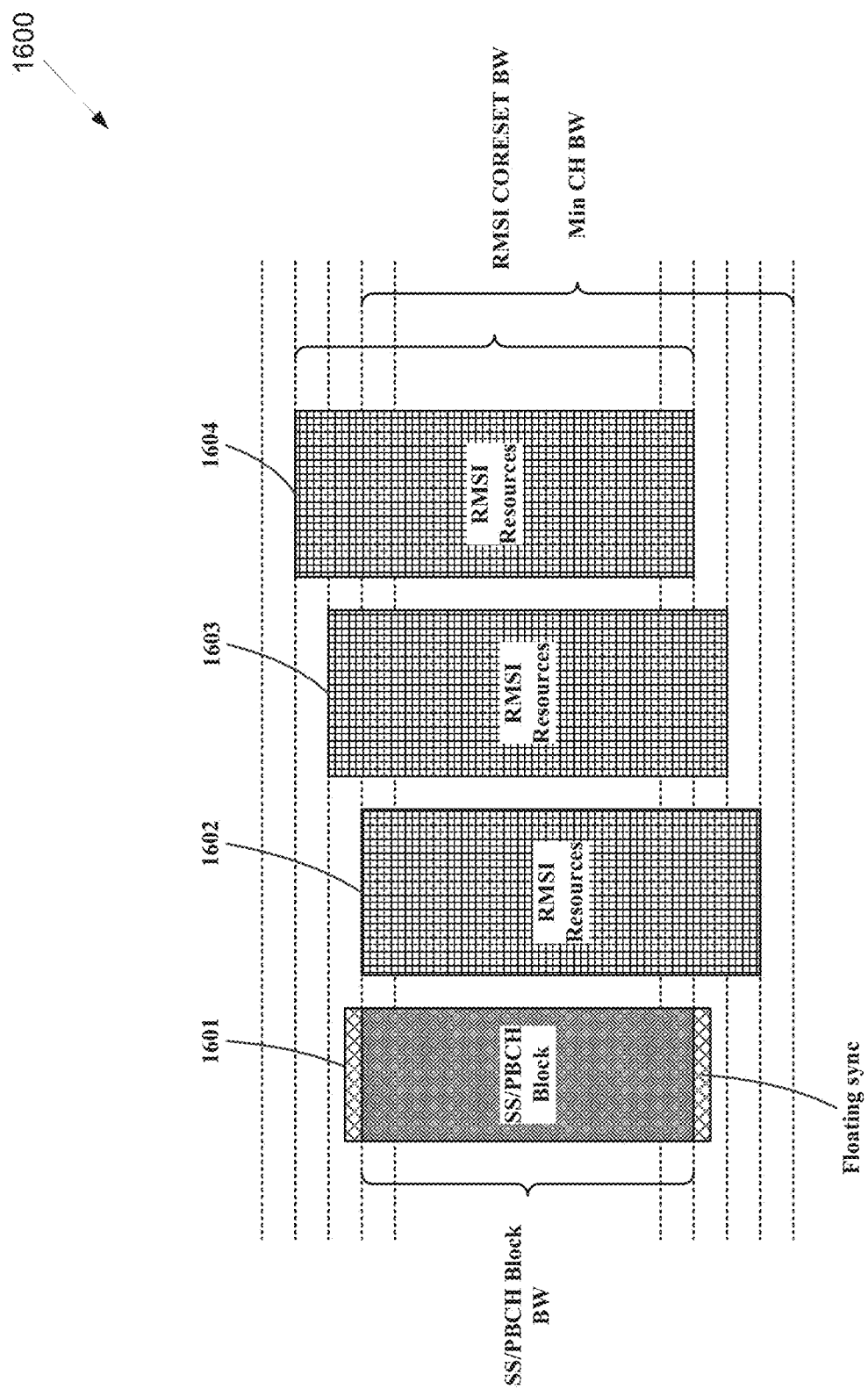
FIG. 16 illustrates an example configuration of frequency offset for a third case of TDM multiplexing pattern according to embodiments of the present disclosure.

FIG. 16 illustrates an example configuration of frequency offset 1600 for a third case of TDM multiplexing pattern according to embodiments of the present disclosure. The embodiment of the configuration of frequency offset 1600 illustrated in FIG. 16 is for illustration only. FIG. 16 does not limit the scope of this disclosure to any particular implementation.

In a third embodiment of TDM Sub-case 1 (e.g. TDM-Embodiment 1.3), the frequency location of RMSI CORESET is limited within the min channel BW (such that the possible frequency locations are a subset of TDM-Embodiment 1.1). For example, the frequency location of RMSI CORESET can be configured such that the BW part that the SS/PBCH block BW exceeding RMSI CORESET BW is no more than one PRB in term of the RMSI CORESET numerology (this one PRB is utilized for the functionality of floating sync indicating the possible offset between SS/PBCH block PRB boundary and RMSI CORESET PRB boundary). Note that this configuration already guarantees that one can obtain the whole RMSI resources within the min channel BW with certain configuration).

As illustrated in FIG. 16, wherein 1602, 1603, and 1604 are examples of relative location of RMSI resources considered in this sub-embodiment, and floating sync may apply to SS/PBCH block at the same time. In this embodiment, the frequency offset reference can be determined as F_ref=0 (i.e., ΔF=ΔF'), and the frequency offset range for ΔF' can be determined as ΔF'_Range in PRB=max(1, (RMSI CORESET BW in PRB+1−SS/PBCH block BW in PRB*R_SCS)) where ΔF'_Range is defined is RMSI CORESET numerology, and R_SCS=SCS_SS/SCS_CORESET, is the ratio between subcarrier spacing values of SS/PBCH block and RMSI CORESET. Note that ΔF'_Range in PRB is 1 (meaning no need for PRB-level indication and only need for RE-level indication within the one PRB), if RMSI CORESET BW is smaller or equal to SS/PBCH block BW.

In TDM Sub-case 2, min channel BW is smaller than RMSI CORESET BW. For this sub-case, multiple embodiments in term of the possible relative location of SS block, RMSI CORESET, and min channel bandwidth are considered, which further determines the frequency offset reference and the frequency offset range needed to be configured (i.e., ΔF'_Range).

Figure 17:
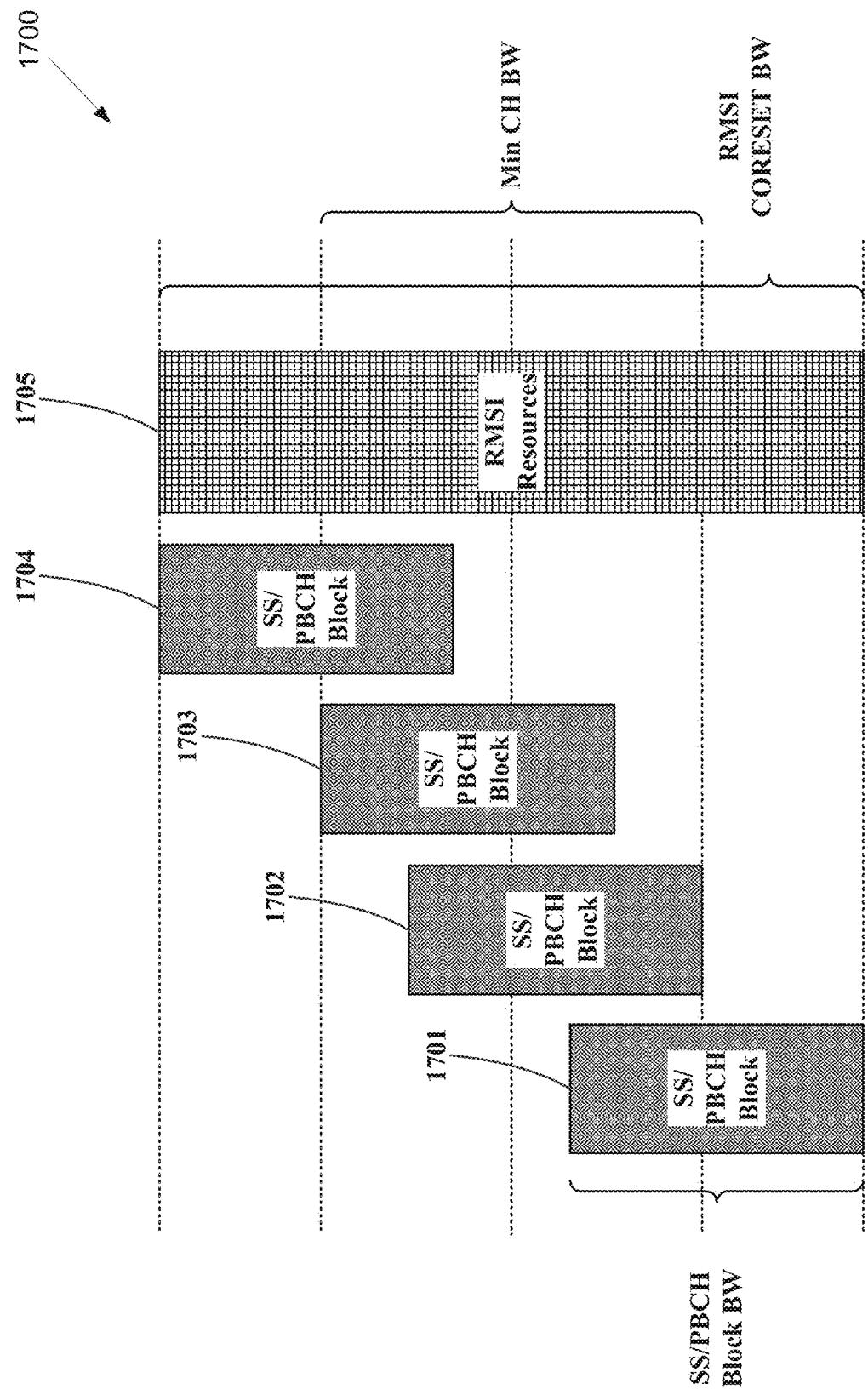
FIG. 17 illustrates an example configuration of frequency offset for a fourth case of TDM multiplexing pattern according to embodiments of the present disclosure.

FIG. 17 illustrates an example configuration of frequency offset 1700 for a fourth case of TDM multiplexing pattern according to embodiments of the present disclosure. The embodiment of the configuration of frequency offset 1700 illustrated in FIG. 17 is for illustration only. FIG. 17 does not limit the scope of this disclosure to any particular implementation.

In a first embodiment of TDM Sub-case 2 (e.g. TDM-Embodiment 2.1), the frequency location of SS/PBCH block can be arbitrary within the RMSI CORESET BW. As illustrated in FIG. 17, 1701, 1702, ..., 1704 are all examples of relative location of SS/PBCH block considered in the embodiment. In this embodiment, the frequency offset reference can be determined as F_ref=0 (i.e., ΔF=ΔF'), and the frequency offset range for ΔF' can be determined as ΔF'_Range in PRB=RMSI CORESET BW in PRB−SS/PBCH block BW in PRB*R_SCS where ΔF'_Range is defined in RMSI CORESET numerology, and R_SCS=SCS_SS/SCS_CORESET, is the ratio between subcarrier spacing values of SS/PBCH block and RMSI CORESET.

In a second embodiment of TDM Sub-case 2 (e.g. TDM-Embodiment 2.2), the frequency location of SS/PBCH block can be limited within part of the RMSI CORESET BW (such that the possible frequency locations are a subset of TDM-Embodiment 2.1). For example, the frequency location of RMSI CORESET can be configured such that the SS/PBCH block BW is a subset of part of the RMSI CORESET BW in the PRB-level, wherein the part of the RMSI CORESET BW refers to the "restricted BW", and can be a predefined value in the spec to reduce the overhead. In one example, restricted BW can be 24 PRBs in term of SS/PBCH block numerology, which refers to the minimum value for the BW such that the whole RMSI CORESET BW can be within the min UE BW.

Figure 18:
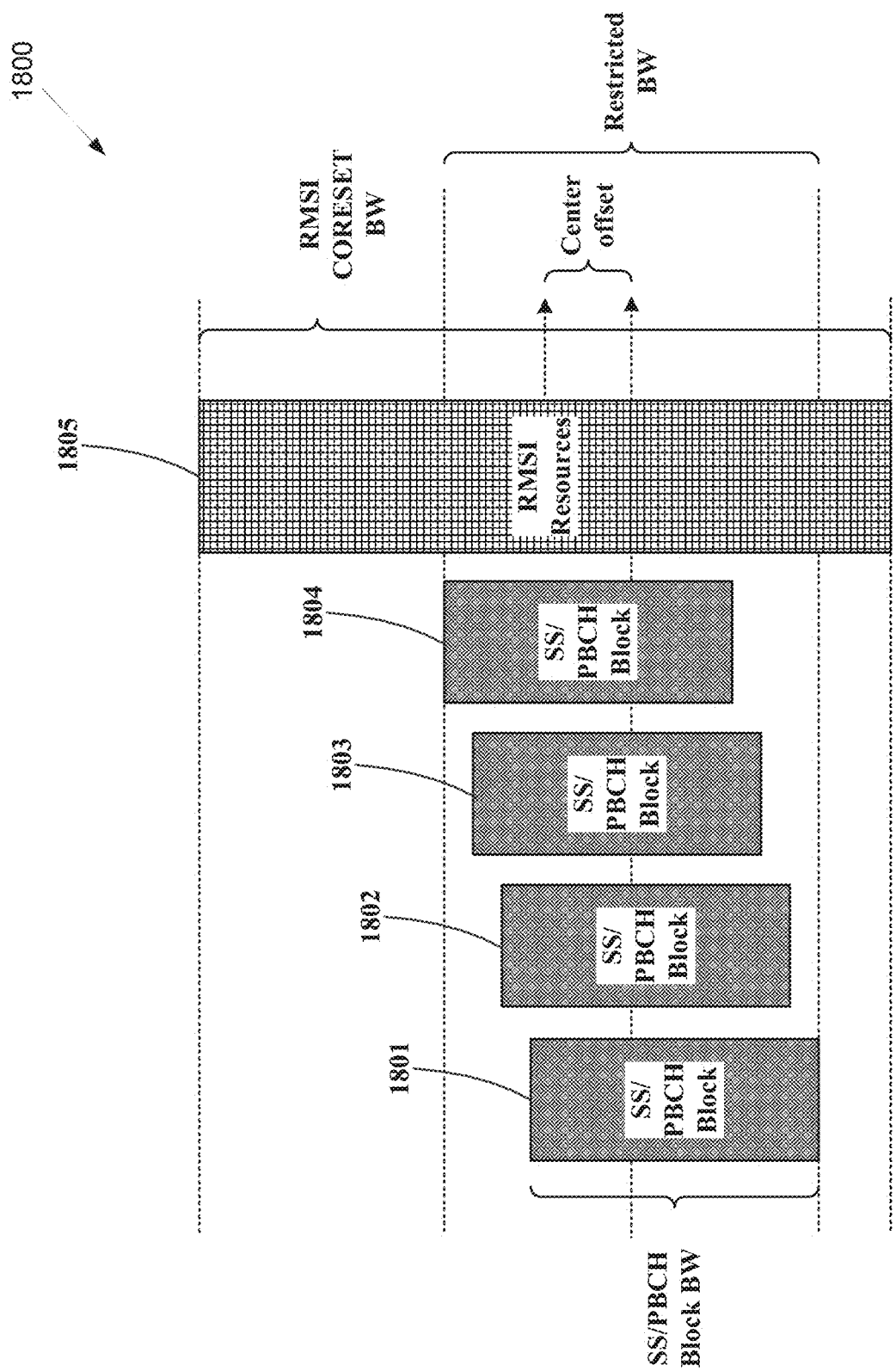
FIG. 18 illustrates an example configuration of frequency offset for a fifth case of TDM multiplexing pattern according to embodiments of the present disclosure.

FIG. 18 illustrates an example configuration of frequency offset 1800 for a fifth case of TDM multiplexing pattern according to embodiments of the present disclosure. The embodiment of the configuration of frequency offset 1800 illustrated in FIG. 18 is for illustration only. FIG. 18 does not limit the scope of this disclosure to any particular implementation.

In another example, restricted BW can be same as min channel BW, and the whole RMSI CORESET BW can also be within the min UE BW. As illustrated in FIGS. 18, 1801, 1802, 1803, and 1804 are all examples of relative location of SS/PBCH block considered in the embodiment. In this embodiment, the frequency offset reference refers to the center offset of the restricted BW with respect to the RMSI CORESET BW, which is determined by the frequency location of the predefined restricted BW, and is a predefined value in the spec, e.g. F_ref=ΔCORESET_BW_Offset (defined in RMSI CORESET numerology).

In one example, the restricted BW can be restricted to the center of the RMSI CORESET BW (i.e., the centers of RMSI CORESET BW and restricted BW are aligned) such that F_ref=ΔCORESET_BW_Offset=0. In another example, the restricted BW can be restricted to start from one end of RMSI CORESET BW, such that F_ref=ΔCORESET_BW_Offset=CORESET BW/2−Restricted BW/2 or F_ref=ΔCORESET_BW_Offset=−CORESET BW/2+Restricted BW/2, depending on which end to start from. In this embodiment, the overall frequency offset range for ΔF' can be determined as ΔF' Range in PRB=Restricted BW in PRB−SS/PBCH block BW in PRB*R_SCS where Restricted BW and ΔF' Range are defined in RMSI CORESET numerology, and R_SCS=SCS_SS/SCS_CORESET, is the ratio between subcarrier spacing values of SS/PBCH block and RMSI CORESET.

In a third embodiment of TDM Sub-case 2 (e.g. TDM-Embodiment 2.3), the frequency location of SS/PBCH block is limited within part of the RMSI CORESET BW (such that the possible frequency locations are a subset of TDM-Embodiment 2.1), with a potential further offset to be indicated as large as at most 1 PRB in term of the RMSI CORESET numerology (this one PRB is utilized for the functionality of floating sync indicating the possible offset between SS/PBCH block PRB boundary and RMSI CORESET PRB boundary).

For example, the frequency location of RMSI CORESET can be configured such that the SS/PBCH block BW is a subset of part of the RMSI CORESET BW except for the potential further offset as large as at most 1 PRB in term of the RMSI CORESET numerology, wherein the part of the RMSI CORESET BW refers to the "restricted BW" and can be a predefined value in the spec to reduce the overhead.

Figure 19:
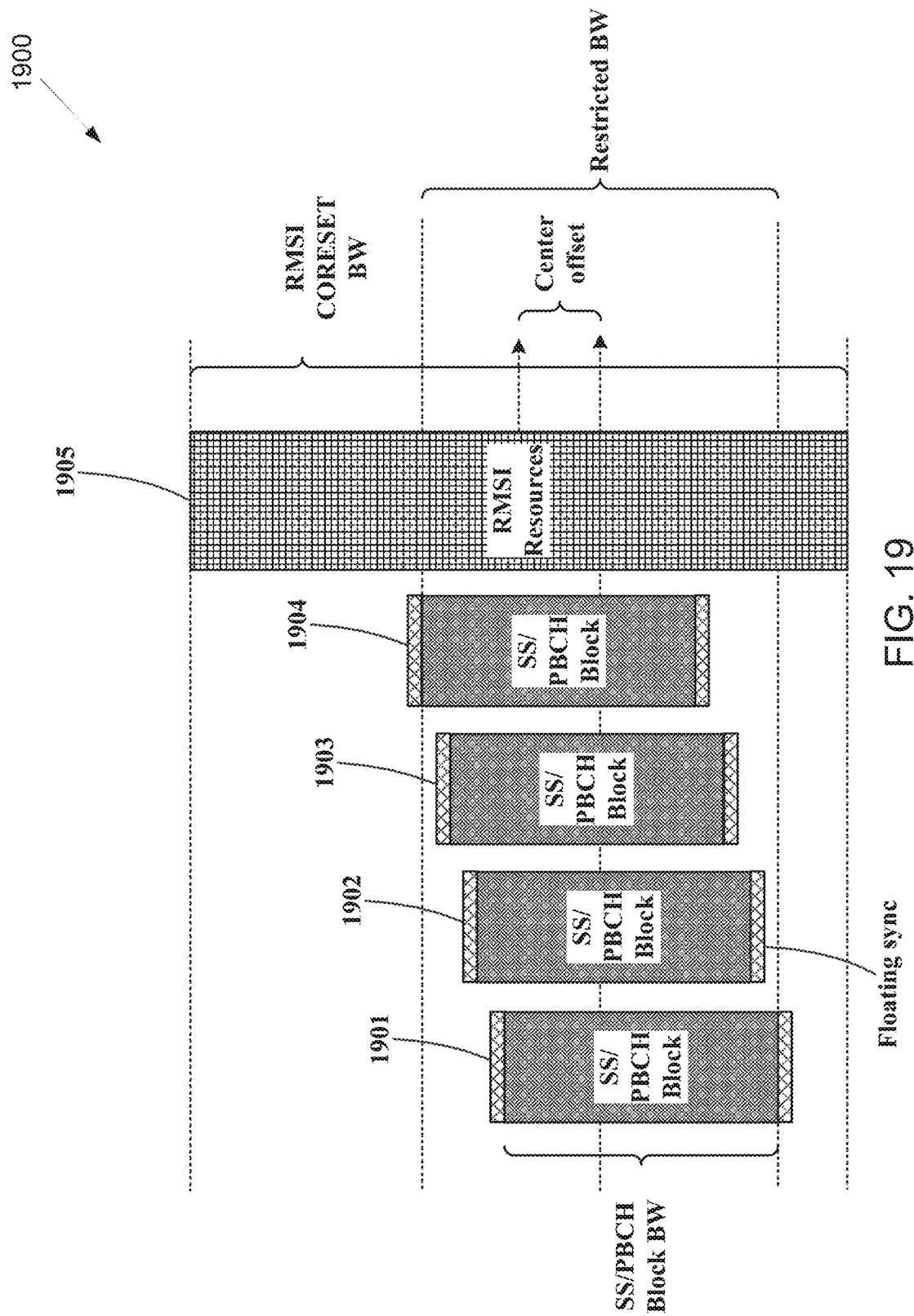
FIG. 19 illustrates an example configuration of frequency offset for a sixth case of TDM multiplexing pattern according to embodiments of the present disclosure.

FIG. 19 illustrates an example configuration of frequency offset 1900 for a sixth case of TDM multiplexing pattern according to embodiments of the present disclosure. The embodiment of the configuration of frequency offset 1900 illustrated in FIG. 19 is for illustration only. FIG. 19 does not limit the scope of this disclosure to any particular implementation.

In one example, restricted BW can be 24 PRBs in term of SS/PBCH block numerology, which refers to the minimum value for the BW such that the whole RMSI CORESET BW can be within the min UE BW. In another example, restricted BW can be same as min channel BW, and the whole RMSI CORESET BW can also be within the min UE BW. As illustrated in FIGS. 19, 1901, 1902, 1903, and 1904 are all examples of relative location of SS/PBCH block considered in the embodiment.

In this embodiment, the frequency offset reference refers to the center offset of the restricted BW with respect to the RMSI CORESET BW, which is determined by the frequency location of the predefined restricted BW, and is a predefined value in the spec, e.g. F_ref=ΔCORESET_BW_Offset (defined in RMSI CORESET numerology).

In one example, the restricted BW can be restricted to the center of the RMSI CORESET BW (i.e., the centers of RMSI CORESET BW and restricted BW are aligned) such that F_ref=ΔCORESET_BW_Offset=0. In another example, the restricted BW can be restricted to start from one end of RMSI CORESET BW, such that F_ref=ΔCORESET_BW_Offset=CORESET BW/2−Restricted BW/2 or F_ref=ΔCORESET_BW_Offset=−CORESET BW/2+Restricted BW/2, depending on which end to start from. In this embodiment, the frequency offset range for ΔF' can be determined as ΔF' Range in PRB=Restricted BW in PRB+1−SS/PBCH block BW in PRB*R_SCS where Restricted BW and ΔF' Range are both defined in RMSI CORESET numerology, and R_SCS=SCS_SS/SCS_CORESET, is the ratio between subcarrier spacing values of SS/PBCH block and RMSI CORESET.

In FDM Sub-case 1, single RMSI resource block is FDMed with SS/PBCH block, and can be on either side of the SS/PBCH block in the frequency domain. For this sub-case, multiple embodiments in term of the possible relative location of SS block, RMSI CORESET, and min channel bandwidth are considered, which further determines the frequency offset reference and the frequency offset range needed to be configured (i.e., ΔF'_Range).

In a first embodiment of FDM Sub-case 1 (e.g. FDM-Embodiment 1.1), the frequency location of SS/PBCH block can be arbitrary within the min channel BW, and the RMSI CORESET block is multiplexed outside the min channel BW with a potential predefined constant gap ΔGap (defined in RMSI CORESET numerology) in the frequency domain.

Figure 20:
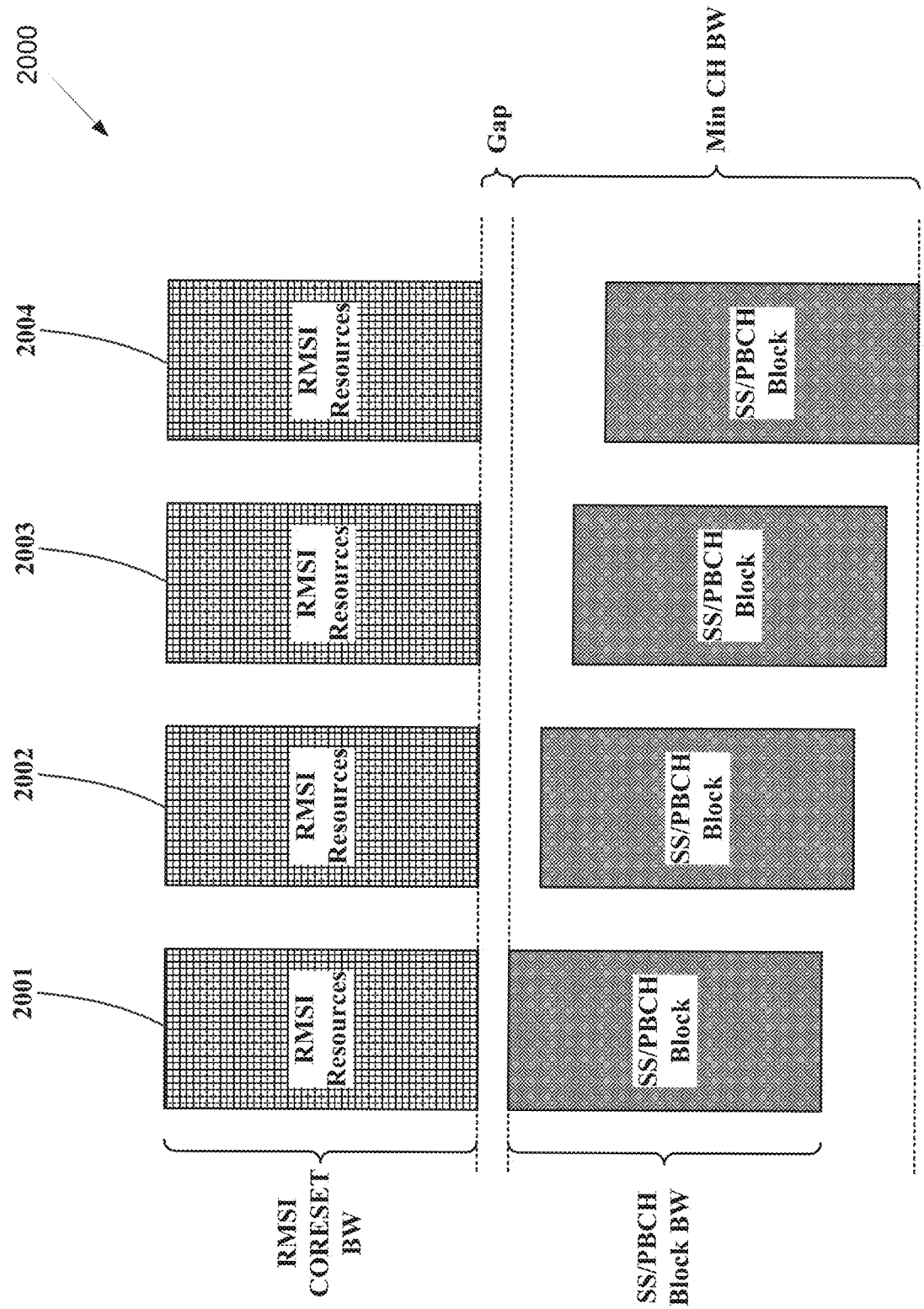
FIG. 20 illustrates an example configuration of frequency offset for a first case of FDM multiplexing pattern according to embodiments of the present disclosure.

FIG. 20 illustrates an example configuration of frequency offset 2000 for a first case of FDM multiplexing pattern according to embodiments of the present disclosure. The embodiment of the configuration of frequency offset 2000 illustrated in FIG. 20 is for illustration only. FIG. 20 does not limit the scope of this disclosure to any particular implementation.

As illustrated in FIGS. 20, 2001, 2002, 2003, and 2004 are all examples of relative location of SS/PBCH block considered in the embodiment. For one example, the gap is 0 PRB. For another example, the gap is determined to be within 1 PRB and aligned with the RE-level offset values to enable floating sync (for example, if RE-level offset is defined as −6:1:5 or −6:1:6, ΔGap=6 REs; if the RE-level offset is defined as 0:1:11 or 0:1:12, ΔGap=0 REs; if the RE-level offset is defined as −11:1:0, ΔGap=11 REs; if the RE-level offset is defined as −12:1:0, ΔGap=12 REs).

In this embodiment, frequency offset reference can be determined as the center offset between RMSI CORESET BW and min channel BW such that F_ref=RMSI CORESET BW/2+ΔGap+min channel BW/2, and the frequency offset range for ΔF' can be determined as ΔF'_Range in PRB=(min channel BW in PRB−SS/PBCH block BW in PRB)*R_SCS where min channel BW is defined in SS/PBCH block numerology, and ΔF'_Range is defined in RMSI CORESET numerology, and R_SCS=SCS_SS/SCS_CORESET, is the ratio between subcarrier spacing values of SS/PBCH block and RMSI CORESET.

One possible variant of this embodiment is, the multiplexing pattern of the RMSI resources with SS/PBCH block can be on either side of the SS/PBCH block, such that the frequency offset reference can be either RMSI CORESET BW/2+ΔGap+min channel BW/2 or −(RMSI CORESET BW/2+ΔGap'+min channel BW*R_SCS/2), where ΔGap' is also a predefined constant gap. In one consideration, ΔGap'+ΔGap=12 REs to enable floating sync (For example, if choosing ΔGap=6 REs to be aligned with RE-level offset defined as −6:1:5, ΔGap'=6 REs with RE-level offset defined as −5:1:6 to be aligned this setup.

For another example, if choosing ΔGap=6 REs to be aligned with RE-level offset defined as −6:1:6, ΔGap'=6 REs with RE-level offset defined as −6:1:6 to be aligned this setup. For another example, if choosing ΔGap=0 REs to be aligned with RE-level offset defined as 0:1:11, ΔGap'=12

REs with RE-level offset defined as −11:1:0 to be aligned this setup. For another example, if choosing ΔGap=0 REs to be aligned with RE-level offset defined as 0:1:12, ΔGap'=12 REs with RE-level offset defined as −12:1:0 to be aligned this setup. For yet another example, if choosing ΔGap=12 REs to be aligned with RE-level offset defined as −12:1:0, ΔGap'=0 REs with RE-level offset defined as 0:1:12 to be aligned this setup). In this variant, the number of configurations is doubled comparing to restricting the RMSI resource on a particular side of SS/PBCH block predefined in the spec.

In a second embodiment of FDM Sub-case 1 (e.g. FDM-Embodiment 1.2), the frequency location of SS/PBCH block can be within the min channel BW, and the RMSI CORESET block can also be multiplexed (partially) within the min channel BW with a potential predefined constant gap ΔGap (defined in RMSI CORESET numerology) in the frequency domain.

Figure 21:
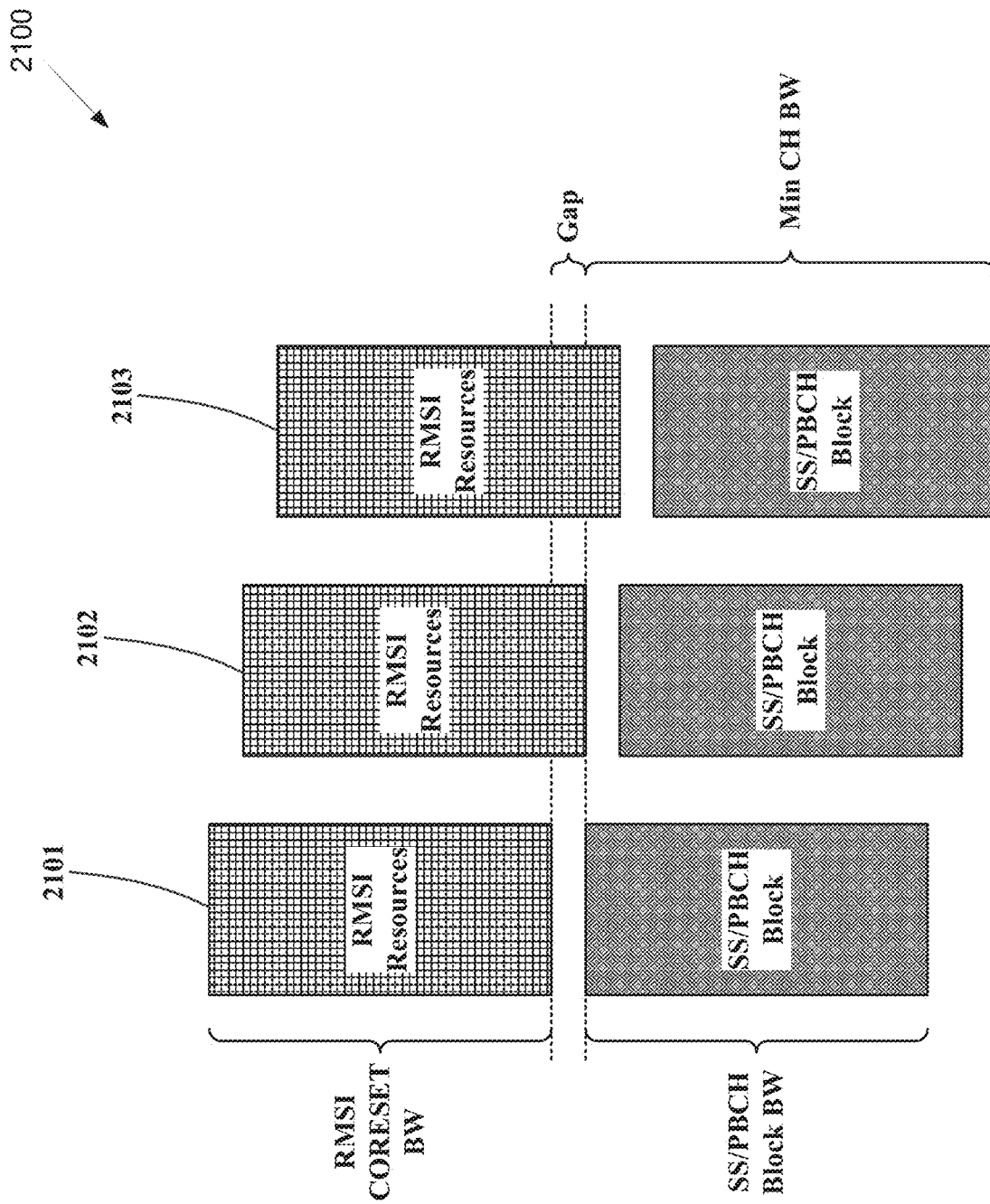
FIG. 21 illustrates an example configuration of frequency offset for a second case of FDM multiplexing pattern according to embodiments of the present disclosure.

FIG. 21 illustrates an example configuration of frequency offset 2100 for a second case of FDM multiplexing pattern according to embodiments of the present disclosure. The embodiment of the configuration of frequency offset 2100 illustrated in FIG. 21 is for illustration only. FIG. 21 does not limit the scope of this disclosure to any particular implementation.

As illustrated in FIGS. 21, 2101, 2102, and 2103 are all examples of relative location of SS/PBCH block considered in the embodiment. For one example, the gap is 0 PRB. For another example, the gap is determined to be within 1 PRB and aligned with the RE-level offset values to enable floating sync (for example, if RE-level offset is defined as −6:1:5 or −6:1:6, ΔGap=6 REs; if the RE-level offset is defined as 0:1:11 or 0:1:12, ΔGap=0 REs; if the RE-level offset is defined as −11:1:0, ΔGap=11 REs; if the RE-level offset is defined as −12:1:0, ΔGap=12 REs). Besides the reserved REs for enabling floating sync, another possible component of the gap can be 1 PRB for enabling FDM for mixed numerology scenario. In this embodiment, the frequency offset reference can be determined as F_ref=RMSI CORESET BW/2+ΔGap+SS/PBCH block BW*R_SCS/2, and the frequency offset range for ΔF' can be determined as ΔF'_Range in PRB=0 (which means relative position is fixed in PRB level) where ΔF'_Range is defined in RMSI CORESET numerology, and R_SCS=SCS_SS/SCS_CORESET, is the ratio between subcarrier spacing values of SS/PBCH block and RMSI CORESET.

One possible variant of this embodiment is, the multiplexing pattern of the RMSI resources with SS/PBCH block can be on either side of the SS/PBCH block, such that the frequency offset reference can be either RMSI CORESET BW/2+ΔGap+SS/PBCH block BW*R_SCS/2 or −(RMSI CORESET BW/2+ΔGap'+SS/PBCH block BW*R_SCS/2), where ΔGap' is also a predefined constant gap. In one consideration, ΔGap'+ΔGap=11 REs to enable floating sync (for example, if choosing ΔGap=6 REs to be aligned with RE-level offset defined as −6:1:5, ΔGap'=6 REs with RE-level offset defined as −5:1:6 to be aligned this setup. For another example, if choosing ΔGap=6 REs to be aligned with RE-level offset defined as −6:1:6, ΔGap'=6 REs with RE-level offset defined as −6:1:6 to be aligned this setup.

For another example, if choosing ΔGap=0 REs to be aligned with RE-level offset defined as 0:1:11, ΔGap'=12 REs with RE-level offset defined as −11:1:0 to be aligned this setup. For another example, if choosing ΔGap=0 REs to be aligned with RE-level offset defined as 0:1:12, ΔGap'=12 REs with RE-level offset defined as −12:1:0 to be aligned this setup. For yet another example, if choosing ΔGap=12 REs to be aligned with RE-level offset defined as −12:1:0, ΔGap'=0 REs with RE-level offset defined as 0:1:12 to be aligned this setup). In this variant, the number of configurations is doubled comparing to restricting the RMSI resource on a particular side of SS/PBCH block predefined in the spec.

In a third embodiment of FDM Sub-case 1 (e.g. FDM-Embodiment 1.3), the frequency location of SS/PBCH block can be within the min channel BW, and the RMSI CORESET block can also be multiplexed (partially) within the min channel BW with a potential predefined constant gap ΔGap (defined in RMSI CORESET numerology), wherein SS/PBCH block has a potential further offset to be indicated as large as at most 1 PRB in term of the RMSI CORESET numerology (this one PRB is utilized for the functionality of floating sync indicating the possible offset between SS/PBCH block PRB boundary and RMSI CORESET PRB boundary).

Figure 22:
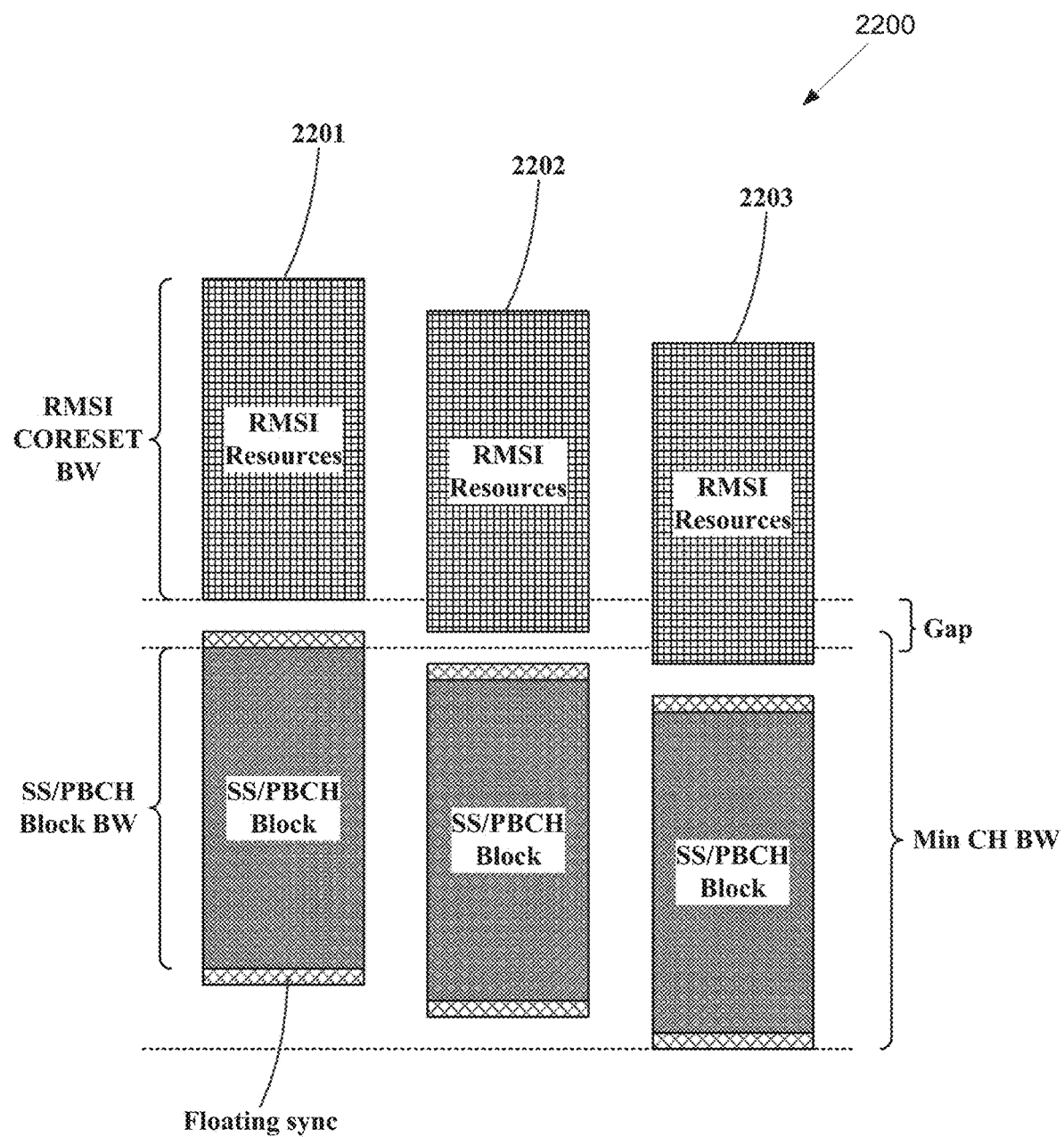
FIG. 22 illustrates an example configuration of frequency offset for a third case of FDM multiplexing pattern according to embodiments of the present disclosure.

FIG. 22 illustrates an example configuration of frequency offset 2200 for a third case of FDM multiplexing pattern according to embodiments of the present disclosure. The embodiment of the configuration of frequency offset 2200 illustrated in FIG. 22 is for illustration only. FIG. 22 does not limit the scope of this disclosure to any particular implementation.

As illustrated in FIGS. 22, 2201, 2202, and 2203 are all examples of relative location of SS/PBCH block considered in the embodiment. For one example, the gap is 0 PRB. For another example, the gap is determined to be within 1 PRB and aligned with the RE-level offset values to enable floating sync (for example, if RE-level offset is defined as −6:1:5 or −6:1:6, ΔGap=6 REs; if the RE-level offset is defined as 0:1:11 or 0:1:12, ΔGap=0 REs; if the RE-level offset is defined as −11:1:0, ΔGap=11 REs; if the RE-level offset is defined as −12:1:0, ΔGap=12 REs). In this embodiment, the frequency offset reference can be determined as F_ref=RMSI CORESET BW/2+ΔGap+SS/PBCH block BW*R_SCS/2, and the frequency offset range for ΔF' can be determined as ΔF'_Range in PRB=1 where ΔF'_Range is defined in RMSI CORESET numerology, and R_SCS=SCS_SS/SCS_CORESET, is the ratio between subcarrier spacing values of SS/PBCH block and RMSI CORESET.

One possible variant of this embodiment is, the multiplexing pattern of the RMSI resources with SS/PBCH block can be on either side of the SS/PBCH block, such that the frequency offset reference can be either RMSI CORESET BW/2+ΔGap+SS/PBCH block BW*R_SCS/2 or −(RMSI CORESET BW/2+ΔGap'+SS/PBCH block BW*R_SCS/2), where ΔGap' is also a predefined constant gap. In one consideration, ΔGap'+ΔGap=11 REs to enable floating sync (for example, if choosing ΔGap=6 REs to be aligned with RE-level offset defined as −6:1:5, ΔGap'=6 REs with RE-level offset defined as −5:1:6 to be aligned this setup. For another example, if choosing ΔGap=6 REs to be aligned with RE-level offset defined as −6:1:6, ΔGap'=6 REs with RE-level offset defined as −6:1:6 to be aligned this setup.

For another example, if choosing ΔGap=0 REs to be aligned with RE-level offset defined as 0:1:11, ΔGap'=12 REs with RE-level offset defined as −11:1:0 to be aligned this setup. For another example, if choosing ΔGap=0 REs to be aligned with RE-level offset defined as 0:1:12, ΔGap'=12 REs with RE-level offset defined as −12:1:0 to be aligned this setup. For yet another example, if choosing ΔGap=12 REs to be aligned with RE-level offset defined as −12:1:0, ΔGap'=0 REs with RE-level offset defined as 0:1:12 to be aligned this setup). In this variant, the number of configurations is doubled comparing to restricting the RMSI resource on a particular side of SS/PBCH block predefined in the spec.

In FDM Sub-case 2, multiple RMSI resource blocks, e.g. two, are FDMed with SS/PBCH block, and can be on both sides of the SS/PBCH block in the frequency domain. For this sub-case, multiple embodiments in term of the possible relative location of SS block, RMSI CORESET, and min channel bandwidth are considered, which further determines the frequency offset reference and the frequency offset range needed to be configured (i.e., ΔF' Range).

In a first embodiment of FDM Sub-case 2 (e.g. FDM-Embodiment 2.1), the frequency location of SS/PBCH block can be arbitrary within the min channel BW, and multiple RMSI CORESET blocks (e.g. 2 blocks on each side of SS/PBCH block) are multiplexed outside the min channel BW with potential predefined constant gaps ΔGap1 and ΔGap2 (both defined in RMSI CORESET numerology) in the frequency domain.

Figure 23:
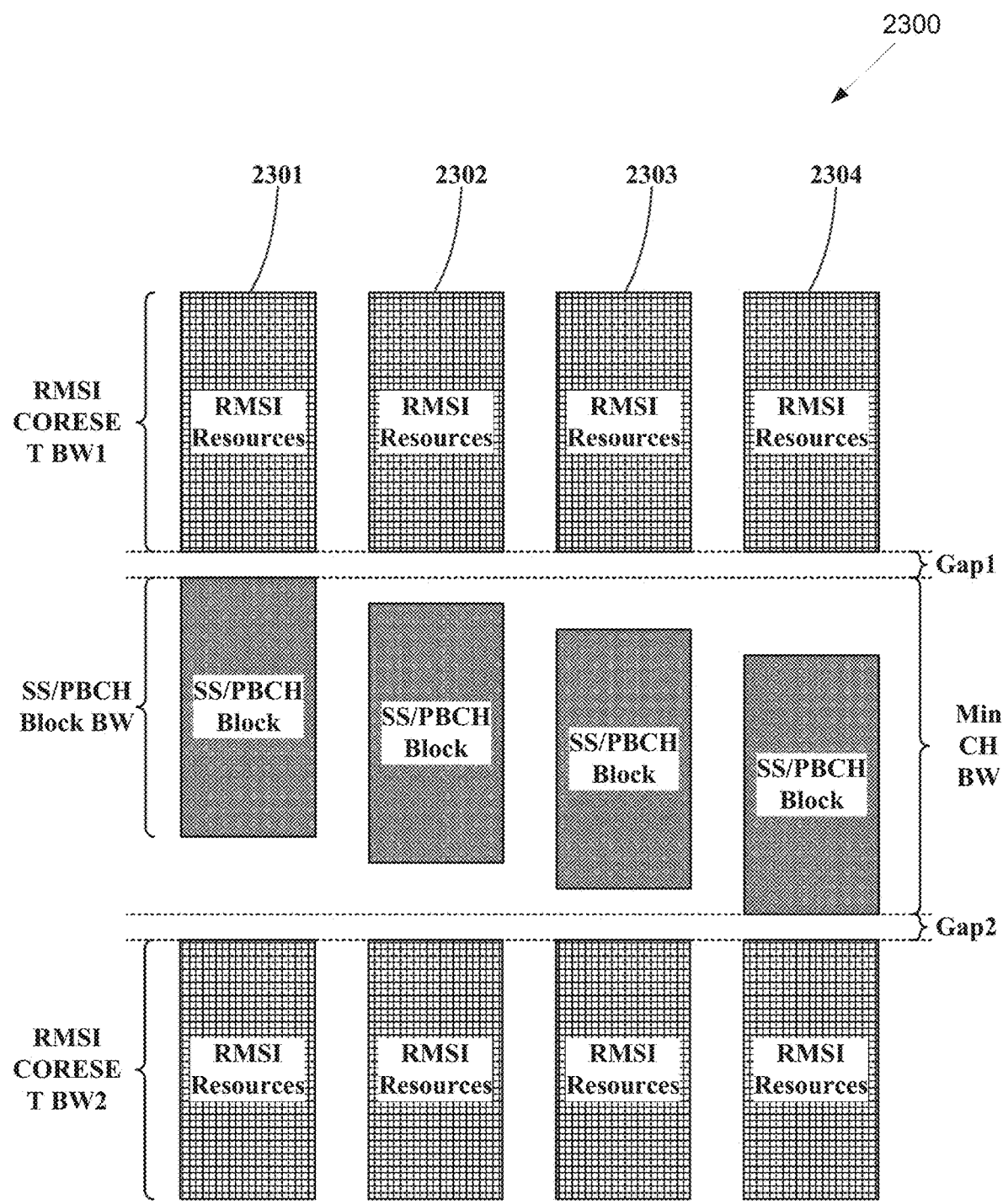
FIG. 23 illustrates an example configuration of frequency offset for a fourth case of FDM multiplexing pattern according to embodiments of the present disclosure.

FIG. 23 illustrates an example configuration of frequency offset 2300 for a fourth case of FDM multiplexing pattern according to embodiments of the present disclosure. The embodiment of the configuration of frequency offset 2300 illustrated in FIG. 23 is for illustration only. FIG. 23 does not limit the scope of this disclosure to any particular implementation.

As illustrated in FIGS. 23, 2301, 2302, 2303, and 2304 are all examples of relative location of SS/PBCH block considered in the embodiment. In this embodiment, the total RMSI CORESET BW is defined as the summation of the BW of two blocks (e.g. RMSI CORESET BW=RMSI CORESET BW 1+RMSI CORESET BW 2), in order to be consistent with the previous definition.

In this embodiment, the frequency center of RMSI CORESET BW can refer to center of whole frequency range including RMSI CORESET BW 1, RMSI CORESET BW 2, ΔGap1, ΔGap2, and min channel BW. In one consideration, RMSI CORESET BW 1 and RMSI CORESET BW 2 are fixed and with equal value to reduce the overhead in spec.

In another consideration, the gaps ΔGap1 and ΔGap2 are determined with ΔGap1+ΔGap2=12 REs and aligned with the RE-level offset values to enable floating sync (for example, if RE-level offset is defined as −6:1:5 or −6:1:6, ΔGap1=6 REs and ΔGap2=6 REs; if the RE-level offset is defined as 0:1:11 or 0:1:12, ΔGap1=0 REs and ΔGap2=12 REs; if the RE-level offset is defined as −11:1:0, ΔGap1=11 REs and ΔGap2=1 REs; if the RE-level offset is defined as −12:1:0, ΔGap1=12 REs and ΔGap2=0 REs).

In this embodiment, the frequency offset reference can be determined as F_ref=(ΔGap1−ΔGap2)/2+(RMSI CORESET BW 1−RMSI CORESET BW 2)/2, and the frequency offset range for ΔF' can be determined as ΔF'_Range in PRB=(min channel BW in PRB−SS/PBCH block BW in PRB)*R_SCS where min channel BW is defined in SS/PBCH block numerology, and ΔF'_Range is defined in RMSI CORESET numerology, and R_SCS=SCS_SS/SCS_CORESET, is the ratio between subcarrier spacing values of SS/PBCH block and RMSI CORESET.

In a second embodiment of FDM Sub-case 2 (e.g. FDM-Embodiment 2.2), the frequency location of SS/PBCH block can be within the min channel BW, and multiple RMSI CORESET blocks (e.g. 2 blocks on each side of SS/PBCH block) can also be multiplexed (partially) within the min channel BW with potential predefined constant gap ΔGap1 and ΔGap2 (both defined in RMSI CORESET numerology) in the frequency domain.

Figure 24:
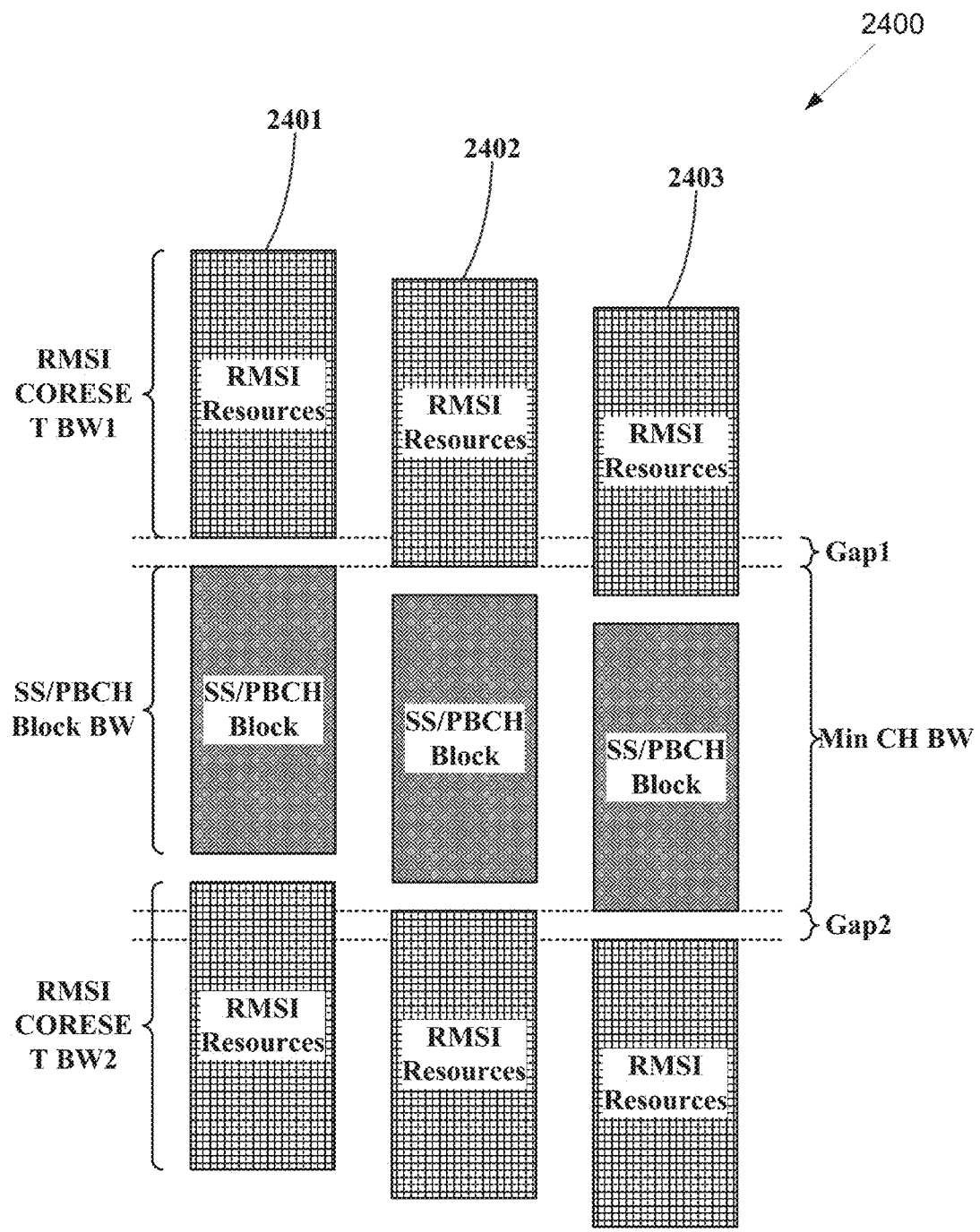
FIG. 24 illustrates an example configuration of frequency offset for a fifth case of FDM multiplexing pattern according to embodiments of the present disclosure.

FIG. 24 illustrates an example configuration of frequency offset 2400 for a fifth case of FDM multiplexing pattern according to embodiments of the present disclosure. The embodiment of the configuration of frequency offset 2400 illustrated in FIG. 24 is for illustration only. FIG. 24 does not limit the scope of this disclosure to any particular implementation.

As illustrated in FIGS. 24, 2401, 2402, and 2403 are all examples of relative location of SS/PBCH block considered in the embodiment. In this embodiment, the total RMSI CORESET BW is defined as the summation of the BW of two blocks (e.g. RMSI CORESET BW=RMSI CORESET BW 1+RMSI CORESET BW 2), in order to be consistent with the previous definition. In this embodiment, the frequency center of RMSI CORESET BW can refer to center of whole frequency range including RMSI CORESET BW 1, RMSI CORESET BW 2, ΔGap1, ΔGap2, and SS/PBCH block BW.

In one consideration, RMSI CORESET BW 1 and RMSI CORESET BW 2 are fixed and with equal value to reduce the overhead in spec. In another consideration, the gaps ΔGap1 and ΔGap2 are determined with ΔGap1+ΔGap2=12 REs and aligned with the RE-level offset values to enable floating sync (for example, if RE-level offset is defined as −6:1:5 or −6:1:6, ΔGap1=6 REs and ΔGap2=6 REs; if the RE-level offset is defined as 0:1:11 or 0:1:12, ΔGap1=0 REs and ΔGap2=12 REs; if the RE-level offset is defined as −11:1:0, ΔGap1=11 REs and ΔGap2=1 REs; if the RE-level offset is defined as −12:1:0, ΔGap1=12 REs and ΔGap2=0 REs). In this embodiment, the frequency offset reference can be determined as F_ref=(ΔGap1−ΔGap2)/2+(RMSI CORESET BW 1−RMSI CORESET BW 2)/2, and the frequency offset range for ΔF' can be determined as ΔF'_Range in PRB=0 (which means relative position is fixed in PRB level) where ΔF'_Range is defined in RMSI CORESET numerology.

In a third embodiment of FDM Sub-case 2 (e.g. FDM-Embodiment 2.3), the frequency location of SS/PBCH block can be within the min channel BW, and multiple RMSI CORESET blocks (e.g. 2 blocks on each side of SS/PBCH block) can also be multiplexed (partially) within the min channel BW with potential predefined constant gap ΔGap1 and ΔGap2 (both defined in RMSI CORESET numerology) in the frequency domain, wherein SS/PBCH block has a potential further offset to be indicated as large as at most 1 PRB in term of the RMSI CORESET numerology (this one PRB is utilized for the functionality of floating sync indicating the possible offset between SS/PBCH block PRB boundary and RMSI CORESET PRB boundary).

Figure 25:
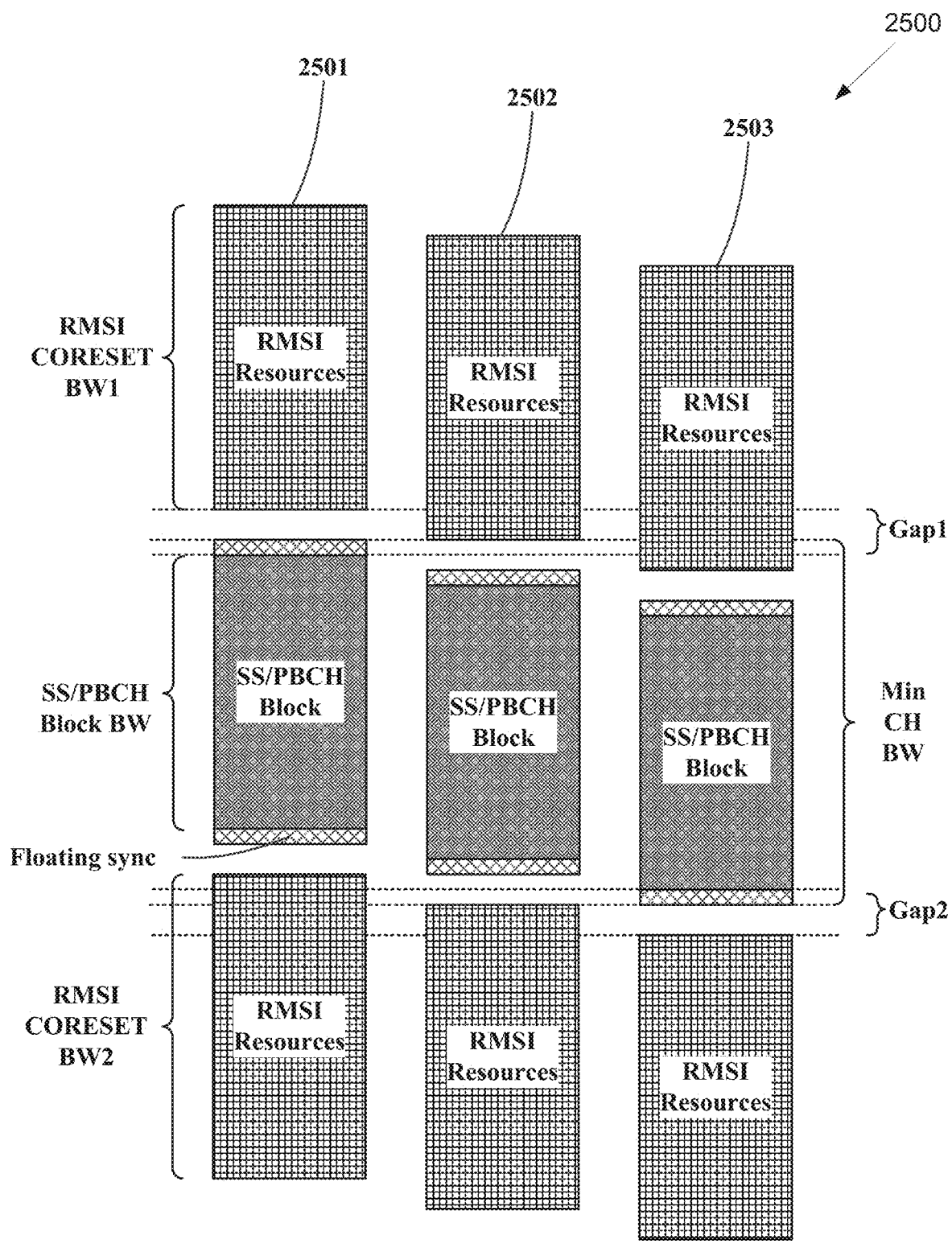
FIG. 25 illustrates an example configuration of frequency offset for a sixth case of FDM multiplexing pattern according to embodiments of the present disclosure.

FIG. 25 illustrates an example configuration of frequency offset 2500 for a sixth case of FDM multiplexing pattern according to embodiments of the present disclosure. The embodiment of the configuration of frequency offset 2500 illustrated in FIG. 25 is for illustration only. FIG. 25 does not limit the scope of this disclosure to any particular implementation.

As illustrated in FIGS. 25, 2501, 2502, and 2503 are all examples of relative location of SS/PBCH block considered in the embodiment. In this embodiment, the total RMSI CORESET BW is defined as the summation of the BW of two blocks (e.g. RMSI CORESET BW=RMSI CORESET BW 1+RMSI CORESET BW 2), in order to be consistent with the previous definition. In this embodiment, the frequency center of RMSI CORESET BW can refer to center of whole frequency range including RMSI CORESET BW 1, RMSI CORESET BW 2, ΔGap1, ΔGap2, and SS/PBCH block BW.

In one consideration, RMSI CORESET BW 1 and RMSI CORESET BW 2 are fixed and with equal value to reduce the overhead in spec. In another consideration, the gaps ΔGap1 and ΔGap2 are determined with ΔGap1+ΔGap2=12 REs and aligned with the RE-level offset values to enable floating sync (for example, if RE-level offset is defined as −6:1:5 or −6:1:6, ΔGap1=6 REs and ΔGap2=6 REs; if the RE-level offset is defined as 0:1:11 or 0:1:12, ΔGap1=0 REs and ΔGap2=12 REs; if the RE-level offset is defined as −11:1:0, ΔGap1=11 REs and ΔGap2=1 REs; if the RE-level offset is defined as −12:1:0, ΔGap1=12 REs and ΔGap2=0 REs). In this embodiment, the frequency offset reference can be determined as F_ref=(ΔGap1-ΔGap2)/2+(RMSI CORESET BW 1−RMSI CORESET BW 2)/2, and the frequency offset range for ΔF' can be determined as ΔF'_Range in PRB=1 where ΔF'_Range is defined in RMSI CORESET numerology.

Configuration Methodology and Principles.

The methodology of configuring the at least one of above components can be according to the following embodiments.

In one embodiment, each of the above components can be expressed in bits. For example, for Component i, 1≤i≤5, N_Component_i bits are used to configure the corresponding configurations, and the total number of bits within MIB for the RMSI CORESET configuration is given by N_Component_1+N_Component_2+N_Component_3+N_Component_4+N_Component_5.

In another embodiment, combinations of the above components can be expressed in an example of tables. Each RMSI CORESET configuration is represented by a row or a column in the table, which contains the information from all the components.

In yet another embodiment, a hybrid configuration methodology using both bits and table can be utilized for RMSI CORESET configuration. For example, some of the components, or some parameters in the above components can be expressed in bits separately, and the combinations of the remaining components or part of the components can be expressed in a table or in multiple tables.

Note that in the methodology of using a table or partially using a table to express the RMSI CORESET configuration, the main motivation is to save the total number of bits within the MIB. For example, the number of bits to indicate the frequency offset can be quite different for different TDM and FDM embodiments, then using a uniform number of bits to configure may not be efficient. The following principles are considered when trying to limit the number of combinations of the components.

In one principle, the number of bits utilized for separate configuration can be minimized, unless the configuration can be totally decoupled, or separate configuration does not cause any increase on the total number of bits.

In another principle, the supported combination of numerologies of SS/PBCH block and RMSI CORESET can be limited such that smaller number of configurations is required. One or combination of multiple of the following examples is considered.

In one example, the combination of SCS_SS=240 kHz and SCS_CORESET=60 kHz can be not supported for all scenarios.

In another example, the combination of SCS_SS=240 kHz and SCS_CORESET=60 kHz can be not supported at least for TDM cases.

In another example, the combination of SCS_SS=240 kHz and SCS_CORESET=60 kHz can be not supported at least for FDM cases.

In yet another example, for FDM cases, only the combination of SCS_SS=SCS_CORESET can be supported.

In yet another principle, the RMSI CORESET BW can be with certain limitation, possibly related to the RMSI CORESET numerology. One or combination of multiple of the following examples is considered.

In one example, the RMSI CORESET BW can be at least 24 PRBs in term of SS/PBCH block numerology, and at most 48 PRBs in term of SS/PBCH block numerology.

In another example, the RMSI CORESET BW can be at least 24 PRBs in term of SS/PBCH block numerology, and at most 48 PRBs in term of SS/PBCH block numerology, at least for TDM cases.

In yet another example, the RMSI CORESET BW can be at least 12 PRBs in term of SS/PBCH block numerology, and at most 24 PRBs in term of SS/PBCH block numerology, at least for FDM cases.

In yet another example, the RMSI CORESET BW can be only 24 PRBs in term of SS/PBCH block numerology, at least for FDM cases.

In yet another principle, the number of symbols for RMSI CORESET can be with certain limitation, possibly related to the RMSI CORESET numerology and/or SS/PBCH numerology and/or RMSI CORESET BW. One or combination of multiple of the following examples is considered.

In one example, the number symbols for RMSI CORESET can be either 1 or 2 if the RMSI CORESET BW is 24 PRBs in term of RMSI CORESET numerology.

In another example, the number symbols for RMSI CORESET can be 1 or 2 if the RMSI CORESET BW is 48 PRBs in term of RMSI CORESET numerology.

In yet another example, the number symbols for RMSI CORESET can be 1 if the RMSI CORESET BW is 96 PRBs in term of RMSI CORESET numerology.

In yet another example, the number of symbols for RMSI CORESET can equal to R_SCS, where R_SCS is the ratio between SS/PBCH SCS and RMSI CORESET SCS (occupying some blank symbols before SS block within a slot where SS/PBCH blocks are mapped into).

In yet another example, the number of symbols for RMSI CORESET can equal to 2*R_SCS, where R_SCS is the ratio between SS/PBCH SCS and RMSI CORESET SCS (occupying some blank symbols before SS block within a slot where SS/PBCH blocks are mapped into).

In yet another principle, when determining the frequency offset, the relative position of SS/PBCH block, RMSI CORESET, and min channel BW can be limited such that the required number of configurations can be minimized. One or combination of multiple of the following examples is considered.

For one example, for TDM Sub-case 1, TDM-Embodiment 1.2 or TDM-Embodiment 1.3 can be considered to reduce the number of configurations comparing to TDM-Embodiment 1.1.

For another example, for TDM Sub-case 2, TDM-Embodiment 2.2 or TDM-Embodiment 2.3 can be considered to reduce the number of configurations comparing to TDM-Embodiment 2.1.

For yet another example, for FDM cases, FDM-Embodiment 1.2 or FDM-Embodiment 1.3 can be considered to reduce the number of configurations comparing to FDM-Embodiment 1.1.

For yet another example, for FDM cases, FDM-Embodiment 2.2 or FDM-Embodiment 2.3 can be considered to reduce the number of configurations comparing to FDM-Embodiment 2.1.

Other principles for the methodology of using a table or partially using a table to express the RMSI CORESET configuration are also considered in the present disclosure.

In one other principle, the table of the configuration for the RMSI CORESET can be defined per band, or per group of band using the same SS/PBCH numerology, or per SS/PBCH numerology. Note that the maximum number of configurations for different SS/PBCH numerologies (if the maximum number of configurations are different) determines the number of bits required to represent the table. In another embodiment, a common table of the configuration for the RMSI CORESET can be defined for all bands and all SS/PBCH numerologies, although there may be some waste of configurations due to different number of configurations for different band or different SS/PBCH numerologies (e.g. the number of configurations in the common may be larger than any of the separate table for each SS/PBCH numerology).

In another other principle, the table of the configuration for the RMSI CORESET can contain one or more entries from TDM case (e.g. can be from one or multiple sub-cases), as well as one or more entries from FDM case (e.g. can be from one or multiple sub-cases). For each of the case, the configurations can be determined correspondingly (e.g. configuration group for each multiplexing case), and the total number of configurations in the table is the summation of all the configurations from all the groups, and depends on which particular multiplexing cases are supported.

In yet another other principle, part or all of the components considered in the disclosure can be jointly coded using a table or multiple tables, and each of the remaining components (if there are remaining components) may have at least one separate field (maybe multiple fields to consider further sub-components within a component) to be coded independently. The components jointly coded in the table may contain at least one of: Multiplexing pattern (may not explicitly show up if can be clearly indicated by combination of other components), RMSI CORESET numerology, RMSI CORESET BW, Number of RMSI CORESET symbols, PRB-level frequency offset (only present for double-field configuration scheme), RE-level frequency offset, Frequency offset, and Timing offset.

The dependency relationship is (the dependency still holds even the component is not jointly coded in the table), after knowing the Multiplexing pattern (or timing offset) and RMSI CORESET numerology, the configurations for RMSI CORESET BW, and Number of RMSI CORESET symbols can be determined, and all these except for the timing offset and Number of RMSI CORESET symbols determines the configuration of frequency offset (PRB-level frequency offset and RE-level frequency offset).

In yet another other principle, if using a table scheme or partially using a table scheme, and the configuration does not fully utilize all the codewords in some table, the one of the spare/reserved codewords can be utilized to indicate no RMSI and CORESET of the one of the spare/reserved codewords associated with the SS/PBCH block, and no separate bit in MIB is required to indicate this information.

For example, if using double-field frequency offset indication, and the number of configurations for RE-level offset $\Delta F1$ is 12, one of the 4 reserved codewords (e.g. 1111) could be utilized for indicating no RMSI and CORESET of the one of the 4 reserved codewords associated with the SS/PBCH block. For another example, if using double-field frequency offset indication, and the number of configurations for RE-level offset $\Delta F1$ is 24, one of the 8 reserved codewords (e.g. 11111) could be utilized for indicating no RMSI and CORESET of the one of the 8 reserved codewords associated with the SS/PBCH block.

For another example, if using double-field frequency offset indication, and the number of configurations for PRB-level offset $\Delta F2$ is smaller than $2^{x2}$, where x2 is the number of bits to express $\Delta F2$, one of the unused/reserved codewords (e.g. all 1 codeword with length x2) could be utilized for indicating no RMSI and CORESET of the one of the unused/reserved codewords associated with the SS/PBCH block.

For yet another example, if using single-field frequency offset indication, and the number of configurations for RE-level offset $\Delta F$ is smaller than $2^x$, where x is the number of bits to express $\Delta F$, one of the unused/reserved codewords (e.g. all 1 codeword with length x) could be utilized for indicating no RMSI and CORESET of the one of the unused/reserved codewords associated with the SS/PBCH block.

For yet another example, if using a joint coding of CORESET BW and number of symbols, and the number of configurations is smaller than $2^y$, where y is the total number of bits for this indication (e.g. y=1 or 2), one of the unused/reserved codewords (e.g. all 1 codeword with length y) could be utilized for indicating no RMSI and CORESET of the one of the unused/reserved codewords associated with the SS/PBCH block.

Configuration Approaches and Examples

The following examples of configuration schemes, according to the above principles of methodology, can be considered for indicating the frequency offset, which can be utilized for any of the above TDM/FDM embodiments. In one embodiment, all bands (e.g. for both <6 and >6 GHz) utilize the same configuration scheme. In another embodiment, the configuration scheme can be chosen per band.

In a first scheme (e.g. scheme 1), the frequency offset can be configured by two parts/fields (double-fields configuration scheme): first configuration is the RE-level offset between SS/PBCH block and RMSI CORESET PRB grid (e.g. RE offset as defined in floating sync), and the second configuration is the PRB-level offset between SS/PBCH block and RMSI resources.

In a first approach of the first scheme (e.g. scheme 1a), the RE offset $\Delta F1$ and PRB offset $\Delta F2$ are measured in the granularity of and expressed in a SS/PBCH RE and PRB correspondingly, (i.e., the unit of possible values of $\Delta F1$ and $\Delta F2$ is a SS/PBCH RE and PRB correspondingly).

Then the total number of possible values of $\Delta F1$ in RE and $\Delta F2$ in PRB, i.e., $N\_\Delta F1$ and $N\_\Delta F2$, can be determined as: $N\_\Delta F1 = N\_RE\_PRB/R\_SCS$ (asymmetric RE location), or $N\_\Delta F1 = N\_RE\_PRB/R\_SCS+1$ (symmetric RE location), and $N\_\Delta F2 = \Delta F'\_Range$ in PRB/R_SCS+1, for TDM case, and $N\_\Delta F2 = \Delta F'\_Range$ in PRB/R_SCS, for FDM case where $R\_SCS = SCS\_SS/SCS\_CORESET$, and the possible values of $\Delta F1$ and $\Delta F2$ can be determined as (1) $\Delta F1$ with asymmetric RE location: $-(N\_\Delta F1-2)/2$, $-(N\_\Delta F1-4)/2$, ..., $(N\_\Delta F1-2)/2$, $N\_\Delta F1/2$ or $-N\_\Delta F1/2$, $-(N\_\Delta F1-2)/2$, ..., $(N\_\Delta F1-2)/2$ or 0, 1, ..., $N\_\Delta F1-1$ or $-(N\_\Delta F1-1)$, ..., $-1$, 0 (also denoted as $-(N\_\Delta F1-2)/2$:1:$N\_\Delta F1/2$ or $-N\_\Delta F1/2$:1:$(N\_\Delta F1-2)/2$ or 0:1:$N\_\Delta F1-1$ or $-(N\_\Delta F1-1)$:1:0); (2) $\Delta F1$ with symmetric RE location: $-(N\_\Delta F1-1)/2$, $-(N\_\Delta F1-3)/2$, ..., $(N\_\Delta F1-3)/2$, $(N\_\Delta F1-1)/2$ (also denoted as $-(N\_\Delta F1-1)/2$:1:$(N\_\Delta F1-1)/2$). Note that in this configuration of symmetric RE location, one of the RE location configuration is not essential; or (3) ΔF2: −(N_ΔF2−1)/2, −(N_ΔF2−3)/2, . . . , (N_ΔF2−3)/2, (N_ΔF2−1)/2 (also denoted as −(N_ΔF2−1)/2:1:(N_ΔF2−1)/2). If N_ΔF2=0 or 1, possible value for ΔF2 is 0 (refers to a fixed value and no need to configure).

The final frequency offset ΔF can be determined per TDM/FDM embodiments, taking into account the frequency offset reference within the offset as in TABLE 1, where ΔF=ΔF'+F_ref and ΔF'=ΔF1+ΔF2*N_RE_PRB (where N_RE_PRB=12 regardless of the numerology).

TABLE 1

Determination of ΔF in different multiplexing cases using scheme 1a

| | ΔF in the unit of RE with SS block numerology | Notes |
|---|---|---|
| TDM-Embodiment 1.1 | ΔF1 + ΔF2* N_RE_PRB | |
| TDM-Embodiment 1.2 | ΔF1 + ΔF2* N_RE_PRB | |
| TDM-Embodiment 1.3 | ΔF1 + ΔF2* N_RE_PRB | |
| TDM-Embodiment 2.1 | ΔF1 + ΔF2* N_RE_PRB | |
| TDM-Embodiment 2.2 | ΔF1 + ΔF2* N_RE_PRB + ΔCORESET_BW_Offset in RE/R_SCS | ΔCORESET_BW_Offset is the predefined offset between centers of RMSI CORESET BW and Restricted BW as defined in TDM-Embodiment 2.2 (in RMSI CORESET numerology) |
| TDM-Embodiment 2.3 | ΔF1 + ΔF2* N_RE_PRB + ΔCORESET_BW_Offset in RE/R_SCS | ΔCORESET_BW_Offset is the predefined offset between centers of RMSI CORESET BW and Restricted BW as defined in TDM-Embodiment 2.3 (in RMSI CORESET numerology) |
| FDM-Embodiment 1.1 | ΔF1 + ΔF2* N_RE_PRB + ΔGap in RE/R_SCS + RMSI CORESET BW in RE/2/R_SCS + Min CH BW in RE/2 and/or ΔF1 + ΔF2* N_RE_PRB − (ΔGap' in RE/R_SCS + RMSI CORESET BW in RE/2/R_SCS + Min CH BW in RE/2) | ΔGap and ΔGap' are the predefined frequency gap between RMSI resources and min channel BW as defined in FDM-Embodiment 1.1 (in RMSI CORESET numerology) |
| FDM-Embodiment 1.2 | ΔF1 + ΔF2* N_RE_PRB + ΔGap in RE/R_SCS + RMSI CORESET BW in RE/2/R_SCS + SS/PBCH block BW in RE/2 and/or ΔF1 + ΔF2* N_RE_PRB − (ΔGap' in RE/R_SCS + RMSI CORESET BW in RE/2/R_SCS + SS/PBCH block BW in RE/2) | ΔGap and ΔGap' are the predefined frequency gap between RMSI resources and SS/PBCH block as defined in FDM-Embodiment 1.2 (in RMSI CORESET numerology) |
| FDM-Embodiment 1.3 | ΔF1 + ΔF2* N_RE_PRB + ΔGap in RE/R_SCS + RMSI CORESET BW in RE/2/R_SCS + SS/PBCH block BW in RE/2 and/or ΔF1 + ΔF2* N_RE_PRB − (ΔGap' in RE/R_SCS + RMSI CORESET BW in RE/2/R_SCS + SS/PBCH block BW in RE/2) | ΔGap and ΔGap' are the predefined frequency gap between RMSI resources and SS/PBCH block as defined in FDM-Embodiment 1.3 (in RMSI CORESET numerology) |
| FDM-Embodiment 2.1 | ΔF1 + ΔF2* N_RE_PRB + (ΔGap1 in RE − ΔGap2 in RE)/2/R_SCS + (RMSI CORESET BW 1 in RE − RMSI CORESET BW 2 in RE)/2/R_SCS | ΔGap1 and ΔGap2 are the predefined frequency gaps between RMSI resources and min channel BW as defined in FDM-Embodiment 2.1 (in RMSI CORESET numerology) |
| FDM-Embodiment 2.2 | ΔF1 + ΔF2* N_RE_PRB + (ΔGap1 in RE − ΔGap2 in RE)/2/R_SCS + (RMSI CORESET BW 1 in RE − RMSI CORESET BW 2 in RE)/2/R_SCS | ΔGap1 and ΔGap2 are the predefined frequency gaps between RMSI resources and SS/PBCH block as defined in FDM-Embodiment 2.2 (in RMSI CORESET numerology) |
| FDM-Embodiment 2.3 | ΔF1 + ΔF2* N_RE_PRB + (ΔGap1 in RE − ΔGap2 in RE)/2/R_SCS + (RMSI CORESET BW 1 in RE − RMSI CORESET BW 2 in RE)/2/R_SCS | ΔGap1 and ΔGap2 are the predefined frequency gaps between RMSI resources and SS/PBCH block as defined in FDM-Embodiment 2.3 (in RMSI CORESET numerology) |

In a second approach of the first scheme (e.g. Scheme 1b), the RE offset ΔF1 and PRB offset ΔF2 are measured in the granularity of and expressed in a RMSI CORESET RE and PRB correspondingly, (i.e., the unit of possible values of ΔF1 and ΔF2 is a RMSI CORESET RE and PRB correspondingly). Then, the total number of possible values of ΔF1 in RE and ΔF2 in PRB, i.e., N_ΔF1 and N_ΔF2 correspondingly, can be determined as: N_ΔF1=N_RE_PRB (asymmetric RE location); or N_ΔF1=N_RE_PRB+1 (symmetric RE location); and N_ΔF2=ΔF'_Range in PRB+1, for TDM case; and N_ΔF2=ΔF'_Range in PRB, for FDM case.

Possible values of ΔF1 and ΔF2 can be determined as (1) ΔF1 with asymmetric RE location: −(N_ΔF1−2)/2, −(N_ΔF1−4)/2, . . . , (N_ΔF1−2)/2, N_ΔF1/2 or −N_ΔF1/2, −(N_ΔF1−2)/2, . . . , (N_ΔF1−2)/2 or 0, 1, . . . , N_ΔF1−1 or −(N_ΔF1−1), . . . , −1, 0 (also denoted as −(N_ΔF1−2)/2:1:N_ΔF1/2 or −N_ΔF1/2:1:(N_ΔF1−2)/2 or 0:1:N_ΔF1−1 or −(N_ΔF1−1):1:0); (2) ΔF1 with symmetric RE location: −(N_ΔF1−1)/2, −(N_ΔF1−3)/2, . . . , (N_ΔF1−3)/2, (N_ΔF1−1)/2 (also denoted as −(N_ΔF1−1)/2:1:(N_ΔF1−1)/2). Note that in this configuration of symmetric RE location, one of the RE location configuration is not essential; or (3) ΔF2: −(N_ΔF2−1)/2, −(N_ΔF2−3)/2, . . . , (N_ΔF2−3)/2, (N_ΔF2−1)/2 (also denoted as −(N_ΔF2−1)/2:1:(N_ΔF2−1)/2). If N_ΔF2=0 or 1, possible value for ΔF2 is 0 (refers to a fixed value and no need to configure).

The final frequency offset ΔF can be determined per TDM/FDM embodiments, taking into account the frequency offset reference within the offset as in TABLE 2, where ΔF=ΔF'+F_ref and ΔF'=ΔF1+ΔF2*N_RE_PRB (where N_RE_PRB=12 regardless of the numerology).

TABLE 2

Determination of ΔF in different multiplexing cases using Scheme 1b

| | ΔF in the unit of RE with RMSI CORESET numerology | Notes |
|---|---|---|
| TDM-Embodiment 1.1 | ΔF1 + ΔF2* N_RE_PRB | |
| TDM-Embodiment 1.2 | ΔF1 + ΔF2* N_RE_PRB | |
| TDM-Embodiment 1.3 | ΔF1 + ΔF2* N_RE_PRB | |
| TDM-Embodiment 2.1 | ΔF1 + ΔF2* N_RE_PRB | |
| TDM-Embodiment 2.2 | ΔF1 + ΔF2* N_RE_PRB + ΔCORESET_BW_Offset in RE | ΔCORESET_BW_Offset is the predefined offset between centers of RMSI CORESET BW and Restricted BW as defined in TDM-Embodiment 2.2 (in RMSI CORESET numerology) |
| TDM-Embodiment 2.3 | ΔF1 + ΔF2* N_RE_PRB + ΔCORESET_BW_Offset in RE | ΔCORESET_BW_Offset is the predefined offset between centers of RMSI CORESET BW and Restricted BW as defined in TDM-Embodiment 2.3 (in RMSI CORESET numerology) |
| FDM-Embodiment 1.1 | ΔF1 + ΔF2* N_RE_PRB + ΔGap in RE + RMSI CORESET BW in RE/2 + Min CH BW in RE/2* R_SCS and/or ΔF1 + ΔF2* N_RE_PRB − (ΔGap' in RE + RMSI CORESET BW in RE/2 + Min CH BW in RE/2* R_SCS) | ΔGap and ΔGap' are the predefined frequency gap between RMSI resources and min channel BW as defined in FDM-Embodiment 1.1 (in RMSI CORESET numerology) |
| FDM-Embodiment 1.2 | ΔF1 + ΔF2* N_RE_PRB + ΔGap in RE + RMSI CORESET BW in RE/2 + SS/PBCH block BW in RE/2* R_SCS and/or ΔF1 + ΔF2* N_RE_PRB − (ΔGap' in RE + RMSI CORESET BW in RE/2 + SS/PBCH block BW in RE/2* R_SCS) | ΔGap and ΔGap' are the predefined frequency gap between RMSI resources and SS/PBCH block, and (RMSI CORESET BW/2 + ΔGap + SS/PBCH block BW*R_SCS/2) and/or −(RMSI CORESET BW/2 + ΔGap' + SS/PBCH block BW*R_SCS/2) are the frequency offset references as defined in FDM-Embodiment 1.2 (in RMSI CORESET numerology) |
| FDM-Embodiment 1.3 | ΔF1 + ΔF2* N_RE_PRB + ΔGap in RE + RMSI CORESET BW in RE/2 + SS/PBCH block BW in RE/2* R_SCS and/or ΔF1 + ΔF2* N_RE_PRB − (ΔGap' in RE + RMSI CORESET BW in RE/2 + SS/PBCH block BW in RE/2* R_SCS) | ΔGap and ΔGap' are the predefined frequency gap between RMSI resources and SS/PBCH block, and (RMSI CORESET BW/2 + ΔGap + SS/PBCH block BW*R_SCS/2) and/or −(RMSI CORESET BW/2 + ΔGap' + SS/PBCH block BW*R_SCS/2) are the frequency offset references as defined in FDM-Embodiment 1.3 (in RMSI CORESET numerology) |
| FDM-Embodiment 2.1 | ΔF1 + ΔF2* N_RE_PRB + (ΔGap1 in RE − ΔGap2 in RE)/2 + (RMSI CORESET BW 1 in RE − RMSI CORESET BW 2 in RE)/2 | ΔGap1 and ΔGap2 are the predefined frequency gaps between RMSI resources and min channel BW as defined in FDM-Embodiment 2.1 (in RMSI CORESET numerology) |

TABLE 2-continued

Determination of ΔF in different multiplexing cases using Scheme 1b

| | ΔF in the unit of RE with RMSI CORESET numerology | Notes |
|---|---|---|
| FDM-Embodiment 2.2 | ΔF1 + ΔF2* N_RE_PRB + (ΔGap1 in RE − ΔGap2 in RE)/2 + (RMSI CORESET BW 1 in RE − RMSI CORESET BW 2 in RE)/2 | ΔGap1 and ΔGap2 are the predefined frequency gaps between RMSI resources and SS/PBCH block as defined in FDM-Embodiment 2.2 (in RMSI CORESET numerology) |
| FDM-Embodiment 2.3 | ΔF1 + ΔF2* N_RE_PRB + (ΔGap1 in RE − ΔGap2 in RE)/2 + (RMSI CORESET BW 1 in RE − RMSI CORESET BW 2 in RE)/2 | ΔGap1 and ΔGap2 are the predefined frequency gaps between RMSI resources and SS/PBCH block as defined in FDM-Embodiment 2.3 (in RMSI CORESET numerology) |

In a third approach of the first scheme (e.g. Scheme 1c), the RE offset ΔF1/PRB offset ΔF2 are measured in the granularity of and expressed in a smaller one between SS/PBCH block RE/PRB and RMSI CORESET RE/PRB correspondingly. Then the total number of possible values of ΔF1 in RE and ΔF2 in PRB, i.e., N_ΔF1 and N_ΔF2 correspondingly, can be determined as: N_ΔF1=N_RE_PRB/min(R_SCS,1) (asymmetric RE location); or N_ΔF1=N_RE_PRB/min(R_SCS,1)+1 (symmetric RE location); and N_ΔF2=ΔF'_Range in PRB/min(R_SCS, 1)+1, for TDM case; and N_ΔF2=ΔF'_Range in PRB/min (R_SCS,1), for FDM case where R_SCS=SCS_SS/SCS_CORESET.

The possible values of ΔF1 and ΔF2 can be determined as (1) ΔF1 with asymmetric RE location: −(N_ΔF1−2)/2, −(N_ΔF1−4)/2, ..., (N_ΔF1−2)/2, N_ΔF1/2 or −N_ΔF1/2, −(N_ΔF1−2)/2, ..., (N_ΔF1−2)/2 or 0, 1, ..., N_ΔF1−1 or −(N_ΔF1−1), ..., −1, 0 (also denoted as −(N_ΔF1−2)/2:1:N_ΔF1/2 or −N_ΔF1/2:1:(N_ΔF1−2)/2 or 0:1:N_ΔF1−1 or −(N_ΔF1−1):1:0); (2) ΔF1 with symmetric RE location: −(N_ΔF1−1)/2, −(N_ΔF1−3)/2, ..., (N_ΔF1−3)/2, (N_ΔF1−1)/2 (also denoted as −(N_ΔF1−1)/2:1:(N_ΔF1−1)/2). Note that in this configuration of symmetric RE location, one of the RE location configuration is not essential; (3) ΔF2: −(N_ΔF2−1)/2, −(N_ΔF2−3)/2, ..., (N_ΔF2−3)/2, (N_ΔF2−1)/2 (also denoted as −(N_ΔF2−1)/2:1:(N_ΔF2−1)/2). If N_ΔF2=0 or 1, possible value for ΔF2 is 0 (refers to a fixed value and no need to configure).

The final frequency offset ΔF can be determined per TDM/FDM embodiments, taking into account the frequency offset reference within the offset, where ΔF=ΔF'+F_ref and ΔF'=ΔF1+ΔF2*N_RE_PRB (where N_RE_PRB=12 regardless of the numerology).

In a fourth approach of the first scheme (e.g. Scheme 1d), the RE offset ΔF1 and PRB offset ΔF2 are expressed in a RMSI CORESET RE and PRB correspondingly, (i.e., the unit of ΔF1 and ΔF2 is a RMSI CORESET RE and PRB correspondingly).

In a first example of the granularity of ΔF2, the granularity of ΔF2 is same as a SS/PBCH PRB (e.g. no need to indicate granularity smaller than a SS/PBCH PRB if RMSI CORESET SCS is smaller than SS/PBCH SCS). Then, the total number of possible values of ΔF2 in PRB, i.e., N_ΔF2, can be determined as N_ΔF2=ΔF'_Range in PRB/R_SCS+1, for TDM case, and N_ΔF2=ΔF'_Range in PRB/R_SCS, for FDM case where R_SCS=SCS_SS/SCS_CORESET (ratio between SS/PBCH SCS and CORESET SCS), and the possible values of ΔF2 can be determined as −(N_ΔF2−1)*R_SCS/2, −(N_ΔF2−3)*R_SCS/2, ..., (N_ΔF2−3)*R_SCS/2, (N_ΔF2−1)*R_SCS/2 (also denoted as −(N_ΔF2−1)*R_SCS/2:R_SCS:(N_ΔF2−1)*R_SCS/2). If N_ΔF2=0 or ≤1, possible value for ΔF2 is 0 (refers to a fixed value and no need to configure).

In a second example of the granularity of ΔF2, the granularity of ΔF2 is same as the maximum of SS/PBCH PRB and RMSI CORESET PRB. Then, the total number of possible values of ΔF2 in PRB, i.e., N_ΔF2, can be determined as: N_ΔF2=ΔF'_Range in PRB/max(1,R_SCS)+1, for TDM case, and N_ΔF2=ΔF'_Range in PRB/max(1,R_SCS), for FDM case where R_SCS=SCS_SS/SCS_CORESET (ratio between SS/PBCH SCS and CORESET SCS), and the possible values of ΔF2 can be determined as −(N_ΔF2−1)*max(1,R_SCS)/2, −(N_ΔF2−3)*max(1,R_SCS)/2, ..., (N_ΔF2−3)*max(1,R_SCS)/2, (N_ΔF2−1)*max(1,R_SCS)/2 (also denoted as −(N_ΔF2−1)*max(1,R_SCS)/2:max(1,R_SCS):(N_ΔF2−1)*max(1,R_SCS)/2). If N_ΔF2=0 or ≤1, possible value for ΔF2 is 0 (refers to a fixed value and no need to configure).

In a third example of the granularity of ΔF2, the granularity of ΔF2 is same as a RMSI CORESET PRB (e.g. no need to indicate granularity smaller than a RMSI CORESET PRB if CORESET SCS is larger than SS/PBCH SCS). Then, the total number of possible values of ΔF2 in PRB, i.e., N_ΔF2, can be determined as: N_ΔF2=ΔF'_Range in PRB+1, for TDM case, and N_ΔF2=ΔF'_Range in PRB, for FDM case, where R_SCS=SCS_SS/SCS_CORESET (ratio between SS/PBCH SCS and CORESET SCS), and the possible values of ΔF2 can be determined as −(N_ΔF2−1)/2, −(N_ΔF2−3)/2, ..., (N_ΔF2−3)/2, (N_ΔF2−1)/2 (also denoted as −(N_ΔF2−1)/2:1:(N_ΔF2−1)/2). If N_ΔF2=0 or 1, possible value for ΔF2 is 0 (refers to a fixed value and no need to configure).

In a fourth example of the granularity of ΔF2, the granularity of ΔF2 is same as the minimum of SS/PBCH PRB and RMSI CORESET PRB. Then, the total number of possible values of ΔF2 in PRB, i.e., N_ΔF2, can be determined as: N_ΔF2=ΔF'_Range in PRB/min(1,R_SCS)+1, for TDM case, and N_ΔF2=ΔF'_Range in PRB/min(1,R_SCS), for FDM case, where R_SCS=SCS_SS/SCS_CORESET (ratio between SS/PBCH SCS and CORESET SCS), and the possible values of ΔF2 can be determined as −(N_ΔF2−1)*min(1,R_SCS)/2, −(N_ΔF2−3)*min(1,R_SCS)/2, ..., (N_ΔF2−3)*min(1,R_SCS)/2, (N_ΔF2−1)*min(1,R_SCS)/2 (also denoted as −(N_ΔF2−1)*min(1,R_SCS)/2:min(1,R_SCS):(N_ΔF2−1)*min(1,R_SCS)/2). If N_ΔF2=0 or ≤1, possible value for ΔF2 is 0 (refers to a fixed value and no need to configure).

In a fifth example of the granularity of ΔF2, the granularity of ΔF2 is same as one or multiple of RMSI CORESET PRBs (e.g. no need to indicate granularity smaller than a RMSI CORESET PRB if CORESET SCS is larger than SS/PBCH SCS since it has already been indicated in ΔF1 for RE offset), where the granularity Δf2 (can also be considered as "RMSI raster") is determined by the relationship between min CH BW and RMSI CORESET BW for TDM subcase 1, e.g. if RMSI CORESET BW is within min channel BW, Δf2=min CH BW in PRB in RMSI numerology—RMSI CORESET BW in PRB+PRB_CH_Raster, and determined by the relationship between carrier BW and RMSI CORESET BW for TDM subcase 2, e.g. if RMSI CORESET BW is larger than min channel BW, Δf2=carrier BW in RMSI numerology—RMSI CORESET BW+PRB_CH_Raster, and Δf2=1 for FDM cases (no PRB level indication is needed so the value of Δf2 does not matter), where PRB_CH_Raster is determined by the relationship between CORESET SCS, SS SCS and channel raster, and can be determined as follows PRB_CH_Raster=min(CH Raster/SCS_CORESET,1), which means when SCS_CORESET>CH Raster, no half PRB or smaller indication is required. A summary of examples for the determination of PRB_CH_Raster is in TABLE 3.

TABLE 3

Examples of determination of PRB_CH_Raster

| CH Raster | SCS_SS | SCS_CORESET | PRB_CH_Raster |
|---|---|---|---|
| 15 kHz, 100 kHz | 15 kHz | 15 kHz | 1 |
| 15 kHz, 100 kHz | 15 kHz | 30 kHz | 0.5 |
| 15 kHz, 100 kHz | 30 kHz | 30 kHz | 1 |
| 15 kHz, 100 kHz | 30 kHz | 15 kHz | 1 |
| 60 kHz | 120 kHz | 120 kHz | 1 |
| 60 kHz | 120 kHz | 60 kHz | 1 |
| 60 kHz | 240 kHz | 120 kHz | 1 |
| 60 kHz | 240 kHz | 60 kHz | 1 |

In this example, Δf2 represents the maximum frequency offset such that the same SS/PBCH block and RMSI CORESET multiplexing pattern can be used. Then, the total number of possible values of Δf2 in PRB, i.e., N_ΔF2, can be determined as: N_ΔF2=[Indication Range/Δf2], for TDM case, and N_ΔF2=1, for FDM case, where R_SCS=SCS_SS/SCS_CORESET (ratio between SS/PBCH SCS and CORESET SCS), and Indication Range corresponds to SS raster (e.g. =min CH BW−SS/PBCH block BW for some of the bands) in term of RMSI CORESET numerology for TDM case (number of relative SS/PBCH block locations within a min CH BW). The possible values of ΔF2 can be determined as −(ΔF' Range in PRB)/2: Δf2:(ΔF' Range in PRB)/2, when N_ΔF2>3, and the possible values of ΔF2 (if expressed as center offset) can be determined as −(ΔF' Range in PRB)/2 and +(ΔF'_Range in PRB)/2 if N_ΔF2=2 or −(ΔF' Range in PRB)/2+1 and +(ΔF'_Range in PRB)/2−1 if N_ΔF2=2, and the possible values of ΔF2 (if expressed as center offset) can be determined as 0 (refers to a fixed value and no need to configure), if N_ΔF2=1. ΔF' Range is determined in previous TDM and FDM embodiments.

This selection of possible values of ΔF2 assumes frequency range for SS/PBCH block is a subset of frequency range for RMSI CORESET, such that only the difference of their BW requires indication.

One possible variant to this example is, if there is no configuration of ΔF2=0 (if expressed as center offset), another configuration of ΔF2=0 can be introduced. The purpose of introducing the possible value 0 is for better measurement purpose.

Another possible variant to this example is, for FDM cases, even if N_ΔF2=1, there can still be two possible values for the reference, e.g. multiplexing on the top of bottom of the SS block with a potential gap.

Figure 26A:
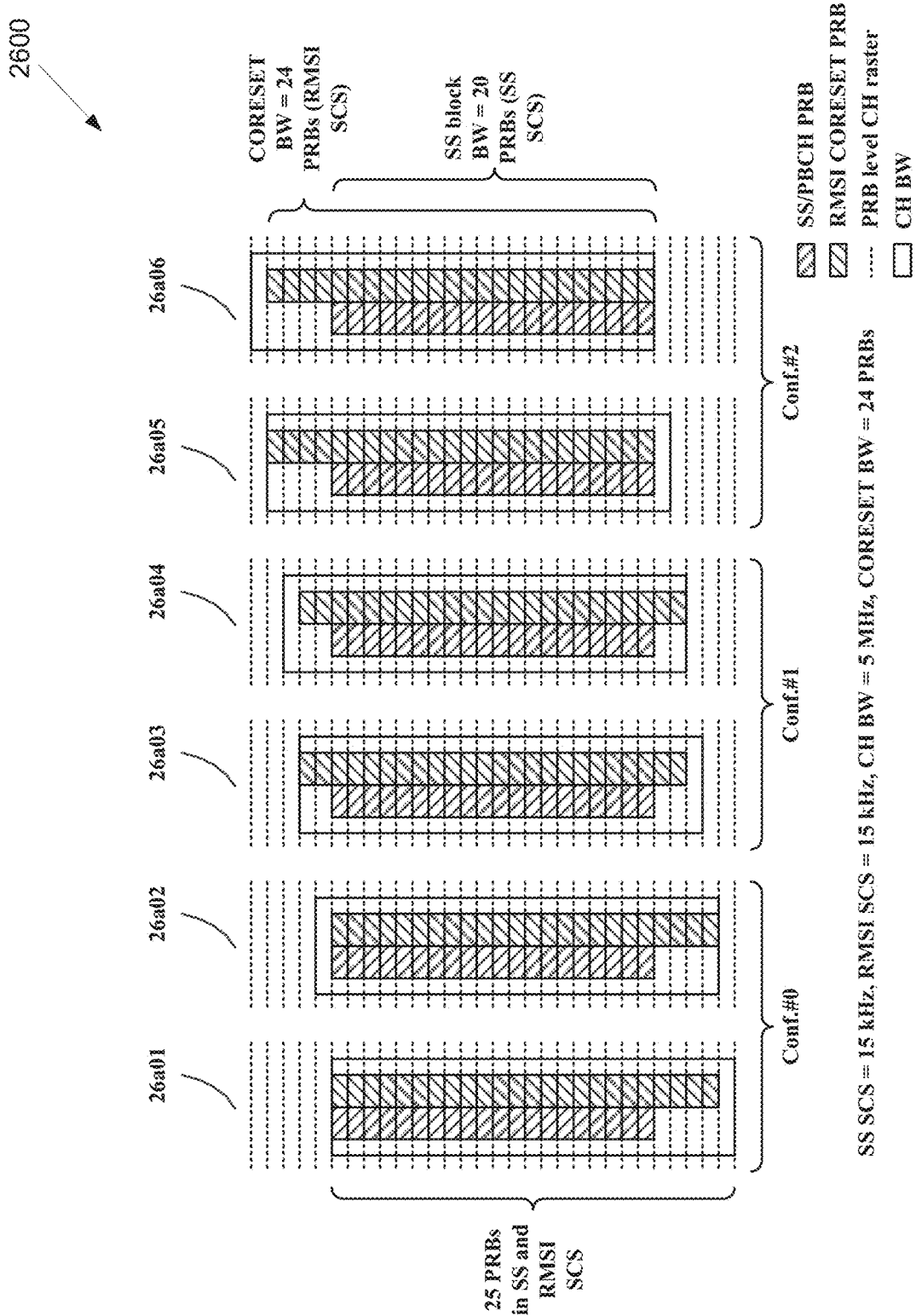
FIG. 26A illustrates an example configuration of ΔF2 in the case of {SS SCS, RMSI SCS, CH BW, CORESET BW}={15 kHz, 15 kHz, 5 MHz, 24 PRBs} according to embodiments of the present disclosure.

FIG. 26A illustrates an example configuration of ΔF2 2610 in the case of {SS SCS, RMSI SCS, CH BW, CORESET BW}={15 kHz, 15 kHz, 5 MHz, 24 PRBs} according to embodiments of the present disclosure. The embodiment of the configuration of ΔF2 2610 illustrated in FIG. 26A is for illustration only. FIG. 26A does not limit the scope of this disclosure to any particular implementation.

Examples of this approach (Scheme 1d) with the fifth example of the granularity of ΔF2, for TDM subcase-1, are illustrated in FIG. 26A, and a summary of the examples is in TABLE 4.

TABLE 4

Examples of configuration of ΔF2 for TDM subcase-1

| SS SCS (kHz) | CORESET SCS (kHz) | CORESET BW (PRB in CORESET numerology) | # configurations of frequency offset | Center frequency offset value in PRB of CORESET numerology ΔF2 | Edge frequency offset value in PRB of CORESET numerology ΔF2 |
|---|---|---|---|---|---|
| 15 | 15 | 24 | 3 | −2, 0, 2 | 4, 2, 0 |
| 15 | 30 | 12 | | Not supported unless 12 PRBs are available for CORESET | |
| 30 | 15 | 48 | 2 | −2, 2 | 4, 0 |
| 30 | 30 | 24 | 5 | −2, −1, 0, 1, 2 | 4, 3, 2, 1, 0 |
| 120 | 60 | 48 | 2 | −4, 4 | 8, 0 |
| 120 | 120 | 24 | 2 | −2, 2 | 4, 0 |
| 240 | 60 | 96 | 2 | −8, 8 | 16, 0 |
| 240 | 120 | 48 | 2 | −4, 4 | 8, 0 |

In a first example as in FIG. 26A, the TDM scenario of SCS_SS=15 kHz and SCS_CORESET=15 kHz and channel raster=15 kHz or 100 kHz is considered (min CH BW assumed as 5 MHz, which is 25 PRBs in both SS and RMSI numerology). In this case, if RMSI CORESET BW is 24 PRBs, Indication Range=5 PRBs, and Δf2=2 PRBs, so N_ΔF2=3, i.e., three configurations are sufficient to configure the PRB-level frequency offset between the centers/edges of SS block and RMSI CORESET, and the possible values can be −2, 0, 2 PRBs (center offset) or can be 4, 2, 0 PRBs (edge offset) in term of the RMSI CORESET numerology.

As illustrated in FIG. 26A, 26a01 and 26a02 use the same configuration #0 (ΔF2=−2 PRB for center offset or ΔF2=4

PRB for edge offset), 26*a*03 and 26*a*04 use the same configuration #1 (ΔF2=0 PRB for center offset or ΔF2=2 PRB for edge offset), and 26*a*05 and 26*a*06 use the same configuration #2 (ΔF2=2 PRB for center offset or ΔF2=0 PRB for edge offset).

Figure 26B:
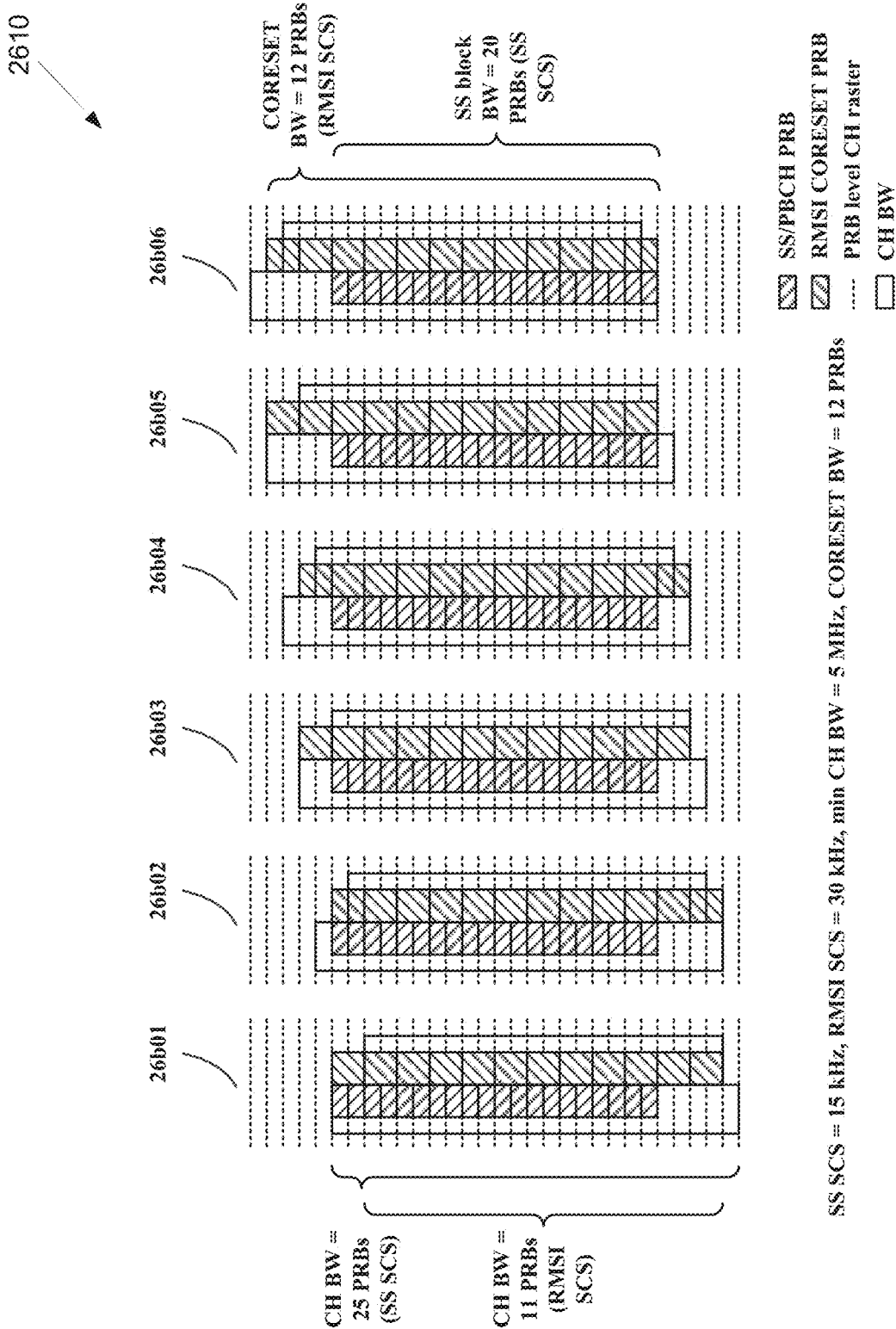
FIG. 26B illustrates an example configuration of ΔF2 in the case of {SS SCS, RMSI SCS, CH BW, CORESET BW}={15 kHz, 30 kHz, 5 MHz, 12 PRBs} according to embodiments of the present disclosure.

FIG. 26B illustrates an example configuration of ΔF2 2620 in the case of {SS SCS, RMSI SCS, CH BW, CORESET BW}={15 kHz, 30 kHz, 5 MHz, 12 PRBs} according to embodiments of the present disclosure. The embodiment of the configuration of ΔF2 2620 illustrated in FIG. 26B is for illustration only. FIG. 26B does not limit the scope of this disclosure to any particular implementation.

In a second example as in FIG. 26B, the scenario of SCS_SS=15 kHz and SCS_CORESET=30 kHz and channel raster=15 kHz or 100 kHz is considered (min CH BW assumed as 5 MHz, which is 25 PRBs in SS numerology and 11 PRBs for RMSI numerology). In this case, RMSI CORESET BW as 12 PRBs cannot be supported unless the channel utilization for 5 MHz BW with 30 kHz SCS can at least 12 PRBs. E.g. In FIG. 26B, there is no configuration available to fit CORESET within the min CH BW.

Figure 26C:
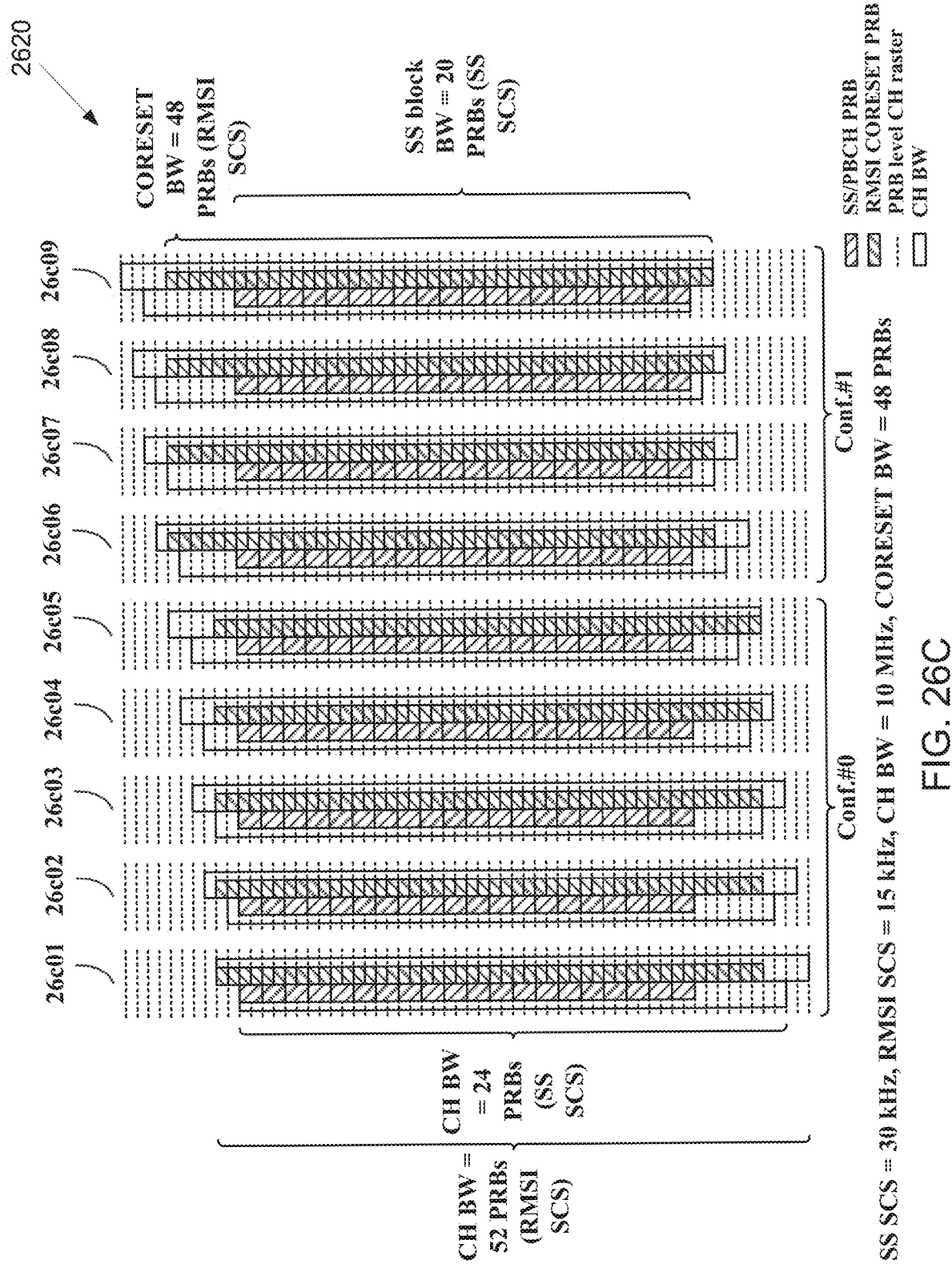
FIG. 26C illustrates an example configuration of ΔF2 in the case of {SS SCS, RMSI SCS, CH BW, CORESET BW}={30 kHz, 15 kHz, 10 MHz, 48 PRBs} according to embodiments of the present disclosure.

FIG. 26C illustrates an example configuration of ΔF2 2630 in the case of {SS SCS, RMSI SCS, CH BW, CORESET BW}={30 kHz, 15 kHz, 10 MHz, 48 PRBs} according to embodiments of the present disclosure. The embodiment of the configuration of ΔF2 2630 illustrated in FIG. 26C is for illustration only. FIG. 26C does not limit the scope of this disclosure to any particular implementation.

In a third example as in FIG. 26C, the scenario of SCS_SS=30 kHz and SCS_CORESET=15 kHz and channel raster=15 kHz or 100 kHz is considered (min CH BW assumed as 10 MHz, which is 24 PRBs in SS numerology and 52 PRBs in RMSI numerology). In this case, if RMSI CORESET BW is 48 PRBs, Indication Range=8 PRBs and Δf2=5 PRBs, so N_ΔF2=2, i.e., 2 configurations are sufficient to configure the PRB-level frequency offset between the centers/edges of SS block and RMSI CORESET, and the possible values can be −2, 2 PRBs (center offset) or can be 6, 2 PRBs (edge offset) in term of RMSI CORESET numerology.

As illustrated in FIG. 26C, 26*c*01 to 26*c*05 use configuration #0 (ΔF2=−2 PRB for center offset or ΔF2=6 PRB for edge offset), and 26*c*06 to 26*c*09 use configuration #1 (ΔF2=2 PRB for center offset or ΔF2=2 PRB for edge offset). Note that if the channel utilization alignment is not as shown in FIG. 26C for this case (e.g. not center aligned), one can still use two configurations, and the value in each configuration can be changed accordingly, where the difference of the value is same as the offset between the PRBs of the channel utilization in mixed numerologies.

Figure 26D:
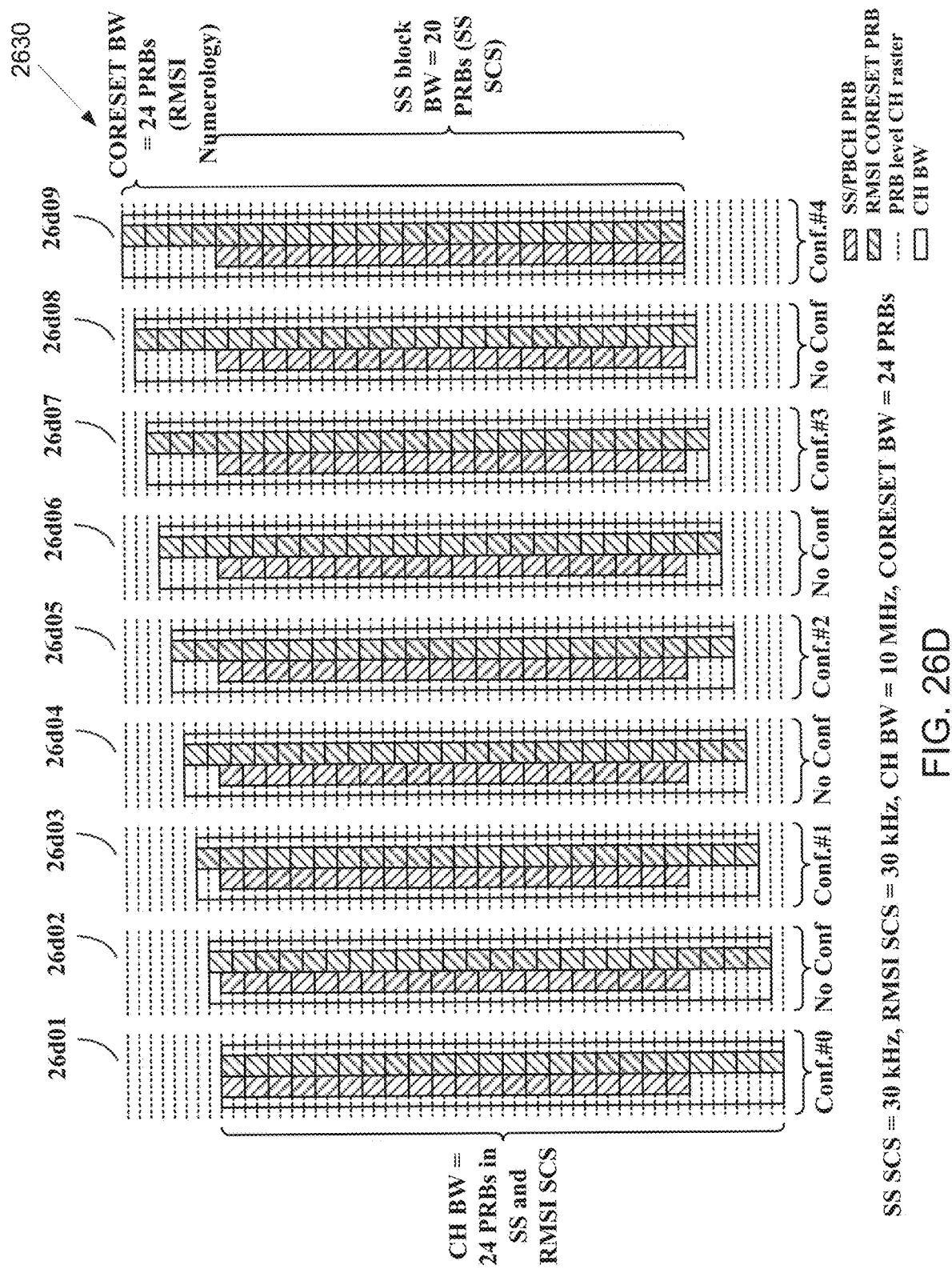
FIG. 26D illustrates an example configuration of ΔF2 in the case of {SS SCS, RMSI SCS, CH BW, CORESET BW}={30 kHz, 30 kHz, 10 MHz, 24 PRBs} according to embodiments of the present disclosure.

FIG. 26D illustrates an example configuration of ΔF2 2640 in the case of {SS SCS, RMSI SCS, CH BW, CORESET BW}={30 kHz, 30 kHz, 10 MHz, 24 PRBs} according to embodiments of the present disclosure. The embodiment of the configuration of ΔF2 2640 illustrated in FIG. 26D is for illustration only. FIG. 26D does not limit the scope of this disclosure to any particular implementation.

In a fourth example as in FIG. 26D, the scenario of SCS_SS=30 kHz and SCS_CORESET=30 kHz and channel raster=15 kHz or 100 kHz is considered (min CH BW assumed as 10 MHz, which is 24 PRBs in both SS and RMSI numerology). In this case, if RMSI CORESET BW is 24 PRBs, Indication Range=4 PRBs and Δf2=1 PRBs, so N_ΔF2=5, i.e., 5 configurations are sufficient to configure the PRB-level frequency offset between the centers/edges of SS block and RMSI CORESET, and the possible values can be −2, −1, 0, 1, 2 PRBs (center offset) or can be 4, 3, 2, 1, 0 PRBs (edge offset) in term of RMSI CORESET numerology.

As illustrated in FIG. 26D, each of 26*d*01, 26*d*03, 26*d*05, 26*d*07, and 26*d*09 uses a separate configuration #0 to #4 correspondingly, where each configuration corresponds to ΔF2 as −2, −1, 0, 1, 2 PRB for center offset, or as 4, 3, 2, 1, 0 PRB for edge offset, correspondingly, and the other cases (e.g. 26*d*02, 26*d*04, 26*d*06, and 26*d*08) do not need a separate configuration since the offset is not an integer multiple of RMSI PRB and RE level offset indication ΔF1 combined with existing configurations of ΔF2 can cover the cases.

Figure 26E:
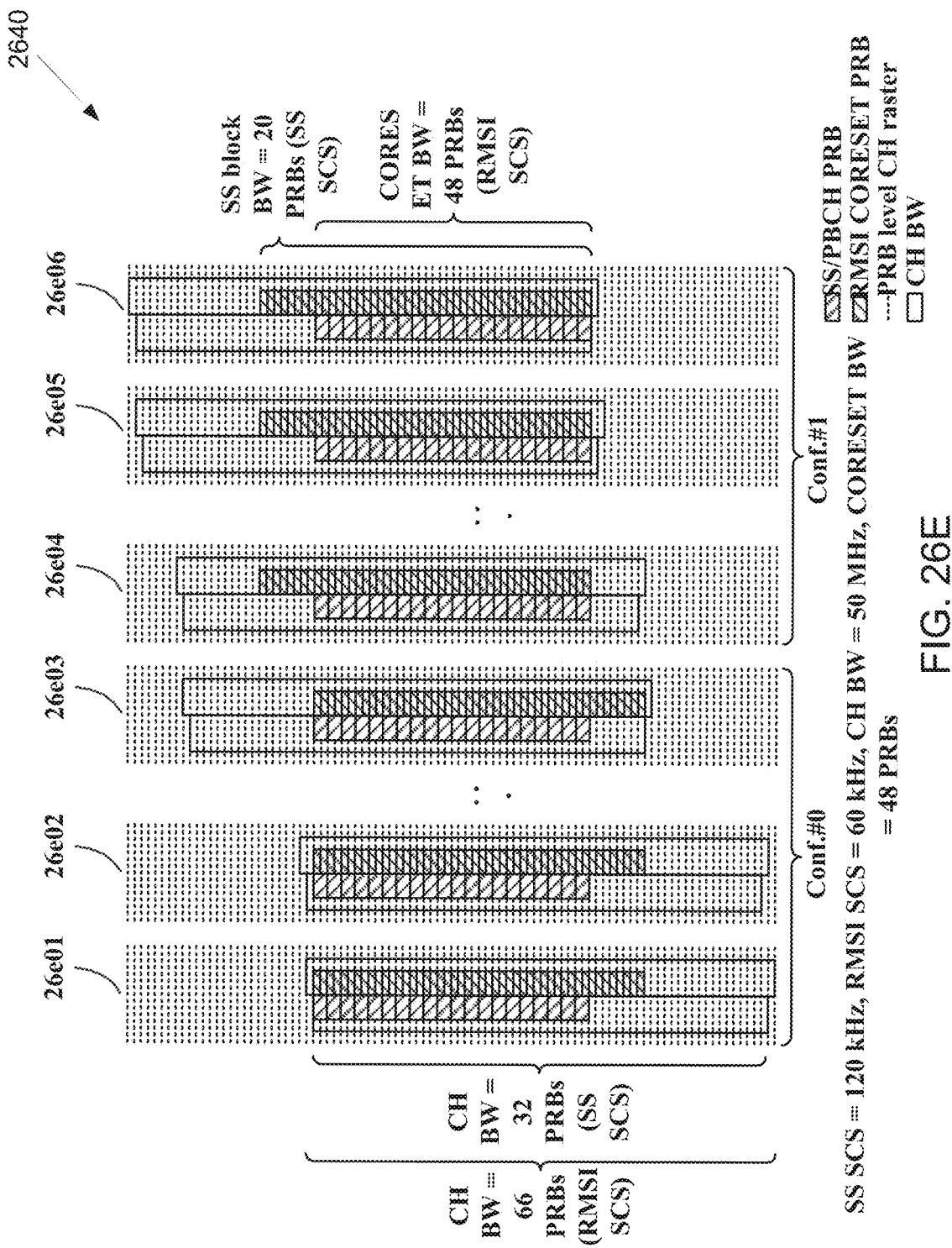
FIG. 26E illustrates an example configuration of ΔF2 in the case of {SS SCS, RMSI SCS, CH BW, CORESET BW}={120 kHz, 60 kHz, 50 MHz, 48 PRBs} according to embodiments of the present disclosure.

FIG. 26E illustrates an example configuration of ΔF2 2650 in the case of {SS SCS, RMSI SCS, CH BW, CORESET BW}={120 kHz, 60 kHz, 50 MHz, 48 PRBs} according to embodiments of the present disclosure. The embodiment of the configuration of ΔF2 2650 illustrated in FIG. 26E is for illustration only. FIG. 26E does not limit the scope of this disclosure to any particular implementation.

In a fifth example as in FIG. 26E, the scenario of SCS_SS=120 kHz and SCS_CORESET=60 kHz and channel raster=60 kHz is considered (min CH BW assumed as 50 MHz, which is 32 PRBs in SS numerology and 66 PRBs in RMSI numerology). In this case, if RMSI CORESET BW is 48 PRBs, Indication Range=24 PRBs and Δf2=19 PRBs, so N_ΔF2=2, i.e., 2 configurations are sufficient to configure the PRB-level frequency offset between the centers/edges of SS block and RMSI CORESET, and the possible values can be −4, 4 PRBs (center offset) or can be 8, 0 PRBs (edge offset) in term of RMSI CORESET numerology.

As illustrated in FIG. 26E, 26*e*01 to 26*e*03 use same configuration #0 (ΔF2=−4 PRB for center offset or ΔF2=8 PRB for edge offset) and 26*e*04 to 26*e*06 use same configuration #1 (ΔF2=4 PRB for center offset or ΔF2=0 PRB for edge offset). Note that for some of the cases (e.g. 26*e*03 and 26*e*04), either of the configurations can be used. Also note that if adding a third configuration ΔF2=0 for center offset or 4 for edge offset, 26*e*03 and 26*e*04 can use this configuration.

Figure 26F:
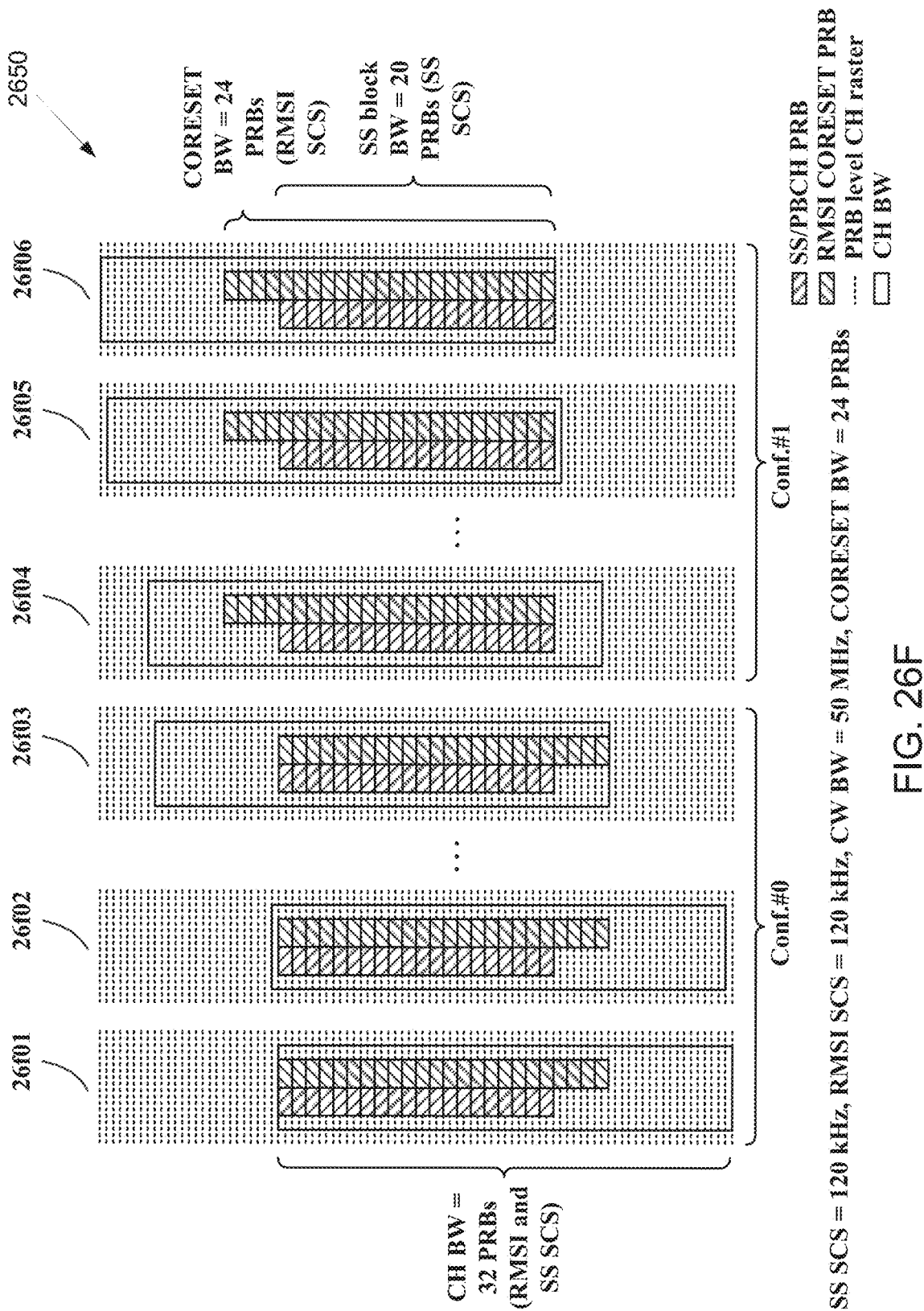
FIG. 26F illustrates an example configuration of ΔF2 in the case of {SS SCS, RMSI SCS, CH BW, CORESET BW}={120 kHz, 120 kHz, 50 MHz, 24 PRBs} according to embodiments of the present disclosure.

FIG. 26F illustrates an example configuration of ΔF2 2660 in the case of {SS SCS, RMSI SCS, CH BW, CORESET BW}={120 kHz, 120 kHz, 50 MHz, 24 PRBs} according to embodiments of the present disclosure. The embodiment of the configuration of ΔF2 2660 illustrated in FIG. 26F is for illustration only. FIG. 26F does not limit the scope of this disclosure to any particular implementation.

In a sixth example as in FIG. 26F, the scenario of SCS_SS=120 kHz and SCS_CORESET=120 kHz and channel raster=60 kHz is considered (min CH BW assumed as 50 MHz, which is 32 PRBs for both SS and RMSI numerologies). In this case, if RMSI CORESET BW is 24 PRBs, Indication Range=12 PRBs and Δf2=9 PRBs, so N_ΔF2=2, i.e., 2 configurations are sufficient to configure the PRB-level frequency offset between the centers/edges of SS block and RMSI CORESET, and the possible values can be −2, 2 PRBs (center offset) or can be 4, 0 PRBs (edge offset) in term of RMSI CORESET numerology.

As illustrated in FIG. 26F, 26*f*01 to 26*f*03 use same configuration #0 (ΔF2=−2 PRB for center offset or ΔF2=4 PRB for edge offset) and 26*f*04 to 26*f*06 use same configuration #1 (ΔF2=2 PRB for center offset or ΔF2=0 PRB for edge offset). Note that for some of the cases (e.g. 26*f*03 and 26*f*04), either of the configurations can be used. Also note that if adding a third configuration ΔF2=0 for center offset or 2 for edge offset, 26*f*03 to 26*f*04 can use this configuration.

Figure 26G:
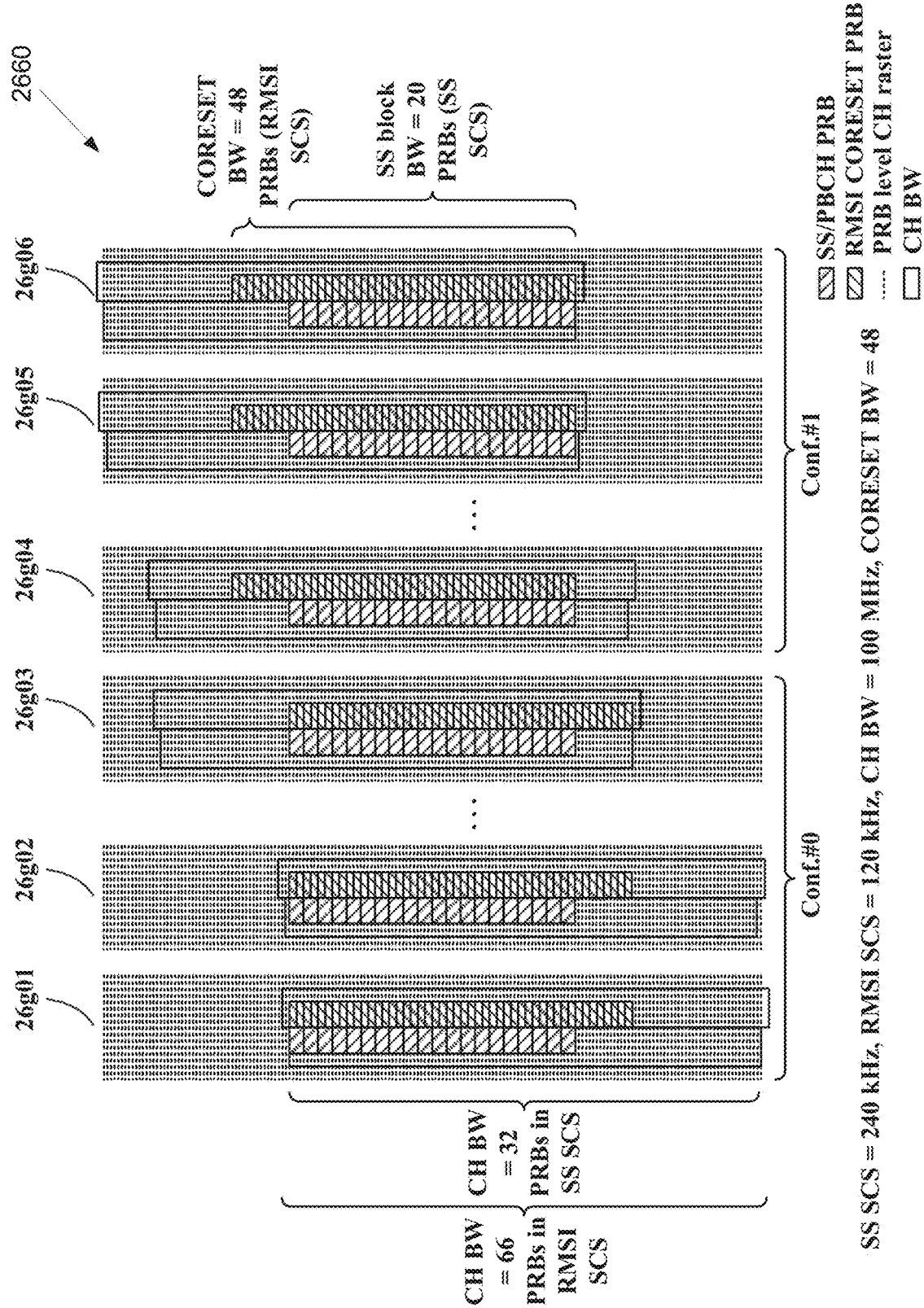
FIG. 26G illustrates an example configuration of ΔF2 in the case of {SS SCS, RMSI SCS, CH BW, CORESET BW}={240 kHz, 120 kHz, 100 MHz, 48 PRBs} according to embodiments of the present disclosure.

FIG. 26G illustrates an example configuration of ΔF2 2670 in the case of {SS SCS, RMSI SCS, CH BW, CORESET BW}={240 kHz, 120 kHz, 100 MHz, 48 PRBs} according to embodiments of the present disclosure. The embodiment of the configuration of ΔF2 2670 illustrated in FIG. 26G is for illustration only. FIG. 26G does not limit the scope of this disclosure to any particular implementation.

In a seven example as in FIG. 26G, the scenario of SCS_SS=240 kHz and SCS_CORESET=120 kHz and channel raster=60 kHz is considered (min CH BW assumed as 100 MHz, which is 32 PRBs in SS numerology and 66 PRBs in RMSI numerology). In this case, if RMSI CORESET BW is 48 PRBs, Indication Range=24 PRBs and Δf2=19 PRBs, so N_ΔF2=2, i.e., 2 configurations are sufficient to configure the PRB-level frequency offset between the centers/edges of SS block and RMSI CORESET, and the possible values can be −4, 4 PRBs (center offset) or can be 8, 0 PRBs (edge offset) in term of RMSI CORESET numerology.

As illustrated in FIG. 26G, 26g01 to 26g03 use same configuration #0 (ΔF2=−4 PRB for center offset or ΔF2=8 PRB for edge offset) and 26g04 to 26g06 use same configuration #1 (ΔF2=4 PRB for center offset or ΔF2=0 PRB for edge offset). Note that for some of the cases (e.g. 26g03 and 26g04), either of the configurations can be used. Also note that if adding a third configuration ΔF2=0 for center offset or 4 for edge offset, 26g03 to 26g04 can use this configuration.

Figure 26H:
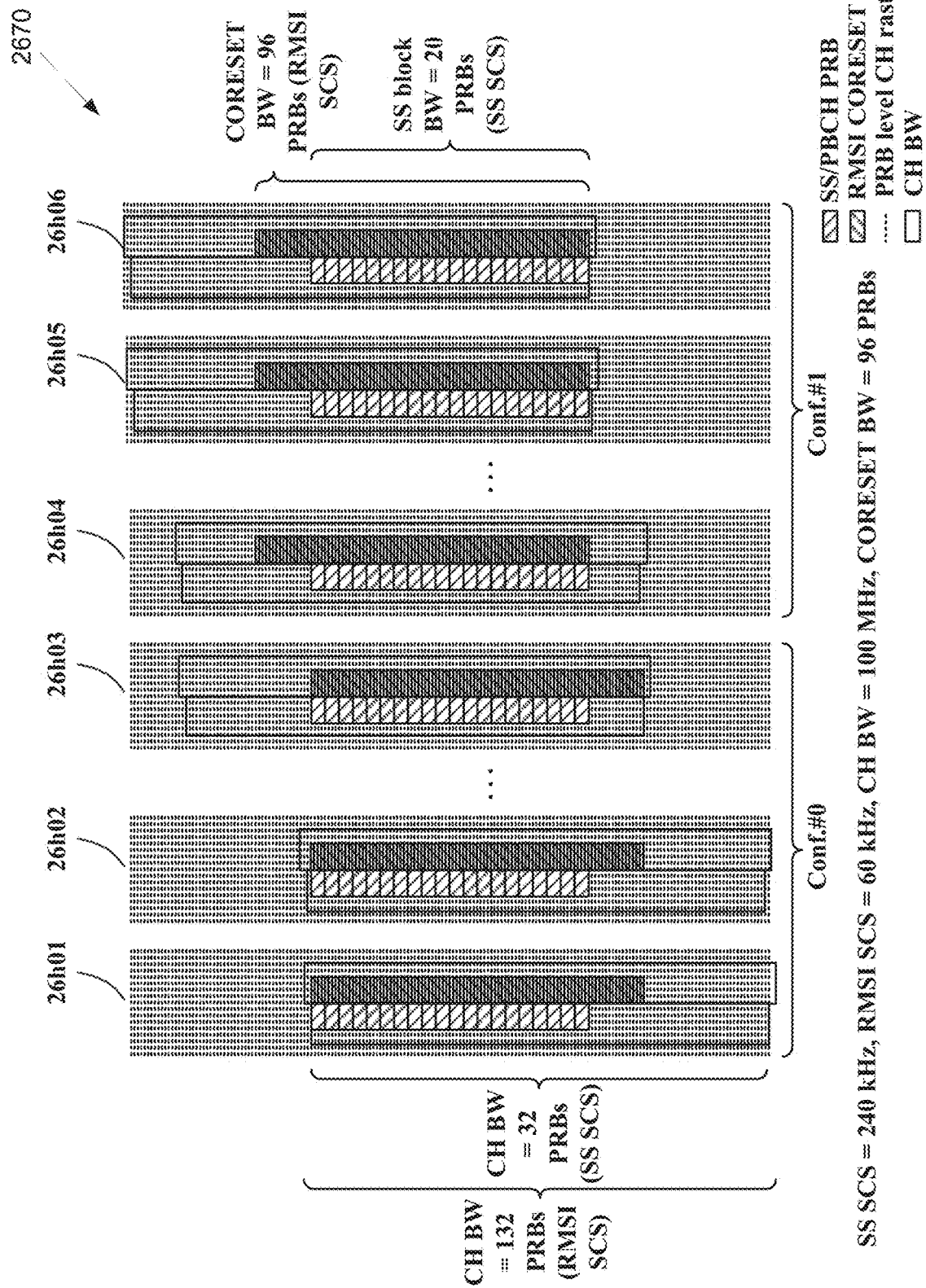
FIG. 26H illustrates an example configuration of ΔF2 in the case of {SS SCS, RMSI SCS, CH BW, CORESET BW}={240 kHz, 60 kHz, 100 MHz, 96 PRBs} according to embodiments of the present disclosure.

FIG. 26H illustrates an example configuration of ΔF2 2680 in the case of {SS SCS, RMSI SCS, CH BW, CORESET BW}={240 kHz, 60 kHz, 100 MHz, 96 PRBs} according to embodiments of the present disclosure. The embodiment of the configuration of ΔF2 2680 illustrated in FIG. 26H is for illustration only. FIG. 26H does not limit the scope of this disclosure to any particular implementation.

In an eighth example as in FIG. 26H, the scenario of SCS_SS=240 kHz and SCS_CORESET=60 kHz and channel raster=60 kHz is considered (min CH BW assumed as 100 MHz, which is 32 PRBs in SS numerology and 132 PRBs in RMSI numerology). In this case, if RMSI CORESET BW is 96 PRBs, Indication Range=48 PRBs and Δf2=37 PRBs, so N_ΔF2=2, i.e., 2 configurations are sufficient to configure the PRB-level frequency offset between the centers/edges of SS block and RMSI CORESET, and the possible values can be −8, 8 PRBs (center offset) or can be 16, 0 PRBs (edge offset) in term of RMSI CORESET numerology.

As illustrated in FIG. 26H, 26h01 to 26h03 use same configuration #0 (ΔF2=−4 PRB for center offset or ΔF2=8 PRB for edge offset) and 26h04 to 26h06 use same configuration #1 (ΔF2=4 PRB for center offset or ΔF2=0 PRB for edge offset). Note that for some of the cases (e.g. 26h03 and 26h04), either of the configurations can be used. Also note that if adding a third configuration ΔF2=0 for center offset or 8 for edge offset, 26h03 to 26h04 can use this configuration.

Figure 27A:
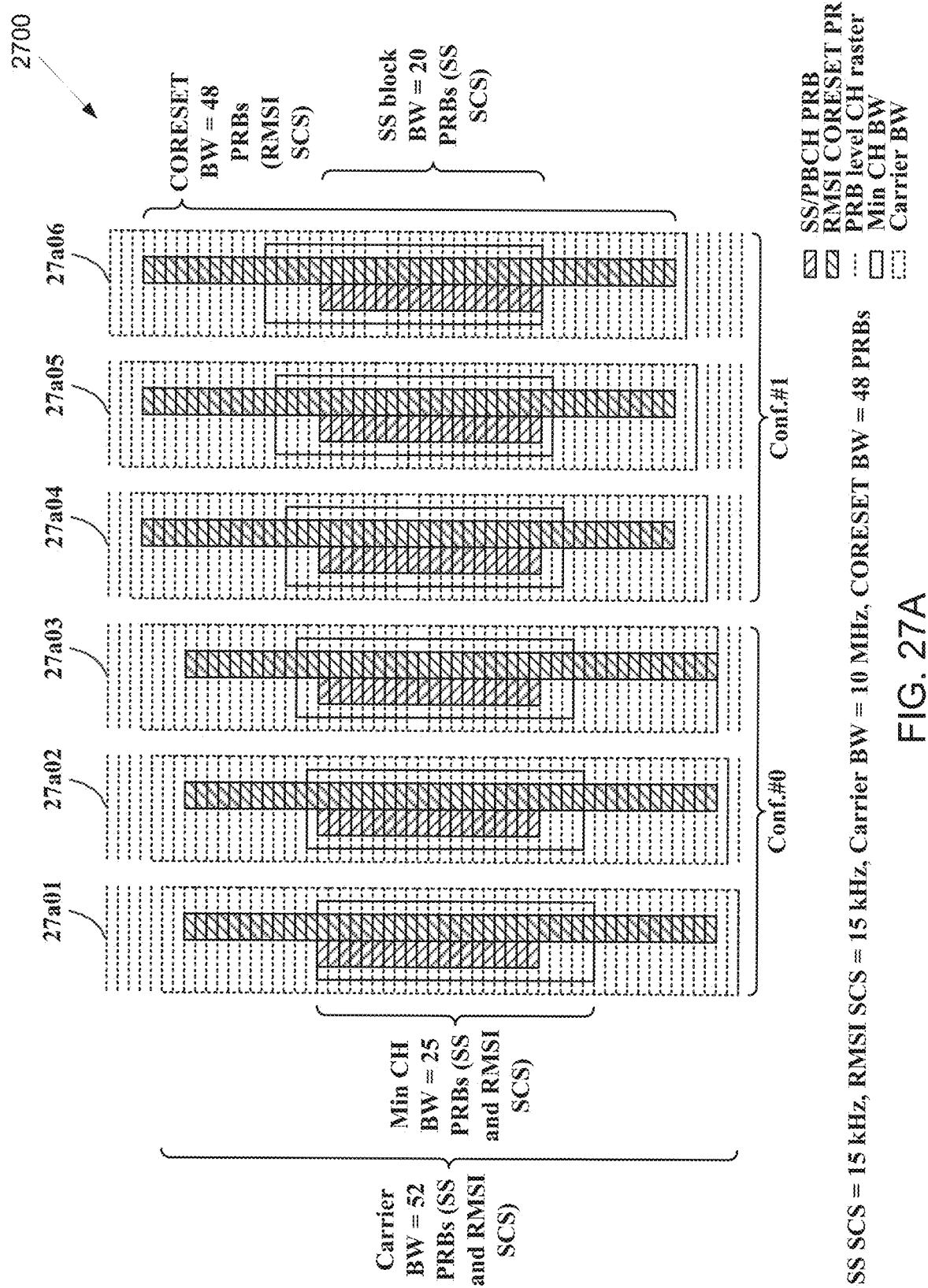
FIG. 27A illustrates an example configuration of ΔF2 in the case of {SS SCS, RMSI SCS, CH BW, CORESET BW}={15 kHz, 15 kHz, 10 MHz, 48 PRBs} according to embodiments of the present disclosure.

FIG. 27A illustrates an example configuration of ΔF2 2700 in the case of {SS SCS, RMSI SCS, CH BW, CORESET BW}={15 kHz, 15 kHz, 10 MHz, 48 PRBs} according to embodiments of the present disclosure. The embodiment of the configuration of ΔF2 2700 illustrated in FIG. 27A is for illustration only. FIG. 27A does not limit the scope of this disclosure to any particular implementation.

Examples of this approach (Scheme 1d) with the fifth example of the granularity of ΔF2, for TDM subcase-2, are illustrated in FIG. 27A, and a summary of the examples is in TABLE 5.

TABLE 5

Examples of configuration of ΔF2 for TDM subcase-2

| SS SCS (kHz) | CORESET SCS (kHz) | CORESET BW (PRB in CORESET numerology) | # configurations of frequency offset | Center frequency offset value in PRB of CORESET numerology ΔF2 | Edge frequency offset value in PRB of CORESET numerology ΔF2 |
|---|---|---|---|---|---|
| 15 | 15 | 48 | 2 | −2, 2 | 16, 12 |
| 15 | 15 | 96 | 1 | 0 | 38 |
| 15 | 30 | 24 | 3 | −1, 0, 1 | 6, 7, 8 |
| 15 | 30 | 48 | 2 | −1, 1 | 18, 20 |
| 30 | 15 | 96 | 1 | 0 | 28 |
| 30 | 30 | 48 | 3 | −2, 0, 2 | 12, 14, 16 |
| 120 | 60 | 96 | 1 | 0 | 28 |
| 120 | 120 | 48 | 1 | 0 | 14 |

In a first example as in FIG. 27A, the TDM scenario of SCS_SS=15 kHz and SCS_CORESET=15 kHz and channel raster=15 kHz or 100 kHz is considered. Carrier BW is 10 MHz, which is 52 PRBs in both SS and RMSI numerology). In this case, if RMSI CORESET BW is 48 PRBs, the Restricted BW can be chosen as central 24 PRBs of RMSI CORESET BW, then Indication Range=5 PRBs, and Δf2=5 PRBs, so N_ΔF2=2, i.e., 2 configurations are sufficient to configure the PRB-level frequency offset between the centers/edges of SS block and RMSI CORESET, and the possible values can be −2, 2 PRBs (center offset) or can be 12, 16 PRBs (edge offset) in term of the RMSI CORESET numerology.

As illustrated in FIG. 27A, 27a01, 27a02, and 275a03 use the same configuration #0 (ΔF2=−2 PRB for center offset or ΔF2=16 PRB for edge offset), 27a04, 27a05, and 27a06 uses the same configuration #1 (ΔF2=2 PRB for center offset or ΔF2=12 PRB for edge offset).

Figure 27B:
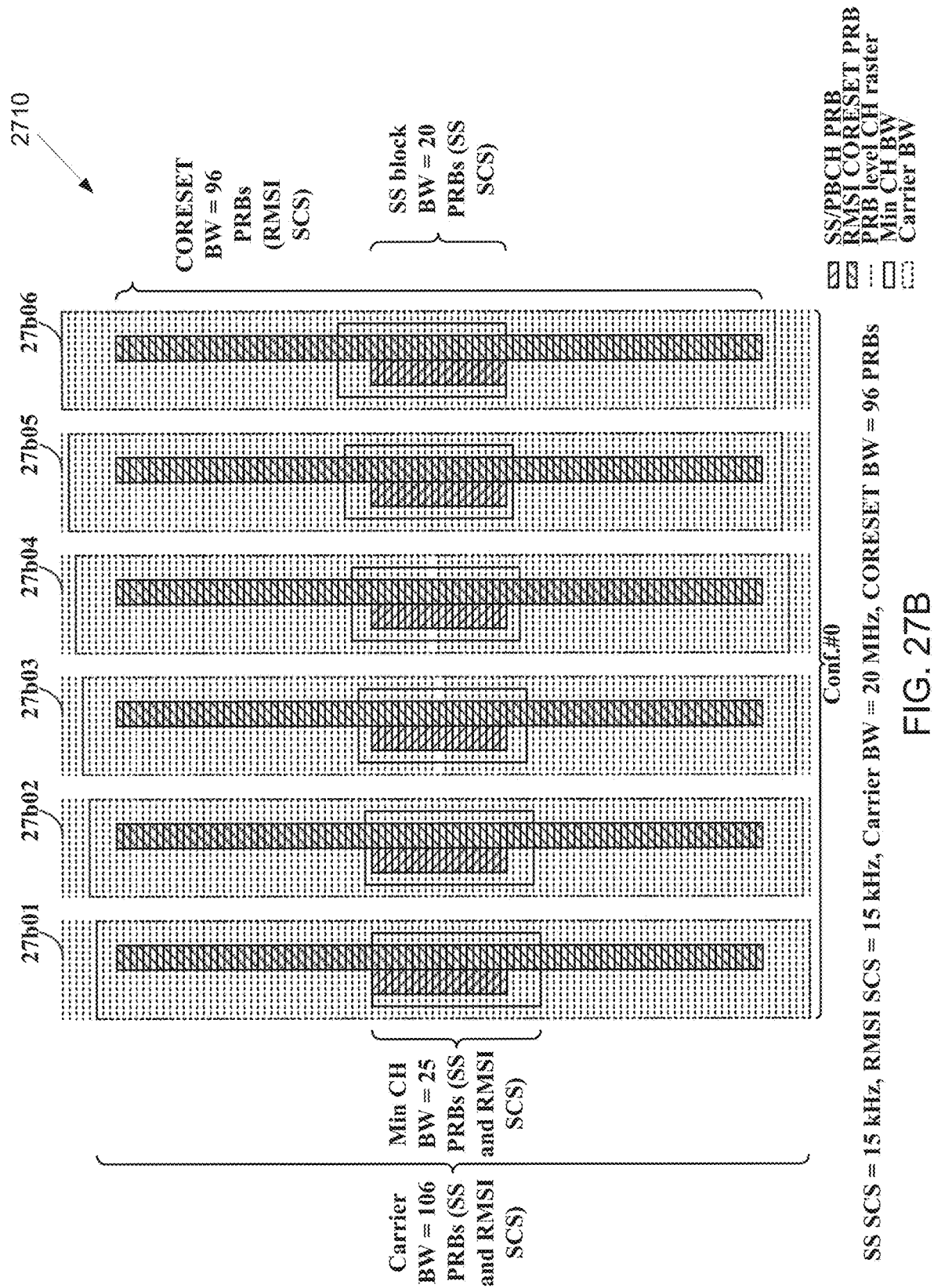
FIG. 27B illustrates an example configuration of ΔF2 in the case of {SS SCS, RMSI SCS, CH BW, CORESET BW}={15 kHz, 15 kHz, 20 MHz, 96 PRBs} according to embodiments of the present disclosure.

FIG. 27B illustrates an example configuration of ΔF2 2710 in the case of {SS SCS, RMSI SCS, CH BW, CORESET BW}={15 kHz, 15 kHz, 20 MHz, 96 PRBs} according to embodiments of the present disclosure. The embodiment of the configuration of ΔF2 2710 illustrated in FIG. 27B is for illustration only. FIG. 27B does not limit the scope of this disclosure to any particular implementation.

In a second example as in FIG. 27B, the TDM scenario of SCS_SS=15 kHz and SCS_CORESET=15 kHz and channel raster=15 kHz or 100 kHz is considered. Carrier BW is 20 MHz, which is 106 PRBs in both SS and RMSI numerology). In this case, if RMSI CORESET BW is 96 PRBs, the Restricted BW can be chosen as central 24 PRBs of RMSI CORESET BW, then Indication Range=5 PRBs, and Δf2=11 PRBs, so N_ΔF2=1, i.e., 1 configuration is sufficient to configure the PRB-level frequency offset between the centers/edges of SS block and RMSI CORESET, and the possible values can be 0 PRBs (center offset) or can be 38 PRBs (edge offset) in term of the RMSI CORESET numerology.

As illustrated in FIG. 27B, all 27b01 to 27b06 use the same configuration #0 (ΔF2=0 PRB for center offset or ΔF2=38 PRB for edge offset).

Figure 27C:
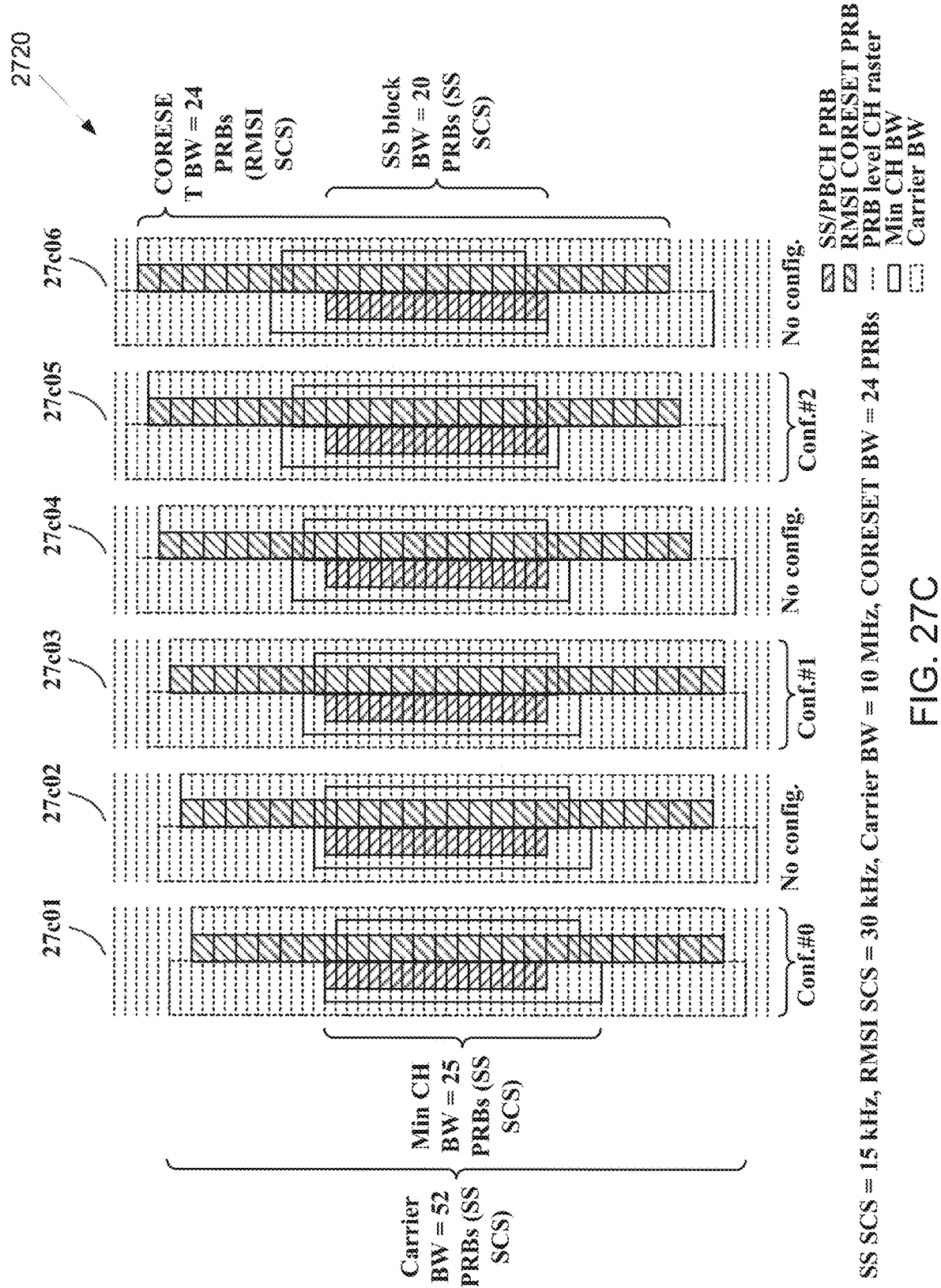
FIG. 27C illustrates an example configuration of ΔF2 in the case of {SS SCS, RMSI SCS, CH BW, CORESET BW}={15 kHz, 30 kHz, 10 MHz, 24 PRBs} according to embodiments of the present disclosure.

FIG. 27C illustrates an example configuration of ΔF2 2720 in the case of {SS SCS, RMSI SCS, CH BW, CORESET BW}={15 kHz, 30 kHz, 10 MHz, 24 PRBs} according to embodiments of the present disclosure. The embodiment of the configuration of ΔF2 2720 illustrated in FIG. 27C is for illustration only. FIG. 27C does not limit the scope of this disclosure to any particular implementation.

In a third example as in FIG. 27C, the TDM scenario of SCS_SS=15 kHz and SCS_CORESET=30 kHz and channel raster=15 kHz or 100 kHz is considered. Carrier BW is 10 MHz, which is 52 PRBs in SS numerology and 24 PRBs in RMSI numerology). In this case, if RMSI CORESET BW is 24 PRBs, the Restricted BW can be chosen as central 12 PRBs of RMSI CORESET BW, then Indication Range=2.5 PRBs, and Δf2=1 PRBs, so N_ΔF2=3, i.e., 3 configurations are sufficient to configure the PRB-level frequency offset between the centers/edges of SS block and RMSI CORESET, and the possible values can be −1, 0, 1 PRBs (center offset) or can be 6, 7, 8 PRBs (edge offset) in term of the RMSI CORESET numerology.

As illustrated in FIG. 27C, 27c01 use the configuration #0 (ΔF2=−1 PRB for center offset or ΔF2=8 PRB for edge offset), 27c03 uses the configuration #1 (ΔF2=0 PRB for center offset or ΔF2=7 PRB for edge offset), 27c05 uses the configuration #2 (ΔF2=1 PRB for center offset or ΔF2=6 PRB for edge offset), others do not require configurations since the others are not PRB aligned (RE level indication combination with other existing configurations can cover those cases).

Figure 27D:
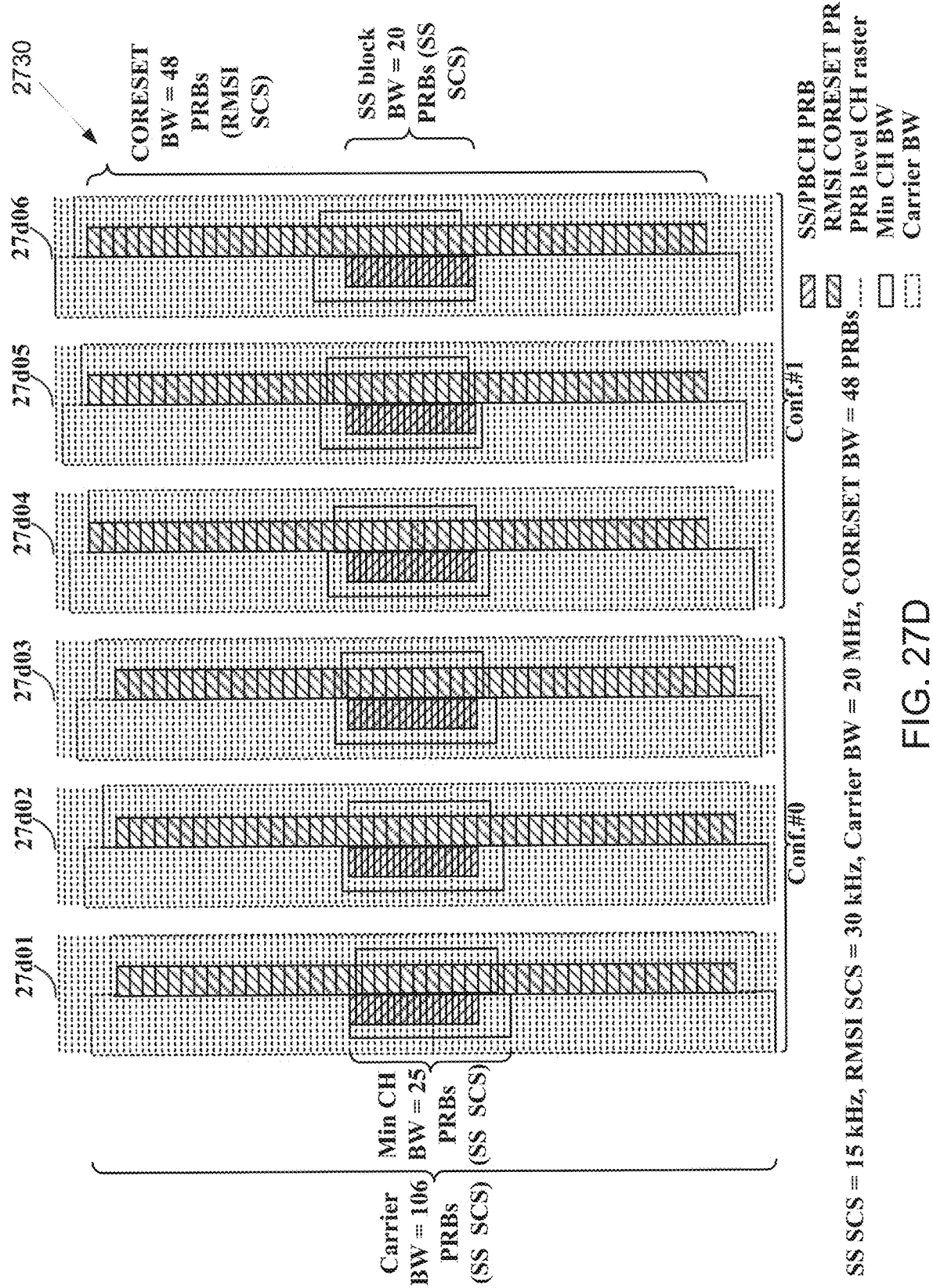
FIG. 27D illustrates an example configuration of ΔF2 in the case of {SS SCS, RMSI SCS, CH BW, CORESET BW}={15 kHz, 30 kHz, 20 MHz, 48 PRBs} according to embodiments of the present disclosure.

FIG. 27D illustrates an example configuration of ΔF2 2730 in the case of {SS SCS, RMSI SCS, CH BW, CORESET BW}={15 kHz, 30 kHz, 20 MHz, 48 PRBs} according to embodiments of the present disclosure. The embodiment of the configuration of ΔF2 2730 illustrated in FIG. 27D is for illustration only. FIG. 27D does not limit the scope of this disclosure to any particular implementation.

In a fourth example as in FIG. 27D, the TDM scenario of SCS_SS=15 kHz and SCS_CORESET=30 kHz and channel raster=15 kHz or 100 kHz is considered. Carrier BW is 20 MHz, which is 106 PRBs in SS numerology and 50 PRBs in RMSI numerology (truncating one PRB due to even number of PRB in the mixed numerologies). In this case, if RMSI CORESET BW is 48 PRBs, the Restricted BW can be chosen as central 12 PRBs of RMSI CORESET BW, then Indication Range=2.5 PRBs, and Δf2=3 PRBs, so N_ΔF2=2, i.e., 2 configurations are sufficient to configure the PRB-level frequency offset between the centers/edges of SS block and RMSI CORESET, and the possible values can be −1, 1 PRBs (center offset) or can be 18, 20 PRBs (edge offset) in term of the RMSI CORESET numerology.

As illustrated in FIG. 27D, 27d01, 27d02, and 27d03 use the same configuration #0 (ΔF2=−1 PRB for center offset or ΔF2=20 PRB for edge offset), 27d04 and 27d05 and 27d06 use the same configuration #1 (ΔF2=1 PRB for center offset or ΔF2=18 PRB for edge offset).

Figure 27E:
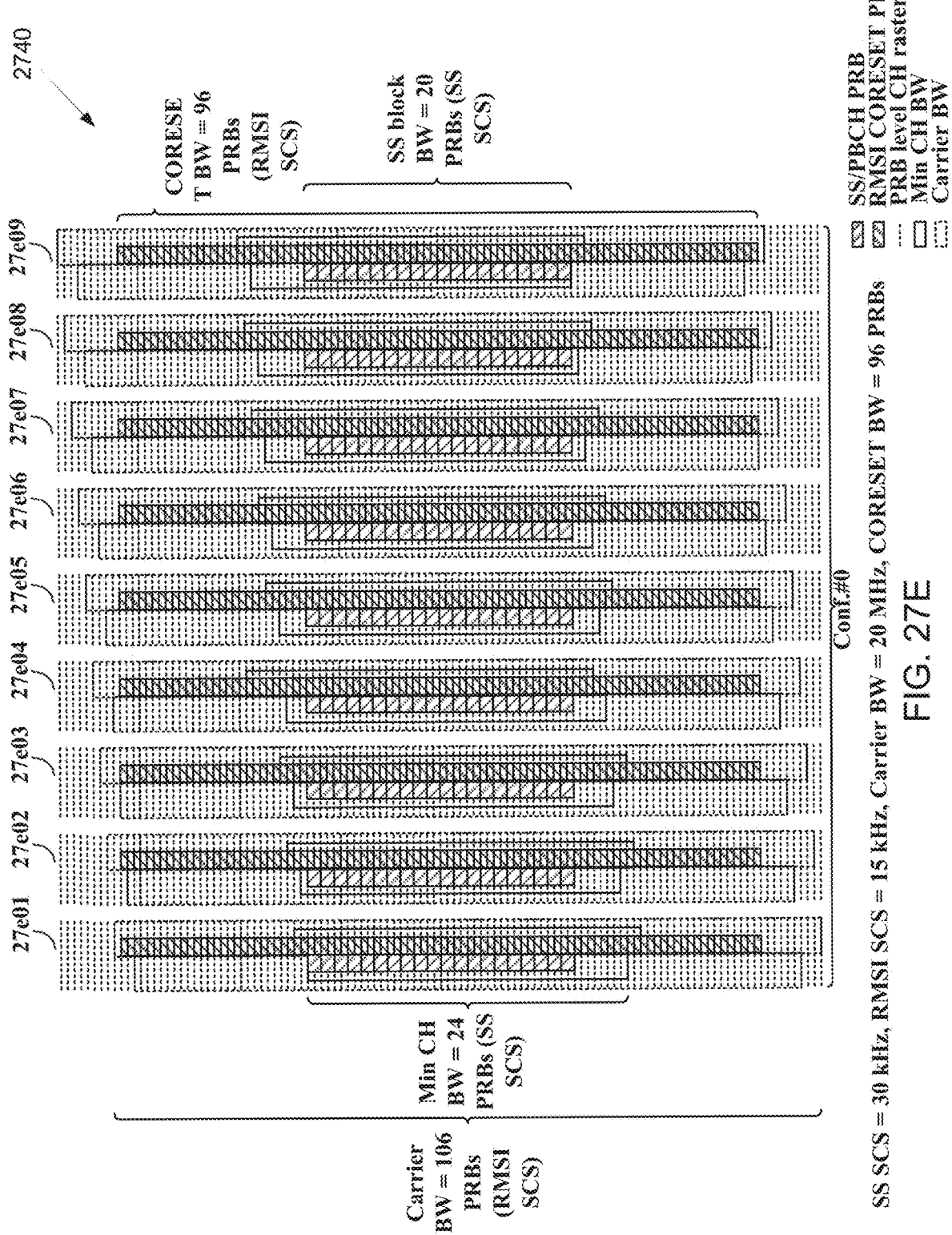
FIG. 27E illustrates an example configuration of ΔF2 in the case of {SS SCS, RMSI SCS, CH BW, CORESET BW}={30 kHz, 15 kHz, 20 MHz, 96 PRBs} according to embodiments of the present disclosure.

FIG. 27E illustrates an example configuration of ΔF2 2740 in the case of {SS SCS, RMSI SCS, CH BW, CORESET BW}={30 kHz, 15 kHz, 20 MHz, 96 PRBs} according to embodiments of the present disclosure. The embodiment of the configuration of ΔF2 2740 illustrated in FIG. 27E is for illustration only. FIG. 27E does not limit the scope of this disclosure to any particular implementation.

In a fifth example as in FIG. 27E, the TDM scenario of SCS_SS=30 kHz and SCS_CORESET=15 kHz and channel raster=15 kHz or 100 kHz is considered. Carrier BW is 20 MHz, which is 50 PRBs in SS numerology (truncating one PRB due to even number of PRB in the mixed numerologies) and 106 PRBs in RMSI numerology). In this case, if RMSI CORESET BW is 96 PRBs, the Restricted BW can be chosen as central 48 PRBs of RMSI CORESET BW, then Indication Range=9 PRBs, and Δf2=11 PRBs, so N_ΔF2=1, i.e., 1 configuration is sufficient to configure the PRB-level frequency offset between the centers/edges of SS block and RMSI CORESET, and the possible values can be 0 PRBs (center offset) or can be 28 PRBs (edge offset) in term of the RMSI CORESET numerology.

As illustrated in FIG. 27E, all use the same configuration #0 (ΔF2=0 PRB for center offset or ΔF2=28 PRB for edge offset).

Figure 27F:
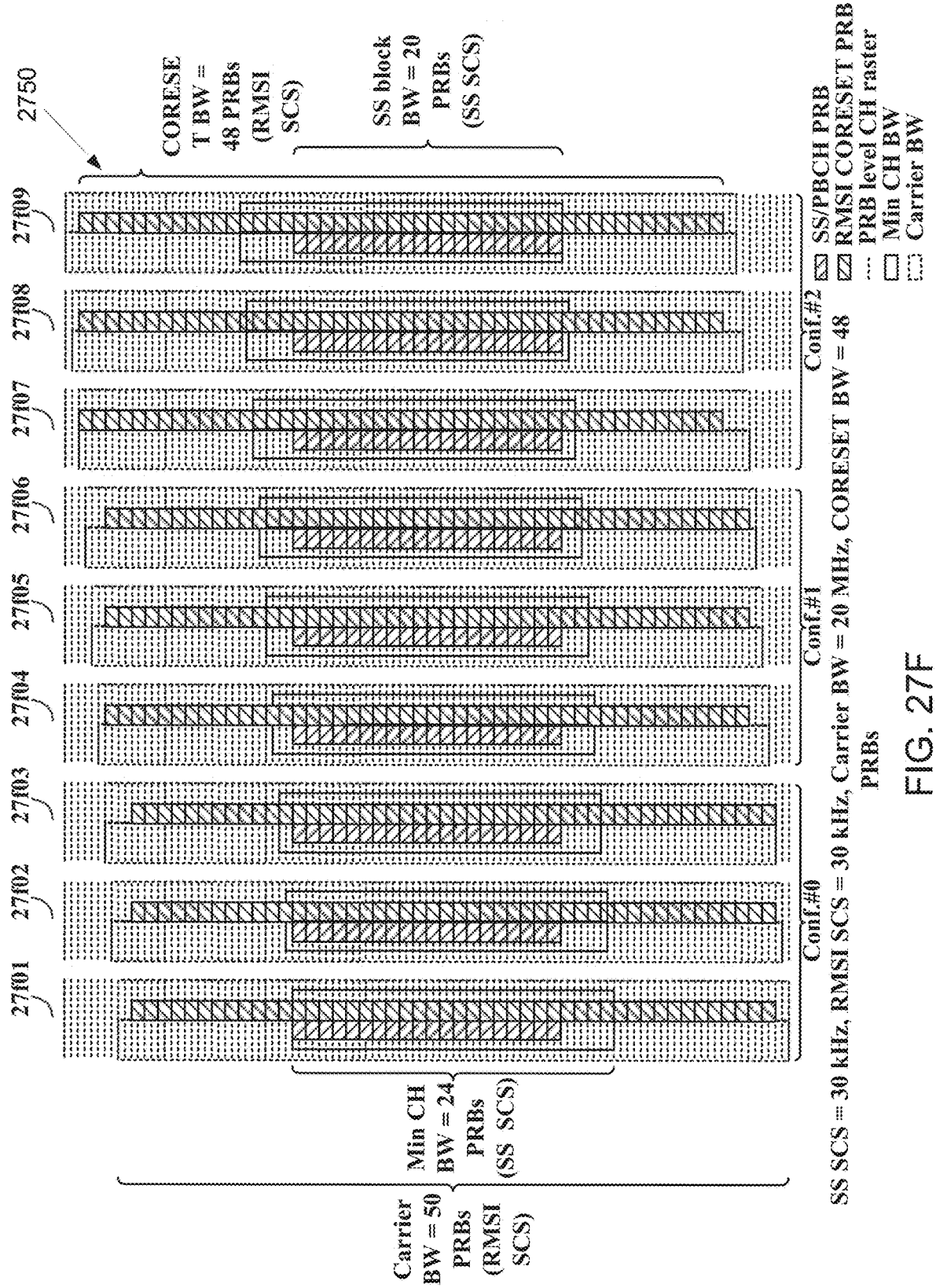
FIG. 27F illustrates an example configuration of ΔF2 in the case of {SS SCS, RMSI SCS, CH BW, CORESET BW}={30 kHz, 30 kHz, 20 MHz, 48 PRBs} according to embodiments of the present disclosure.

FIG. 27F illustrates an example configuration of ΔF2 2750 in the case of {SS SCS, RMSI SCS, CH BW, CORESET BW}={30 kHz, 30 kHz, 20 MHz, 48 PRBs} according to embodiments of the present disclosure. The embodiment of the configuration of ΔF2 2750 illustrated in FIG. 27F is for illustration only. FIG. 27F does not limit the scope of this disclosure to any particular implementation.

In a sixth example as in FIG. 27F, the TDM scenario of SCS_SS=30 kHz and SCS_CORESET=30 kHz and channel raster=15 kHz or 100 kHz is considered. Carrier BW is 20 MHz, which is 50 PRBs in both SS and RMSI numerology). In this case, if RMSI CORESET BW is 48 PRBs, the Restricted BW can be chosen as central 24 PRBs of RMSI CORESET BW, then Indication Range=9 PRBs, and Δf2=3 PRBs, so N_ΔF2=3, i.e., 3 configurations are sufficient to configure the PRB-level frequency offset between the centers/edges of SS block and RMSI CORESET, and the possible values can be −2, 0, 2 PRBs (center offset) or can be 12, 14, 16 PRBs (edge offset) in term of the RMSI CORESET numerology.

As illustrated in FIG. 27F, 27f01 to 27f03 use the same configuration #0 (ΔF2=−2 PRB for center offset or ΔF2=16 PRB for edge offset), 27f04 to 27f06 use the same configuration #1 (ΔF2=0 PRB for center offset or ΔF2=14 PRB for edge offset), 27f07 to 27f09 use the same configuration #1 (ΔF2=2 PRB for center offset or ΔF2=12 PRB for edge offset).

For >6 GHz cases (e.g. SS SCS is 240 kHz or 120 kHz), since the channel utilization is quite well, Indication Range is much smaller than Δf2 such that single configuration is sufficient for the PRB-level frequency offset between the centers/edges of SS block and RMSI CORESET, and the possible values can be 0 PRB (center offset) or can be CORESET_BW/2−SS_BW/2*R_SCS PRBs (edge offset) in term of the RMSI CORESET numerology.

If merging the TDM sub-case 1 and 2 together, one joint table can be shown in TABLE 6, wherein a=R_SCS=SCS_SS/SCS_CORESET. Note that the relation between edge offset and center offset is given by edge offset=center offset+CORESET_BW/2−SS block BW/2*R_SCS.

TABLE 6

Examples of configuration of ΔF2 for TDM case

| SS SCS (kHz) | CORESET SCS (kHz) | CORESET BW (PRB in CORESET numerology) | # configs of frequency offset | Center frequency offset value in PRB of CORESET numerology ΔF2 | Edge frequency offset value in PRB of CORESET numerology ΔF2 |
|---|---|---|---|---|---|
| 15 | 15 | 24 | 3 | −2a, 0, 2a | 0, 2, 4 |
| 15 | 15 | 48 | 2 | −2a, 2a | 12, 16 |
| 15 | 15 | 96 | 1 | 0 | 38 |
| 15 | 30 | 24 | 3 | −2a, 0, 2a | 6, 7, 8 |
| 15 | 30 | 48 | 2 | −2a, 2a | 18, 20 |
| 30 | 15 | 48 | 2 | −a, a | 2, 6 |
| 30 | 15 | 96 | 1 | 0 | 28 |
| 30 | 30 | 24 | 5 | −2a, −a, 0, a, 2a | 0, 1, 2, 3, 4 |
| 30 | 30 | 48 | 3 | −2a, 0, 2a | 12, 14, 16 |
| 120 | 60 | 48 | 2 | −2a, 2a | 0, 8 |
| 120 | 60 | 96 | 1 | 0 | 28 |
| 120 | 120 | 24 | 2 | −2a, 2a | 0, 4 |
| 120 | 120 | 48 | 1 | 0 | 14 |
| 240 | 60 | 96 | 2 | −2a, 2a | 0, 16 |
| 240 | 120 | 48 | 2 | −2a, 2a | 0, 8 |

For this approach (e.g., scheme 1d) with the fifth example of the granularity of ΔF2, for FDM cases, two configurations are sufficient to indicate the PRB-level frequency offset ΔF2, i.e., CORESET is multiplexed on top of SS block or multiplexed on the bottom of SS block, both with potential smaller gap to enable floating sync and/or mixed numerology of SS and RMSI. For example, the edge offset can be either −SS block BW*R_SCS−1 or CORESET_BW if ΔF1 is not 0 (i.e., PRB grid is not aligned) and SS and RMSI numerology are the same; and can be either —SS block BW*R_SCS or CORESET_BW if ΔF1 is 0 (i.e., PRB grid is aligned) and SS and RMSI numerology are the same; and can be either −SS block BW*R_SCS−2 or CORESET_BW+1 if ΔF1 is not 0 (i.e., PRB grid is not aligned) and SS and RMSI numerology are different; and can be either −SS block BW*R_SCS−1 or CORESET_BW+1 if ΔF1 is 0 (i.e., PRB grid is aligned) and SS and RMSI numerology are different.

In one embodiment for this approach (scheme 1d), for each combination of SS SCS and RMSI CORESET SCS, the multiplexing pattern of SS/PBCH block and RMSI CORESET, RMSI CORESET_BW, number of symbols for CORESET, and PRB-level offset are jointly coded in a table using X bits in NR-PBCH, where X can be 4 for example.

Examples of this embodiment are shown in TABLE 7A to TABLE 7H, wherein in the tables, "Pattern 1" refers to the multiplexing pattern that SS/PBCH block and RMSI CORESET occur in different time instances, and SS/PBCH block TX BW and the initial active DL BWP containing RMSI CORESET overlap, which is the TDM case (including both subcase 1 and 2) in the previous embodiments; "Pattern 2" refers to the multiplexing pattern that SS/PBCH block and RMSI CORESET occur in different time instances, and SS/PBCH block TX BW and the initial active DL BWP containing RMSI CORESET do not overlap, which is FDM subcase 1 with SS block and RMSI CORESET starting in different symbols (timing offset greater than 0); "Pattern 3" refers to the multiplexing pattern that SS/PBCH block and RMSI CORESET occur in the same time instance, and SS/PBCH block TX BW and the initial active DL BWP containing RMSI CORESET do not overlap, which is FDM subcase 1 with SS block and RMSI CORESET starting in same symbol (timing offset is 0).

TABLE 7A gives the joint configuration of the multiplexing pattern of SS/PBCH block and RMSI CORESET, RMSI CORESET BW, number of symbols for CORESET, and PRB-level offset using 4 bits in MIB, for the SCS of SS as 15 kHz and SCS of CORESET as 15 kHz. This configuration table can be at least utilized for carriers with 15 kHz SS SCS and min channel BW as 5 MHz. For carriers with larger min channel BW than 5 MHz, if the synchronization raster can maintain the same or smaller than the carriers with min channel BW as 5 MHz, TABLE 7A can be reused for those carriers as well.

For example, if bands with min CH BW as 10 MHz but SS raster step size is still within 900 kHz+channel raster, TABLE 7A can be applicable to those bands as well; if bands with min CH BW as 20 MHz but SS raster step size is still within 900 kHz+channel raster, TABLE 7A can be applicable to those bands as well.

TABLE 7A

RMSI CORESET configuration at least for bands with min CH BW as 5 MHz or 10 MHz, when {SS SCS, RMSI SCS} = {15 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 2 |
| 3 | Pattern 1 | 24 | 2 | 4 |
| 4 | Pattern 1 | 24 | 3 | 0 |
| 5 | Pattern 1 | 24 | 3 | 2 |
| 6 | Pattern 1 | 24 | 3 | 4 |
| 7 | Pattern 1 | 48 | 1 | 12 |
| 8 | Pattern 1 | 48 | 1 | 16 |
| 9 | Pattern 1 | 48 | 2 | 12 |
| 10 | Pattern 1 | 48 | 2 | 16 |
| 11 | Pattern 1 | 48 | 3 | 12 |
| 12 | Pattern 1 | 48 | 3 | 16 |
| 13 | Pattern 1 | 96 | 1 | 38 |
| 14 | Pattern 1 | 96 | 2 | 38 |
| 15 | Pattern 1 | 96 | 3 | 38 |
| 16 | Reserved | | | |

TABLE 7B gives the joint configuration of the multiplexing pattern of SS/PBCH block and RMSI CORESET, RMSI CORESET BW, number of symbols for CORESET, and PRB-level offset using 4 bits in MIB, for the SCS of SS as 15 kHz and SCS of CORESET as 30 kHz. This configuration table can be at least utilized for carriers with 15 kHz SS SCS and min channel BW as 5 MHz. For carriers with larger min channel BW than 5 MHz, if the synchronization raster can maintain the same or smaller than the carriers with min channel BW as 5 MHz, TABLE 7B can be reused for those carriers as well. E.g. if bands with min CH BW as 10 MHz but SS raster step size is still within 900 kHz+channel raster, TABLE 7B can be applicable to those bands as well; if bands with min CH BW as 20 MHz but SS raster step size is still within 900 kHz+channel raster, TABLE 7B can be applicable to those bands as well.

TABLE 7B

RMSI CORESET configuration at least for bands with min CH BW as 5 MHz or 10 MHz, when {SS SCS, RMSI SCS} = {15 kHz, 30 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 6 |
| 2 | Pattern 1 | 24 | 2 | 7 |
| 3 | Pattern 1 | 24 | 2 | 8 |
| 4 | Pattern 1 | 24 | 3 | 6 |
| 5 | Pattern 1 | 24 | 3 | 7 |
| 6 | Pattern 1 | 24 | 3 | 8 |
| 7 | Pattern 1 | 48 | 1 | 18 |
| 8 | Pattern 1 | 48 | 1 | 20 |
| 9 | Pattern 1 | 48 | 2 | 18 |
| 10 | Pattern 1 | 48 | 2 | 20 |
| 11 | Pattern 1 | 48 | 3 | 18 |
| 12 | Pattern 1 | 48 | 3 | 20 |
| 13 | | | Reserved | |
| 14 | | | Reserved | |
| 15 | | | Reserved | |
| 16 | | | Reserved | |

TABLE 7C gives the joint configuration of the multiplexing pattern of SS/PBCH block and RMSI CORESET, RMSI CORESET BW, number of symbols for CORESET, and PRB-level offset using 4 bits in MIB, for the SCS of SS as 30 kHz and SCS of CORESET as 15 kHz. This configuration table can be at least utilized for carriers with 30 kHz SS SCS and min channel BW as 10 MHz. For carriers with 5 MHz min CH BW, if one network can operate at 10 MHz, TABLE 7C can be reused for those carriers as well. For carriers with larger min channel BW than 10 MHz, if the synchronization raster can maintain the same or smaller than the carriers with min channel BW as 10 MHz, TABLE 7C can be reused for those carriers as well.

TABLE 7C

RMSI CORESET configuration at least for bands with min CH BW as 5 MHz or 10 MHz, when {SS SCS, RMSI SCS} = {30 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 48 | 1 | 2 |
| 2 | Pattern 1 | 48 | 1 | 6 |
| 3 | Pattern 1 | 48 | 2 | 2 |
| 4 | Pattern 1 | 48 | 2 | 6 |
| 5 | Pattern 1 | 48 | 3 | 2 |
| 6 | Pattern 1 | 48 | 3 | 6 |
| 7 | Pattern 1 | 96 | 1 | 28 |
| 8 | Pattern 1 | 96 | 2 | 28 |
| 9 | Pattern 1 | 96 | 3 | 28 |
| 10 | | | Reserved | |
| 11 | | | Reserved | |
| 12 | | | Reserved | |
| 13 | | | Reserved | |
| 14 | | | Reserved | |
| 15 | | | Reserved | |
| 16 | | | Reserved | |

TABLE 7D gives the joint configuration of the multiplexing pattern of SS/PBCH block and RMSI CORESET, RMSI CORESET BW, number of symbols for CORESET, and PRB-level offset using 4 bits in MIB, for the SCS of SS as 30 kHz and SCS of CORESET as 30 kHz. This configuration table can be at least utilized for carriers with 30 kHz SS SCS and min channel BW as 10 MHz. For carriers with 5 MHz min CH BW, if one network can operate at 10 MHz, TABLE 7D can be reused for those carriers as well. For carriers with larger min channel BW than 10 MHz, if the synchronization raster can maintain the same or smaller than the carriers with min channel BW as 10 MHz, TABLE 7d can be reused for those carriers as well.

TABLE 7D

RMSI CORESET configuration at least for bands with min CH BW as 5 MHz or 10 MHz, when {SS SCS, RMSI SCS} = {30 kHz, 30 kHz}

| Configuration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 1 |
| 3 | Pattern 1 | 24 | 2 | 2 |
| 4 | Pattern 1 | 24 | 2 | 3 |
| 5 | Pattern 1 | 24 | 2 | 4 |
| 6 | Pattern 1 | 24 | 3 | 0 |
| 7 | Pattern 1 | 24 | 3 | 1 |
| 8 | Pattern 1 | 24 | 3 | 2 |
| 9 | Pattern 1 | 24 | 3 | 3 |
| 10 | Pattern 1 | 24 | 3 | 4 |
| 11 | Pattern 1 | 48 | 1 | 12 |
| 12 | Pattern 1 | 48 | 1 | 14 |
| 13 | Pattern 1 | 48 | 1 | 16 |
| 14 | Pattern 1 | 48 | 2 | 12 |
| 15 | Pattern 1 | 48 | 2 | 14 |
| 16 | Pattern 1 | 48 | 2 | 16 |

TABLE 7E gives the joint configuration of the multiplexing pattern of SS/PBCH block and RMSI CORESET, RMSI CORESET BW, number of symbols for CORESET, and PRB-level offset using 4 bits in MIB, for the SCS of SS as 120 kHz and SCS of CORESET as 60 kHz. This configuration table can be at least utilized for carriers with 120 kHz SS SCS and min channel BW as 50 MHz. For carriers with larger min channel BW than 50 MHz, if the synchronization raster can maintain the same or smaller than the carriers with min channel BW as 50 MHz, TABLE 7E can be reused for those carriers as well.

TABLE 7E

RMSI CORESET configuration at least for bands with min CH BW as 50 MHz, when {SS SCS, RMSI SCS} = {120 kHz, 60 kHz}.

| Config-uration Index | Multiplexing Pattern | CORESET BW in PRB | Number of Symbols for CORESET | Frequency Offset in PRB of RMSI CORESET numerology $\Delta F2$ |
|---|---|---|---|---|
| 1 | Pattern 1 | 48 | 1 | 0 |
| 2 | Pattern 1 | 48 | 1 | 8 |
| 3 | Pattern 1 | 48 | 2 | 0 |
| 4 | Pattern 1 | 48 | 2 | 8 |
| 5 | Pattern 1 | 48 | 3 | 0 |
| 6 | Pattern 1 | 48 | 3 | 8 |
| 7 | Pattern 1 | 96 | 1 | 28 |
| 8 | Pattern 1 | 96 | 2 | 28 |
| 9 | Pattern 2 | 48 | 1 | −42 if $\Delta F1 \neq 0$ and −41 if $\Delta F1 = 0$ |
| 10 | Pattern 2 | 48 | 1 | 49 |
| 11 | Pattern 2 | 96 | 1 | −42 if $\Delta F1 \neq 0$ and −41 if $\Delta F1 = 0$ |
| 12 | Pattern 2 | 96 | 1 | 97 |
| 13 | | | Reserved | |
| 14 | | | Reserved | |
| 15 | | | Reserved | |
| 16 | | | Reserved | |

TABLE 7F gives the joint configuration of the multiplexing pattern of SS/PBCH block and RMSI CORESET, RMSI CORESET BW, number of symbols for CORESET, and PRB-level offset using 4 bits in MIB, for the SCS of SS as 120 kHz and SCS of CORESET as 120 kHz. This configuration table can be at least utilized for carriers with 120 kHz SS SCS and min channel BW as 50 MHz. For carriers with larger min channel BW than 50 MHz, if the synchronization raster can maintain the same or smaller than the carriers with min channel BW as 50 MHz, TABLE 7F can be reused for those carriers as well.

TABLE 7F

RMSI CORESET configuration at least for bands with min CH BW as 50 MHz, when {SS SCS, RMSI SCS} = {120 kHz, 120 kHz}.

| Config-uration Index | Multiplexing Pattern | CORESET BW in PRB | Number of Symbols for CORESET | Frequency Offset in PRB of RMSI CORESET numerology $\Delta F2$ |
|---|---|---|---|---|
| 1 | Pattern 1 | 24 | 2 | 0 |
| 2 | Pattern 1 | 24 | 2 | 4 |
| 3 | Pattern 1 | 48 | 1 | 14 |
| 4 | Pattern 1 | 48 | 2 | 14 |
| 5 | Pattern 3 | 24 | 2 | −21 if $\Delta F1 \neq 0$ and −20 if $\Delta F1 = 0$ |
| 6 | Pattern 3 | 24 | 2 | 24 |
| 7 | Pattern 3 | 48 | 2 | −21 if $\Delta F1 \neq 0$ and −20 if $\Delta F1 = 0$ |
| 8 | Pattern 3 | 48 | 2 | 48 |
| 9 | | | Reserved | |
| 10 | | | Reserved | |
| 11 | | | Reserved | |
| 12 | | | Reserved | |
| 13 | | | Reserved | |
| 14 | | | Reserved | |
| 15 | | | Reserved | |
| 16 | | | Reserved | |

TABLE 7G gives the joint configuration of the multiplexing pattern of SS/PBCH block and RMSI CORESET, RMSI CORESET BW, number of symbols for CORESET, and PRB-level offset using 4 bits in MIB, for the SCS of SS as 240 kHz and SCS of CORESET as 60 kHz. This configuration table can be at least utilized for carriers with 240 kHz SS SCS and min channel BW as 100 MHz. For carriers with 50 MHz min CH BW, if one network can operate at 100 MHz, TABLE 7G can be reused for those carriers as well. For carriers with larger min channel BW than 100 MHz, if the synchronization raster can maintain the same or smaller than the carriers with min channel BW as 100 MHz, TABLE 7G can be reused for those carriers as well.

TABLE 7G

RMSI CORESET configuration at least for bands with min CH BW as 50 MHz, when {SS SCS, RMSI SCS} = {240 kHz, 60 kHz}.

| Config-uration Index | Multiplexing Pattern | CORESET BW in PRB | Number of Symbols for CORESET | Frequency Offset in PRB of RMSI CORESET numerology $\Delta F2$ |
|---|---|---|---|---|
| 1 | Pattern 1 | 96 | 1 | 0 |
| 2 | Pattern 1 | 96 | 1 | 16 |
| 3 | Pattern 1 | 96 | 2 | 0 |
| 4 | Pattern 1 | 96 | 2 | 16 |
| 5 | | | Reserved | |
| 6 | | | Reserved | |
| 7 | | | Reserved | |
| 8 | | | Reserved | |
| 9 | | | Reserved | |
| 10 | | | Reserved | |
| 11 | | | Reserved | |
| 12 | | | Reserved | |
| 13 | | | Reserved | |
| 14 | | | Reserved | |
| 15 | | | Reserved | |
| 16 | | | Reserved | |

TABLE 7H gives the joint configuration of the multiplexing pattern of SS/PBCH block and RMSI CORESET, RMSI CORESET BW, number of symbols for CORESET, and PRB-level offset using 4 bits in MIB, for the SCS of SS as 240 kHz and SCS of CORESET as 120 kHz. This configuration table can be at least utilized for carriers with 240 kHz SS SCS and min channel BW as 100 MHz. For carriers with 50 MHz min CH BW, if one network can operate at 100 MHz, TABLE 7H can be reused for those carriers as well. For carriers with larger min channel BW than 100 MHz, if the synchronization raster can maintain the same or smaller than the carriers with min channel BW as 100 MHz, TABLE 7H can be reused for those carriers as well.

TABLE 7H

RMSI CORESET configuration at least for bands with min CH BW as 50 MHz, when {SS SCS, RMSI SCS} = {240 kHz, 120 kHz}.

| Config-uration Index | Multiplexing Pattern | CORESET BW in PRB | Number of Symbols for CORESET | Frequency Offset in PRB of RMSI CORESET numerology $\Delta F2$ |
|---|---|---|---|---|
| 1 | Pattern 1 | 48 | 1 | 0 |
| 2 | Pattern 1 | 48 | 1 | 8 |
| 3 | Pattern 1 | 48 | 2 | 0 |
| 4 | Pattern 1 | 48 | 2 | 8 |
| 5 | Pattern 2 | 24 | 1 | −42 if $\Delta F1 \neq 0$ and −41 if $\Delta F1 = 0$ |
| 6 | Pattern 2 | 24 | 1 | 25 |
| 7 | Pattern 2 | 48 | 1 | −42 if $\Delta F1 \neq 0$ and −41 if $\Delta F1 = 0$ |
| 8 | Pattern 2 | 48 | 1 | 49 |
| 9 | | | Reserved | |
| 10 | | | Reserved | |
| 11 | | | Reserved | |

TABLE 7H-continued

RMSI CORESET configuration at least for bands with min CH BW as 50 MHz, when {SS SCS, RMSI SCS} = {240 kHz, 120 kHz}.

| Config-uration Index | Multiplexing Pattern | CORESET BW in PRB | Number of Symbols for CORESET | Frequency Offset in PRB of RMSI CORESET numerology ΔF2 |
|---|---|---|---|---|
| 12 | | | | Reserved |
| 13 | | | | Reserved |
| 14 | | | | Reserved |
| 15 | | | | Reserved |
| 16 | | | | Reserved |

In a first example of the granularity of ΔF1, the granularity of ΔF1 is same as RMSI CORESET SCS (e.g. no indication of smaller granularity even when the channel raster is smaller than RMSI CORESET SCS). In this case, network choose a subset from the channel raster such that no indication of smaller granularity is required, and a UE assumes that the SS/PBCH block PRB grid is aligned with the RMSI RE grid, such that the PRB grid offset between SS/PBCH block and RMSI is an integer multiple of RMSI subcarrier spacing.

Then, the total number of possible values of ΔF1 in RE, i.e., N_ΔF1, can be determined as: N_ΔF1=N_RE_PRB (asymmetric RE location); or N_ΔF1=N_RE_PRB+1 (symmetric RE location), where N_RE_PRB=12, and R_SCS=SCS_SS/SCS_CORESET (ratio between SS/PBCH SCS and CORESET SCS), and the possible values of ΔF1 can be determined as (1) ΔF1 with asymmetric RE location: -(N_ΔF1-2)/2, -(N_ΔF1-4)/2, . . . , (N_ΔF1-2)/2, N_ΔF1/2 or -N_ΔF1/2, -(N_ΔF1-2)/2, . . . , (N_ΔF1-2)/2 or 0, 1, . . . , (N_ΔF1-1) or -(N_ΔF1-1), . . . , -1, 0 (also denoted as -(N_ΔF1-2)/2:1:N_ΔF1/2 or -N_ΔF1/2:1:(N_ΔF1-2)/2 or 0:1:(N_ΔF1-1) or -(N_ΔF1-1):1:0); or (2) ΔF1 with symmetric RE location: -(N_ΔF1-1)/2, -(N_ΔF1-3)/2, . . . , (N_ΔF1-3)/2, (N_ΔF1-1)/2 (also denoted as -(N_ΔF1-1)/2:1:(N_ΔF1-1)/2). Note that in this configuration of symmetric RE location, one of the RE location configuration is not essential.

In a second example of the granularity of ΔF1, the granularity of ΔF1 is same as channel raster if it is defined as SCS based (e.g. 15 kHz for <6 GHz and 60 kHz for >6 GHz). Then, the total number of possible values of ΔF1 in RE, i.e., N_ΔF1, can be determined as: N_ΔF1=N_RE_PRB*R_SCS' (asymmetric RE location); or N_ΔF1=N_RE_PRB*R_SCS'+1 (symmetric RE location), where N_RE_PRB=12, and R_SCS'=SCS_CORESET/15 kHz for <6 GHz and R_SCS'=SCS_CORESET/60 kHz for >6 GHz (e.g. ratio between CORESET SCS and channel raster if channel raster is SCS based), and the possible values of ΔF1 can be determined as (1) ΔF1 with asymmetric RE location: -(N_ΔF1-2)/2/R_SCS', -(N_ΔF1-4)/2/R_SCS', . . . , (N_ΔF1-2)/2/R_SCS', N_ΔF1/2/R_SCS' or -N_ΔF1/2/R_SCS', -(N_ΔF1-2)/2/R_SCS', . . . , (N_ΔF1-2)/2/R_SCS' or 0, 1/R_SCS', . . . , (N_ΔF1-1)/R_SCS' or -(N_ΔF1-1)/R_SCS', -1/R_SCS', 0 (also denoted as -(N_ΔF1-2)/2/R_SCS':1/R_SCS':N_ΔF1/2/R_SCS' or -N_ΔF1/2/R_SCS':1/R_SCS':(N_ΔF1-2)/2/R_SCS' or 0:1/R_SCS':(N_ΔF1-1)/R_SCS' or -(N_ΔF1-1)/R_SCS':1/R_SCS':0); or ΔF1 with symmetric RE location: -(N_ΔF1-1)/2/R_SCS', -(N_ΔF1-3)/2/R_SCS', . . . , (N_ΔF1-3)/2/R_SCS', (N_ΔF1-1)/2/R_SCS' (also denoted as -(N_ΔF1-1)/2/R_SCS':1/R_SCS':(N_ΔF1-1)/2/R_SCS'). Note that in this configuration of symmetric RE location, one of the RE location configuration is not essential.

In one consideration for the two examples of the granularity of ΔF1, for a given frequency range, one can choose a granularity from the two examples. E.g. for >6 GHz, the first example is utilized, and for <6 GHz, the second example is utilized.

In the fourth approach of the first scheme (e.g. Scheme 1d), the final frequency offset ΔF can be determined by ΔF=ΔF1+ΔF2*N_RE_PRB (where N_RE_PRB=12 regardless of the numerology), taking into account the frequency offset reference within the offset as in TABLE 8.

TABLE 8

Determination of ΔF in different multiplexing cases using scheme 1d.

| | ΔF in the unit of RE with RMSI CORESET numerology | Notes |
|---|---|---|
| TDM-Embodiment 1.1 | ΔF1 + ΔF2* N_RE_PRB | |
| TDM-Embodiment 1.2 | ΔF1 + ΔF2* N_RE_PRB | |
| TDM-Embodiment 1.3 | ΔF1 + ΔF2* N_RE_PRB | |
| TDM-Embodiment 2.1 | ΔF1 + ΔF2* N_RE_PRB | |
| TDM-Embodiment 2.2 | ΔF1 + ΔF2* N_RE_PRB + ΔCORESET_BW_Offset in RE | ΔCORESET_BW_Offset is the predefined offset between centers of RMSI CORESET BW and Restricted BW as defined in TDM-Embodiment 2.2 (in RMSI CORESET numerology) |
| TDM-Embodiment 2.3 | ΔF1 + ΔF2* N_RE_PRB + ΔCORESET_BW_Offset in RE | ΔCORESET_BW_Offset is the predefined offset between centers of RMSI CORESET BW and Restricted BW as defined in TDM-Embodiment 2.3 (in RMSI CORESET numerology) |
| FDM-Embodiment 1.1 | ΔF1 + ΔF2* N_RE_PRB + ΔGap in RE + RMSI CORESET BW in RE/2 + Min CH BW in RE/2* R_SCS and/or ΔF1 + ΔF2* N_RE_PRB − (ΔGap' in RE + | ΔGap and ΔGap' are the predefined frequency gap between RMSI resources and min channel BW as defined in FDM-Embodiment 1.1 (in RMSI CORESET numerology) |

TABLE 8-continued

Determination of ΔF in different multiplexing cases using scheme 1d.

| | ΔF in the unit of RE with RMSI CORESET numerology | Notes |
|---|---|---|
| | RMSI CORESET BW in RE/2 + Min CH BW in RE/2* R_SCS) | |
| FDM-Embodiment 1.2 | ΔF1 + ΔF2* N_RE_PRB + ΔGap in RE + RMSI CORESET BW in RE/2 + SS/PBCH block BW in RE/2* R_SCS and/or ΔF1 + ΔF2* N_RE_PRB − (ΔGap' in RE + RMSI CORESET BW in RE/2 + SS/PBCH block BW in RE/2* R_SCS) | ΔGap and ΔGap' are the predefined frequency gap between RMSI resources and SS/PBCH block, and (RMSI CORESET BW/2 + ΔGap + SS/PBCH block BW*R_SCS/2) and/or −(RMSI CORESET BW/2 + ΔGap' + SS/PBCH block BW*R_SCS/2) are the frequency offset references as defined in FDM-Embodiment 1.2 (in RMSI CORESET numerology) |
| FDM-Embodiment 1.3 | ΔF1 + ΔF2* N_RE_PRB + ΔGap in RE + RMSI CORESET BW in RE/2 + SS/PBCH block BW in RE/2* R_SCS and/or ΔF1 + ΔF2* N_RE_PRB − (ΔGap' in RE + RMSI CORESET BW in RE/2 + SS/PBCH block BW in RE/2* R_SCS) | ΔGap and ΔGap' are the predefined frequency gap between RMSI resources and SS/PBCH block, and (RMSI CORESET BW/2 + ΔGap + SS/PBCH block BW*R_SCS/2) and/or −(RMSI CORESET BW/2 + ΔGap' + SS/PBCH block BW*R_SCS/2) are the frequency offset references as defined in FDM-Embodiment 1.3 (in RMSI CORESET numerology) |
| FDM-Embodiment 2.1 | ΔF1 + ΔF2* N_RE_PRB + (ΔGap1 in RE − ΔGap2 in RE)/2 + (RMSI CORESET BW 1 in RE − RMSI CORESET BW 2 in RE)/2 | ΔGap1 and ΔGap2 are the predefined frequency gaps between RMSI resources and min channel BW as defined in FDM-Embodiment 2.1 (in RMSI CORESET numerology) |
| FDM-Embodiment 2.2 | ΔF1 + ΔF2* N_RE_PRB + (ΔGap1 in RE − ΔGap2 in RE)/2 + (RMSI CORESET BW 1 in RE − RMSI CORESET BW 2 in RE)/2 | ΔGap1 and ΔGap2 are the predefined frequency gaps between RMSI resources and SS/PBCH block as defined in FDM-Embodiment 2.2 (in RMSI CORESET numerology) |
| FDM-Embodiment 2.3 | ΔF1 + ΔF2* N_RE_PRB + (ΔGap1 in RE − ΔGap2 in RE)/2 + (RMSI CORESET BW 1 in RE − RMSI CORESET BW 2 in RE)/2 | ΔGap1 and ΔGap2 are the predefined frequency gaps between RMSI resources and SS/PBCH block as defined in FDM-Embodiment 2.3 (in RMSI CORESET numerology) |

In a second scheme (e.g. scheme 2), the frequency offset can be configured by a single configuration capturing the RE offset between SS/PBCH block and RMSI resources PRB grids (e.g. single-field configuration scheme, wherein no need to separately indicate the RE offset within a PRB by floating sync). Note that the benefit from this embodiment (e.g. single-field configuration comparing to double-field configurations) is saving potential number of configurations (or bits).

In a first approach of the second scheme (e.g. Scheme 2a), the RE offset ΔF' is measured in the granularity of and expressed in a SS/PBCH SCS (i.e., the unit and the interval of possible values of ΔF' is a SS/PBCH SCS). Then the total number of possible values of ΔF', i.e., N_ΔF', can be determined as: N_ΔF'=ΔF'_Range in PRB*N_RE_PRB/R_SCS (asymmetric RE location), for both TDM and FDM cases; or N_ΔF'=ΔF'_Range in PRB*N_RE_PRB/R_SCS+1 (symmetric RE location), for both TDM and FDM cases, where N_RE_PRB=12 is the number of REs within a PRB in the frequency domain regardless of the numerology, and R_SCS=SCS_SS/SCS_CORESET, and the possible values of ΔF' can be determined as (1) ΔF' with asymmetric RE location: −(N_ΔF'−2)/2, −(N_ΔF'−4)/2, . . . , (N_ΔF'−2)/2, N_ΔF'/2 or −N_ΔF'/2, −(N_ΔF'−2)/2, . . . , (N_ΔF'−2)/2 or 0, 1, . . . , N_ΔF'−1 or −(N_ΔF'−1), . . . , −1, 0 (also denoted as −(N_ΔF'−2)/2:1:N_ΔF'/2 or −N_ΔF'/2:1:(N_ΔF'−2)/2 or 0:1:N_ΔF'−1 or −(N_ΔF'−1):1:0); or ΔF' with symmetric RE location: −(N_ΔF'−1)/2, −(N_ΔF'−3)/2, . . . , (N_ΔF'−3)/2, (N_ΔF'−1)/2 (also denoted as −(N_ΔF'−1)/2:1:(N_ΔF'−1)/2). Note that in this configuration of symmetric RE location, one of the RE location configuration is not essential.

In a second approach of the second scheme (e.g. scheme 2b), the RE offset ΔF' is measured in the granularity of and expressed in a RMSI CORESET SCS (i.e., the unit of possible values of ΔF' is a RMSI CORESET SCS). Then the total number of possible values of ΔF', i.e., N_ΔF', can be determined as: N_ΔF'=ΔF'_Range in PRB*N_RE_PRB (asymmetric RE location), for both TDM and FDM cases; or N_ΔF'=ΔF'_Range in PRB*N_RE_PRB+1 (symmetric RE location), for both TDM and FDM cases, where N_RE_PRB=12 is the number of REs within a PRB in the frequency domain regardless of the numerology, and the possible values of ΔF' can be determined as (1) ΔF' with asymmetric RE location: −(N_ΔF'−2)/2, −(N_ΔF'−4)/2, . . . , (N_ΔF'−2)/2, N_ΔF'/2 or −N_ΔF'/2, −(N_ΔF'−2)/2, . . . , (N_ΔF'−2)/2 or 0, 1, . . . , N_ΔF'−1 or −(N_ΔF'−1), . . . , −1, 0 (also denoted as −(N_ΔF'−2)/2:1:N_ΔF'/2 or −N_ΔF'/2:1:(N_ΔF'−2)/2 or 0:1:N_ΔF'−1 or −(N_ΔF'−1):1:0); or ΔF' with symmetric RE location: −(N_ΔF'−1)/2, −(N_ΔF'−3)/2, . . . , (N_ΔF'−3)/2, (N_ΔF'−1)/2 (also denoted as −(N_ΔF'−1)/2:1:(N_ΔF'−1)/2). Note that in this configuration of symmetric RE location, one of the RE location configuration is not essential.

In a third approach of the second scheme (e.g. scheme 2c), the RE offset ΔF' is measured in the granularity of and expressed in the smaller one between a SS/PBCH SCS and a RMSI CORESET SCS (i.e., the unit and the interval of possible values of ΔF' is the smaller one between a SS/PBCH SCS and a RMSI CORESET SCS). Then the total number of possible values of ΔF', i.e., N_ΔF, can be determined as: N_ΔF'=ΔF'_Range in PRB*N_RE_PRB/min (R_SCS,1) (asymmetric RE location), for both TDM and FDM cases; or N_ΔF'=ΔF'_Range in PRB*N_RE_PRB/min (R_SCS,1)+1 (symmetric RE location), for both TDM and FDM cases, where N_RE_PRB=12 is the number of REs within a PRB in the frequency domain regardless of the numerology, and the possible values of ΔF' can be determined as (1) ΔF' with asymmetric RE location: −(N_ΔF'−2)/2, −(N_ΔF'−4)/2, . . . , (N_ΔF'−2)/2, N_ΔF'/2 or −N_ΔF'/2, −(N_ΔF'−2)/2, . . . , (N_ΔF'−2)/2 or 0, 1, . . . , N_ΔF'−1 or −(N_ΔF'−1), . . . , −1, 0 (also denoted as −(N_ΔF'−2)/2: 1:N_ΔF'/2 or −N_ΔF'/2:1:(N_ΔF'−2)/2 or 0:1:N_ΔF'−1 or −(N_ΔF'−1):1:0); or ΔF' with symmetric RE location: −(N_ΔF'−1)/2, −(N_ΔF'−3)/2, . . . , (N_ΔF'−3)/2, (N_ΔF'−1)/2 (also denoted as −(N_ΔF'−1)/2:1:(N_ΔF'−1)/2). Note that in this configuration of symmetric RE location, one of the RE location configuration is not essential.

In a fourth approach of the second scheme (e.g. scheme 2d), the RE offset ΔF' is constructed by ΔF'=N_RE_PRB*ΔF2+ΔF1, where the RE offset ΔF1 and PRB offset ΔF2 are defined the same way as in Scheme 1d. The final frequency offset ΔF can be determined per TDM/FDM embodiments, taking into account the frequency offset reference within the offset, i.e., ΔF=ΔF'+F_ref.

In a third scheme (e.g. scheme 3), the frequency offset can be configured by a single configuration capturing the frequency offset between SS/PBCH block and RMSI resources, where the offset is measured in term of the size of channel raster, no matter floating sync is supported or not. For example, N_ΔF' possible configurations in MIB are utilized to indicate the frequency offset, and the value of N_ΔF' can be determined as follow, wherein x=[log 2(N_ΔF')] if the N_ΔF' configurations are expressed in x bits: N_ΔF'=ΔF'_Range in PRB*N_RE_PRB*SCS_CORESET/CH_Raster, where N_RE_PRB=12 is the number of REs within a PRB in the frequency domain regardless of the numerology, SCS_CORESET is the subcarrier spacing of RMSI CORESET, CH_Raster is the size of channel raster in term of Hz, and the possible values of ΔF' can be determined as −(N_ΔF'−1)/2, −(N_ΔF'−3)/2, . . . , (N_ΔF'−3)/2, (N_ΔF'−1)/2 (also denoted as −(N_ΔF'−1)/2:1:(N_ΔF'−1)/2).

In a fourth scheme (e.g. scheme 4), the frequency offset can be configured by a single configuration capturing the frequency offset between SS/PBCH block and RMSI resources, where the offset is measured in term of the size of sync raster, no matter floating sync is supported or not. For example, N_ΔF' possible configurations in MIB are utilized to indicate the frequency offset, and the value of N_ΔF' can be determined as follow, wherein x=[log 2(N_ΔF')] if the N_ΔF' configurations are expressed in x bits: N_ΔF'=ΔF'_Range in PRB*N_RE_PRB*SCS_CORESET/SS_Raster, where N_RE_PRB=12 is the number of REs within a PRB in the frequency domain regardless of the numerology, SCS_CORESET is the subcarrier spacing of RMSI CORESET, SS_Raster is the size of sync raster in term of Hz, and the possible values of ΔF' can be determined as −(N_ΔF'−1)/2, −(N_ΔF'−3)/2, . . . , (N_ΔF'−3)/2, (N_ΔF'−1)/2 (also denoted as −(N_ΔF'−1)/2:1:(N_ΔF'−1)/2).

In a fifth scheme (e.g. scheme 5), the frequency offset can be configured by two parts (also double-field configuration): first configuration is the RE offset between SS/PBCH block and RMSI CORESET PRB grid (e.g. RE offset as defined in floating sync), and the second configuration is the PRB offset between SS/PBCH block and RMSI resources. For example, in total N_ΔF1·N_ΔF2 possible configurations in MIB are utilized to indicate the frequency offset, wherein N_ΔF1 configurations are utilized to indicate the RE offset comparing to the PRB grid (e.g. floating sync), and N_ΔF2 configurations are utilized to indicate the PRB offset between SS/PBCH block and RMSI resources (e.g. the offset is denoted as ΔF2 in term of PRB). x1=[log 2(N_ΔF1)] if the N_ΔF1 configurations are expressed in x1 bits and x2=[log 2(N_ΔF2)] if the N_ΔF2 configurations are expressed in x2 bits. In total, the number of bits required, if expressed in bits, is given by x=x1+x2. The difference between scheme 5 and scheme 1 is, the granularity of indication in floating sync can be sparser, which corresponds to the potential change of channel raster value.

For one example of this approach, if the PRB offset ΔF2 is measured in the granularity of and expressed in a RMSI CORESET PRB, and RE offset ΔF1 is measured in the granularity of and expressed in N_RE_ΔF1 RMSI CORESET REs (N_RE_ΔF1 can be 1, or 2, or 3, or 4, or 6, or 12), then the total number of possible values of ΔF1 in N_RE_ΔF1 REs and ΔF2 in PRB, i.e., N_ΔF1 and N_ΔF2, can be determined as: N_ΔF1=N_RE_PRB/N_RE_ΔF1 (asymmetric RE location); or N_ΔF1=N_RE_PRB/N_RE_ΔF1+1 (symmetric RE location); and N_ΔF2=ΔF_Range in PRB+1, for TDM case; and N_ΔF2=ΔF_Range in PRB, for TDM case; and the possible values of ΔF1 and ΔF2 can be determined as (1) ΔF1 with asymmetric RE location: −(N_ΔF1−2)/2, −(N_ΔF1−4)/2, . . . , (N_ΔF1−2)/2, N_ΔF1/2 or −N_ΔF1/2, −(N_ΔF1−2)/2, . . . , (N_ΔF1−2)/2 or 0, 1, . . . , N_ΔF1−1 or −(N_ΔF1−1), . . . , −1, 0 (also denoted as −(N_ΔF1−2)/2: 1:N_ΔF1/2 or −N_ΔF1/2:1:(N_ΔF1−2)/2 or 0:1:N_ΔF1−1 or −(N_ΔF1−1):1:0); ΔF1 with symmetric RE location: −(N_ΔF1−1)/2, −(N_ΔF1−3)/2, . . . , (N_ΔF1−3)/2, (N_ΔF1−1)/2 (also denoted as −(N_ΔF1−1)/2:1:(N_ΔF1−1)/2) (note that in this configuration of symmetric RE location, one of the RE location configuration is not essential); or ΔF2: −(N_ΔF2−1)/2, −(N_ΔF2−3)/2, . . . , (N_ΔF2−3)/2, (N_ΔF2−1)/2 (also denoted as −(N_ΔF2−1)/2:1:(N_ΔF2−1)/2). If N_ΔF2=0 or 1, possible value for ΔF2 is 0 (refers to a fixed value and no need to configure).

Note that scheme 5 is the same as scheme 1 if N_RE_ΔF1=1. Also note that a special case of this scheme is, when N_RE_ΔF1=12, which can refer a scenario that the channel raster is defined as PRB level, N_ΔF1=1 such that no indication of floating sync is required (SS/PBCH block PRB and RMSI CORESET PRB are automatically aligned), and only the PRB offset is required to indicate.

In a sixth scheme (e.g. scheme 6), the frequency offset can be configured by a single configuration capturing the frequency offset between SS/PBCH block and RMSI resources in PRB level, where the offset is measured in term of either the RMSI CORESET numerology or SS/PBCH block numerology. RMSI resources and SS/PBCH block PRB grids are assumed to be aligned or to have a subset relationship (if their numerologies are not the same, the PRB grid with the larger subcarrier spacing is a subset of the one with smaller subcarrier spacing), such that no floating sync is required in MIB. The PRB grid offset between RMSI and other data outside the initial active BW, measured in RE level, can be indicated in RMSI/OSI. The determination of the PRB level offset can refer to the ΔF2 in scheme 1.

More Configuration Examples using scheme 1d.

More examples of scheme 1d using joint configuration of the multiplexing pattern of SS/PBCH block and RMSI CORESET, RMSI CORESET BW, number of symbols for CORESET, and PRB-level offset, are shown as follows, wherein different combination of SS SCS and CORESET SCS are considered. In these examples, the Indication Range can be smaller than the theoretical upper as min CH BW−SS/PBCH block BW+CH raster, and equals to the SS raster of the corresponding carrier.

In a first example, if for a NR band, the min CH BW=10 MHz, and SS SCS is determined as 15 kHz. For this band, if the SS raster is defined as 4320 kHz (24 PRBs in SS SCS), the CORESET configuration can be different from the above tables, since the frequency offset indication can be different when using different SS raster. A summary of the frequency offset (PRB level) configuration for this example is shown in TABLE 9.

TABLE 9

Examples of configuration of ΔF2 for TDM case

| SCS_SS (kHz) | SCS_RMSI(kHz) | CORESET BW (PRB) | Carrier BW (PRB) | # config | Offset values ΔF2 (PRB) |
|---|---|---|---|---|---|
| 15 | 15 | 24 | 52 | 2 | 0, 4 |
| 15 | 15 | 48 | 52 | 6 | 2, 7, 12, 17, 22, 27 |
| 15 | 15 | 96 | 106 | 3 | 27, 38, 49 |
| 15 | 30 | 12 | 24 | 2 | 0, 2 |
| 15 | 30 | 24 | 24 | 15 | 0, 1, 2, . . . , 13, 14 |
| 15 | 30 | 24 | 51 or 50 | 1 | 7 |
| 15 | 30 | 48 | 51 | 4 | 13, 17, 21, 25 |
| 15 | 30 | 48 | 50 | 5 | 13, 16, 19, 22, 25 |

In such example for SCS_CORESET=15 kHz, if carrier BW is 10 MHz, which is 52 PRBs in both SS and RMSI numerology, and RMSI CORESET BW is 24 PRBs, the Indication Range can be the same as SS raster (e.g. 24 PRBs in SS SCS), and Δf2=29 PRBs, so N_ΔF2=1, i.e., 1 configuration is sufficient to configure the PRB-level frequency offset between the edges of SS block and RMSI CORESET, and the possible value can be 2 PRBs in term of the RMSI CORESET numerology.

In such example for SCS_CORESET=15 kHz, if carrier BW is 10 MHz, which is 52 PRBs in both SS and RMSI numerology, and RMSI CORESET BW is 48 PRBs, the Indication Range can be the same as SS raster (e.g. 24 PRBs in SS SCS), and Δf2=5 PRBs, so N_ΔF2=5, i.e., 5 configurations are sufficient to configure the PRB-level frequency offset between the edges of SS block and RMSI CORESET, and the possible values can be 4, 9, 14, 19, 24 PRBs in term of the RMSI CORESET numerology (Note that the selection of the values for the offset can be from other sets as well, but the interval has to be 5 PRBs in this case. For example, possible values for the offset can also be X, X+5, X+10, X+15, X+20, where X can be 0 or 1 or 2 or 3 or 4 or 5 or 6 or 7).

In such example for SCS_CORESET=15 kHz, if carrier BW is 20 MHz (exceeding the min CH BW in this case), which is 106 PRBs in both SS and RMSI numerology, and RMSI CORESET BW is 96 PRBs, the Indication Range can be the same as SS raster (e.g. 24 PRBs in SS SCS), and Δf2=11 PRBs, so N_ΔF2=3, 3 configurations are suf-ficient to configure the PRB-level frequency offset between the edges of SS block and RMSI CORESET, and the possible values can be 27, 38, 49 PRBs in term of the RMSI CORESET numerology.

In such example for SCS_CORESET=30 kHz, if carrier BW is 10 MHz, which is 52 PRBs in SS numerology and 24 PRBs in RMSI numerology, and RMSI CORESET BW is 24 PRBs, the Indication Range can be the same as SS raster (e.g. 24 PRBs in SS SCS and same as 12 PRBs in RMSI numerology), and Δf2=1 PRBs, so N_ΔF2=12, i.e., 12 configurations are sufficient to configure the PRB-level frequency offset between the edges of SS block and RMSI CORESET, and the possible values can be 1, . . . , 12 PRBs in term of the RMSI CORESET numerology.

In such example for SCS_CORESET=30 kHz, if carrier BW is 20 MHz (exceeding the min CH BW), which is 106 PRBs in SS numerology and 51 PRBs in RMSI numerology, and RMSI CORESET BW is 24 PRBs, the Indication Range can be the same as SS raster (e.g. 24 PRBs in SS SCS and same as 12 PRBs in RMSI numerology), and Δf2=28 PRBs, so N_ΔF2=1, i.e., 1 configurations are sufficient to configure the PRB-level frequency offset between the edges of SS block and RMSI CORESET, and the possible values can be 7 PRBs in term of the RMSI CORESET numerology. If the channel utilization of this case for RMSI is only 50 PRBs due to filter design, Δf2=27 PRBs, so still 1 configuration is sufficient, and the possible value can be 7 PRBs in term of the RMSI CORESET numerology.

In such example for SCS_CORESET=30 kHz, if carrier BW is 20 MHz (exceeding the min CH BW), which is 106 PRBs in SS numerology and 51 PRBs in RMSI numerology, and RMSI CORESET BW is 48 PRBs, the Indication Range can be the same as SS raster (e.g. 24 PRBs in SS SCS and same as 12 PRBs in RMSI numerology), and Δf2=4 PRBs, so N_ΔF2=3, i.e., 3 configurations are sufficient to configure the PRB-level frequency offset between the edges of SS block and RMSI CORESET, and the possible values can be 15, 19, 23 PRBs in term of the RMSI CORESET numerology. If the channel utilization of this case for RMSI is only 50 PRBs due to filter design, Δf2=3 PRBs, so N_ΔF2=4, i.e., 4 configurations are sufficient, and the possible values can be X, X+3, X+6, X+9 PRBs in term of the RMSI CORESET numerology, where X can be 14 or 15.

One example of the CORESET configuration (frequency PRB offset combined with different choice of number of symbols for CORESET) for bands with 10 MHz min CH BW and 15 kHz SS SCS can be summarized in TABLE 10s, wherein TABLE 10A is for {SS SCS, RMSI SCS}={15 kHz, 15 kHz}, and TABLE 10B is for {SS SCS, RMSI SCS}={15 kHz, 30 kHz} when channel utilization of 30 kHz is 51 PRBs, and TABLE 10C is for {SS SCS, RMSI SCS}={15 kHz, 30 kHz} when channel utilization of 30 kHz is 50 PRBs.

If CORESET configuration tables for min CH BW=5 MHz and min CH BW=10 MHz are both supported, in one approach, there is no indication of the configuration tables and UE needs to blindly detect if the SS raster aligned or too close that UE cannot distinguish in initial cell search. If CORESET configuration tables for min CH BW=5 MHz and min CH BW=10 MHz are both supported, in another approach, there is an indication of the band(s) number/configuration tables/carrier frequency ranges using one bit in PBCH. In one example, the bit utilized to indicate can be a reserved bit in PBCH and for <3 GHz only. In another example, the bit utilized to indicate can be the field in PBCH originally used for half frame indication, and then the half frame indication in PBCH is only for >3 GHz, and the same field is utilized to indicate the band(s) number/configuration tables/carrier frequency ranges.

TABLE 10A

RMSI CORESET configuration at least for bands with min CH BW as 10 MHz, when {SS SCS, RMSI SCS} = {15 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 2 |
| 2 | Pattern 1 | 48 | 1 | 4 |
| 3 | Pattern 1 | 48 | 1 | 9 |
| 4 | Pattern 1 | 48 | 1 | 14 |
| 5 | Pattern 1 | 48 | 1 | 19 |
| 6 | Pattern 1 | 48 | 1 | 24 |
| 7 | Pattern 1 | 48 | 2 | 4 |
| 8 | Pattern 1 | 48 | 2 | 9 |
| 9 | Pattern 1 | 48 | 2 | 14 |
| 10 | Pattern 1 | 48 | 2 | 19 |
| 11 | Pattern 1 | 48 | 2 | 24 |
| 12 | Pattern 1 | 48 | 3 | 4 |
| 13 | Pattern 1 | 48 | 3 | 9 |
| 14 | Pattern 1 | 48 | 3 | 14 |
| 15 | Pattern 1 | 48 | 3 | 19 |
| 16 | Pattern 1 | 48 | 3 | 24 |

TABLE 10B

RMSI CORESET configuration at least for bands with min CH BW as 10 MHz, when {SS SCS, RMSI SCS} = {15 kHz, 30 kHz}.

| Config-uration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 1 |
| 2 | Pattern 1 | 24 | 2 | 2 |
| 3 | Pattern 1 | 24 | 2 | 3 |
| 4 | Pattern 1 | 24 | 2 | 4 |
| 5 | Pattern 1 | 24 | 2 | 5 |
| 6 | Pattern 1 | 24 | 2 | 6 |
| 7 | Pattern 1 | 24 | 2 | 7 |
| 8 | Pattern 1 | 24 | 2 | 8 |
| 9 | Pattern 1 | 24 | 2 | 9 |
| 10 | Pattern 1 | 24 | 2 | 10 |
| 11 | Pattern 1 | 24 | 2 | 11 |
| 12 | Pattern 1 | 24 | 2 | 12 |
| 13 | Pattern 1 | 48 | 2 | 15 |
| 14 | Pattern 1 | 48 | 2 | 18 |
| 15 | Pattern 1 | 48 | 2 | 21 |
| 16 | Pattern 1 | 48 | 2 | 24 |

TABLE 10C

RMSI CORESET configuration at least for bands with min CH BW as 10 MHz, when {SS SCS, RMSI SCS} = {15 kHz, 30 kHz}

| Config-uration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 1 |
| 2 | Pattern 1 | 24 | 2 | 2 |
| 3 | Pattern 1 | 24 | 2 | 3 |
| 4 | Pattern 1 | 24 | 2 | 4 |
| 5 | Pattern 1 | 24 | 2 | 5 |
| 6 | Pattern 1 | 24 | 2 | 6 |
| 7 | Pattern 1 | 24 | 2 | 7 |
| 8 | Pattern 1 | 24 | 2 | 8 |
| 9 | Pattern 1 | 24 | 2 | 9 |
| 10 | Pattern 1 | 24 | 2 | 10 |
| 11 | Pattern 1 | 24 | 2 | 11 |
| 12 | Pattern 1 | 24 | 2 | 12 |
| 13 | Pattern 1 | 48 | 2 | 15 |
| 14 | Pattern 1 | 48 | 2 | 18 |
| 15 | Pattern 1 | 48 | 2 | 21 |
| 16 | Pattern 1 | 48 | 2 | 24 |

In a second example, if for a NR band, the min CH BW=10 MHz, and SS SCS is determined as 15 kHz. For this band, the SS raster can be defined as 3600 kHz (20 PRBs in SS SCS), the CORESET configuration can be different from the above tables, since the frequency offset indication can be different when using different SS raster. A summary of the frequency offset (PRB level) configuration for this example is shown in TABLE 11.

TABLE 11

Examples of configuration of ΔF2 for TDM case

| SCS_SS (kHz) | SCS_RMSI(kHz) | CORESET BW (PRB) | Carrier BW (PRB) | # config | Offset values ΔF2 (PRB) |
|---|---|---|---|---|---|
| 15 | 15 | 24 | 52 | 1 | 2 |
| 15 | 15 | 48 | 52 | 4 | 7, 12, 17, 22 |
| 15 | 15 | 96 | 106 | 2 | 0, 76 |
| 15 | 30 | 24 | 24 | 10 | 2, . . . , 11 |
| 15 | 30 | 48 | 51 | 3 | 15, 19, 23 |
| 15 | 30 | 48 | 50 | 4 | 15, 18, 21, 24 |

In such example for SCS_CORESET=15 kHz, if carrier BW is 10 MHz, which is 52 PRBs in both SS and RMSI numerology, and RMSI CORESET BW is 24 PRBs, the Indication Range can be the same as SS raster (e.g. 20 PRBs in SS SCS), and Δf2=29 PRBs, so N_ΔF2=1, i.e., 1 configuration is sufficient to configure the PRB-level frequency offset between the edges of SS block and RMSI CORESET, and the possible value can be 2 PRBs in term of the RMSI CORESET numerology.

In such example for SCS_CORESET=15 kHz, if carrier BW is 10 MHz, which is 52 PRBs in both SS and RMSI numerology, and RMSI CORESET BW is 48 PRBs, the Indication Range can be the same as SS raster (e.g. 20 PRBs in SS SCS), and Δf2=5 PRBs, so N_ΔF2=4, i.e., 4 configurations are sufficient to configure the PRB-level frequency offset between the edges of SS block and RMSI CORESET, and the possible values can be 7, 12, 17, 22 PRBs in term of the RMSI CORESET numerology (Note that the selection of the values for the offset can be from other sets as well, but the interval has to be 5 PRBs in this case. For example, possible values for the offset can also be X, X+5, X+10, X+15, where X can be 0 or 1 or 2 or 3 or 4 or 5 or 6 or 7).

In such example for SCS_CORESET=15 kHz, if carrier BW is 20 MHz (exceeding the min CH BW in this case), which is 106 PRBs in both SS and RMSI numerology, and RMSI CORESET BW is 96 PRBs, the Indication Range can be the same as SS raster (e.g. 20 PRBs in SS SCS), and Δf2=11 PRBs, so N_ΔF2=2, i.e., 2 configurations are sufficient to configure the PRB-level frequency offset between the edges of SS block and RMSI CORESET, and the possible values can be 0, 76 PRBs in term of the RMSI CORESET numerology.

In such example for SCS_CORESET=30 kHz, if carrier BW is 10 MHz, which is 52 PRBs in SS numerology and 24 PRBs in RMSI numerology, and RMSI CORESET BW is 24 PRBs, the Indication Range can be the same as SS raster (e.g. 20 PRBs in SS SCS and same as 10 PRBs in RMSI numerology), and Δf2=1 PRBs, so N_ΔF2=10, i.e., 10 configurations are sufficient to configure the PRB-level frequency offset between the edges of SS block and RMSI CORESET, and the possible values can be 2, . . . , 11 PRBs in term of the RMSI CORESET numerology.

In such example for SCS_CORESET=30 kHz, if carrier BW is 20 MHz (exceeding the min CH BW), which is 106 PRBs in SS numerology and 51 PRBs in RMSI numerology, and RMSI CORESET BW is 48 PRBs, the Indication Range can be the same as SS raster (e.g. 20 PRBs in SS SCS and same as 10 PRBs in RMSI numerology), and Δf2=4 PRBs, so N_ΔF2=3, i.e., 3 configurations are sufficient to configure the PRB-level frequency offset between the edges of SS block and RMSI CORESET, and the possible values can be 15, 19, 23 PRBs in term of the RMSI CORESET numerology. If the channel utilization of this case for RMSI is only 50 PRBs due to filter design, Δf2=3 PRBs, so N_ΔF2=4, i.e., 4 configurations are sufficient, and the possible values can be X, X+3, X+6, X+9 PRBs in term of the RMSI CORESET numerology, where X can be 14 or 15.

One example of the CORESET configuration (frequency PRB offset combined with different choice of number of symbols for CORESET) for bands with 10 MHz min CH BW and 15 kHz SS SCS can be summarized in TABLE 12s, wherein TABLE 12A is for {SS SCS, RMSI SCS}={15 kHz, 15 kHz}, and TABLE 12B is for {SS SCS, RMSI SCS}={15 kHz, 30 kHz} when channel utilization of 30 kHz is 51 PRBs, and TABLE 12C is for {SS SCS, RMSI SCS}={15 kHz, 30 kHz} when channel utilization of 30 kHz is 50 PRBs.

If CORESET configuration tables for min CH BW=5 MHz and min CH BW=10 MHz are both supported, in one approach, there is no indication of the configuration tables and UE needs to blindly detect if the SS raster aligned or too close that UE cannot distinguish in initial cell search.

If CORESET configuration tables for min CH BW=5 MHz and min CH BW=10 MHz are both supported, in another approach, there is an indication of the band(s) number/configuration tables/carrier frequency ranges using one bit in PBCH. In one example, the bit utilized to indicate can be a reserved bit in PBCH and for <3 GHz only. In another example, the bit utilized to indicate can be the field in PBCH originally used for half frame indication, and then the half frame indication in PBCH is only for >3 GHz, and the same field is utilized to indicate the band(s) number/configuration tables/carrier frequency ranges.

TABLE 12A

RMSI CORESET configuration at least for bands with min CH BW as 10 MHz, when {SS SCS, RMSI SCS} = {15 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 2 |
| 2 | Pattern 1 | 24 | 3 | 2 |
| 3 | Pattern 1 | 48 | 1 | 7 |
| 4 | Pattern 1 | 48 | 1 | 12 |
| 5 | Pattern 1 | 48 | 1 | 17 |
| 6 | Pattern 1 | 48 | 1 | 22 |
| 7 | Pattern 1 | 48 | 2 | 7 |
| 8 | Pattern 1 | 48 | 2 | 12 |
| 9 | Pattern 1 | 48 | 2 | 17 |
| 10 | Pattern 1 | 48 | 2 | 22 |
| 11 | Pattern 1 | 48 | 3 | 7 |
| 12 | Pattern 1 | 48 | 3 | 12 |
| 13 | Pattern 1 | 48 | 3 | 17 |
| 14 | Pattern 1 | 48 | 3 | 22 |
| 15 | Pattern 1 | 96 | 1 | 0 |
| 16 | Pattern 1 | 96 | 1 | 76 |

TABLE 12B

RMSI CORESET configuration at least for bands with min CH BW as 10 MHz, when {SS SCS, RMSI SCS} = {15 kHz, 30 kHz}

| Configuration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 2 |
| 2 | Pattern 1 | 24 | 2 | 3 |
| 3 | Pattern 1 | 24 | 2 | 4 |
| 4 | Pattern 1 | 24 | 2 | 5 |
| 5 | Pattern 1 | 24 | 2 | 6 |
| 6 | Pattern 1 | 24 | 2 | 7 |
| 7 | Pattern 1 | 24 | 2 | 8 |
| 8 | Pattern 1 | 24 | 2 | 9 |
| 9 | Pattern 1 | 24 | 2 | 10 |
| 10 | Pattern 1 | 24 | 2 | 11 |
| 11 | Pattern 1 | 48 | 1 | 15 |
| 12 | Pattern 1 | 48 | 1 | 19 |
| 13 | Pattern 1 | 48 | 1 | 23 |
| 14 | Pattern 1 | 48 | 2 | 15 |
| 15 | Pattern 1 | 48 | 2 | 19 |
| 16 | Pattern 1 | 48 | 2 | 23 |

TABLE 12C

RMSI CORESET configuration at least for bands with min CH BW as 10 MHz, when {SS SCS, RMSI SCS} = {15 kHz, 30 kHz}

| Config-uration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 2 |
| 2 | Pattern 1 | 24 | 2 | 3 |
| 3 | Pattern 1 | 24 | 2 | 4 |
| 4 | Pattern 1 | 24 | 2 | 5 |
| 5 | Pattern 1 | 24 | 2 | 6 |
| 6 | Pattern 1 | 24 | 2 | 7 |
| 7 | Pattern 1 | 24 | 2 | 8 |
| 8 | Pattern 1 | 24 | 2 | 9 |
| 9 | Pattern 1 | 24 | 2 | 10 |
| 10 | Pattern 1 | 24 | 2 | 11 |
| 11 | Pattern 1 | 48 | 2 | 15 |
| 12 | Pattern 1 | 48 | 2 | 18 |
| 13 | Pattern 1 | 48 | 2 | 21 |
| 14 | Pattern 1 | 48 | 2 | 24 |
| 15 | | | Reserved | |
| 16 | | | Reserved | |

In a third example, if for a NR band, the min CH BW=40 MHz, and SS SCS is determined as 30 kHz. For this band, if the SS raster is defined as 30240 kHz (84 PRBs in SS SCS) or smaller, the CORESET configuration can be different from the above tables, since the frequency offset indication can be different when using different SS raster. A summary of the frequency offset (PRB level) configuration scheme is shown in TABLE 13.

Note that in the discussion, the max TX BW is 40 MHz, and if the min UE BW is defined as 20 MHz, the configurations for 192 PRBs of RMSI CORESET BW with 15 kHz RMSI SCS, and for 96 PRBs of RMSI CORESET BW with 30 kHz RMSI SCS are not supported.

TABLE 13

Examples of configuration of ΔF2 for TDM case

| SCS_SS (kHz) | SCS_RMSI(kHz) | CORESET BW (PRB) | Carrier BW (PRB) | # config | Offset values ΔF2 (PRB) |
|---|---|---|---|---|---|
| 30 | 15 | 48 | 216 | 1 | 4 |
| 30 | 15 | 96 | 216 | 2 | 0, 56 |
| 30 | 15 | 192 | 216 | 7 | 1, 26, 51, 76, 101, 126, 151 |
| 30 | 30 | 24 | 106 | 2 | 0, 4 |
| 30 | 30 | 48 | 106 | 2 | 0, 28 |
| 30 | 30 | 96 | 106 | 8 | 0, 11, 22, 33, 43, 54, 65, 76 |

In such example for SCS_CORESET=15 kHz, if carrier BW is 40 MHz, which is 106 PRBs in SS numerology and 216 in RMSI numerology, and RMSI CORESET BW is 48 PRBs, the Indication Range can be the same as SS raster (e.g. 84 PRBs in SS SCS and 168 PRBs in RMSI SCS), and Δf2=169 PRBs, so N_ΔF2=1, i.e., 1 configurations are sufficient to configure the PRB-level frequency offset between the edges of SS block and RMSI CORESET, and the possible values can be 4 PRBs in term of the RMSI CORESET numerology.

In such example for SCS_CORESET=15 kHz, if carrier BW is 40 MHz, which is 106 PRBs in SS numerology and 216 in RMSI numerology, and RMSI CORESET BW is 96 PRBs, the Indication Range can be the same as SS raster (e.g. 84 PRBs in SS SCS and 168 PRBs in RMSI SCS), and Δf2=121 PRBs, so N_ΔF2=2, i.e., 2 configurations are sufficient to configure the PRB-level frequency offset between the edges of SS block and RMSI CORESET, and the possible values can be 0, 56 PRBs in term of the RMSI CORESET numerology.

In such example for SCS_CORESET=15 kHz, if carrier BW is 40 MHz, which is 106 PRBs in SS numerology and 216 in RMSI numerology, and RMSI CORESET BW is 192 PRBs, the Indication Range can be the same as SS raster (e.g. 84 PRBs in SS SCS and 168 PRBs in RMSI SCS), and Δf2=25 PRBs, so N_ΔF2=7, i.e., 7 configurations are sufficient to configure the PRB-level frequency offset between the edges of SS block and RMSI CORESET, and the possible values can be X, X+25, X+50, X+75, X+100, X+125, X+150 PRBs in term of the RMSI CORESET numerology, where X can be 0, or 1, or 2.

In such example for SCS_CORESET=30 kHz, if carrier BW is 40 MHz, which is 106 PRBs in both SS and RMSI numerology, and RMSI CORESET BW is 24 PRBs, the Indication Range can be the same as SS raster (e.g. 84 PRBs in SS SCS), and Δf2=83 PRBs, so N_ΔF2=2, i.e., 2 configurations are sufficient to configure the PRB-level frequency offset between the edges of SS block and RMSI CORESET, and the possible values can be 0, 4 PRBs in term of the RMSI CORESET numerology.

In such example for SCS_CORESET=30 kHz, if carrier BW is 40 MHz, which is 106 PRBs in both SS and RMSI numerology, and RMSI CORESET BW is 48 PRBs, the Indication Range can be the same as SS raster (e.g. 84 PRBs in SS SCS), and Δf2=59 PRBs, so N_ΔF2=2, i.e., 2 configurations are sufficient to configure the PRB-level frequency offset between the edges of SS block and RMSI CORESET, and the possible values can be 0, 28 PRBs in term of the RMSI CORESET numerology.

In such example for SCS_CORESET=30 kHz, if carrier BW is 40 MHz, which is 106 PRBs in both SS and RMSI numerology, and RMSI CORESET BW is 96 PRBs, the Indication Range can be the same as SS raster (e.g. 84 PRBs in SS SCS), and Δf2=11 PRBs, so N_ΔF2=8, i.e., 8 configurations are sufficient to configure the PRB-level frequency offset between the edges of SS block and RMSI CORESET, and the possible values can be 0, 11, 22, 33, 43, 54, 65, 76 PRBs in term of the RMSI CORESET numerology.

One example of the CORESET configuration (frequency PRB offset combined with different choice of number of symbols for CORESET) for bands with 40 MHz min CH BW and 30 kHz SS SCS can be summarized in TABLE 14A and TABLE 14B, where the two tables are determined for different combination of {SCS_SS, SCS_RMSI}, e.g. TABLE 14A is for {SS SCS, RMSI SCS}={30 kHz, 15 kHz}, and TABLE 14B is for {SS SCS, RMSI SCS}={30 kHz, 30 kHz}. Note that the min UE BW is assumed to be 20 MHz for this band (e.g. configurations for 192 PRBs of RMSI CORESET BW with 15 kHz RMSI SCS, and for 96

PRBs of RMSI CORESET BW with 30 kHz RMSI SCS are not supported). Also note that the tables can also be utilized for other bands if the sync raster is same or smaller than the one for bands with 40 MHz min CH BW.

TABLE 14A

RMSI CORESET configuration at least for bands with min CH BW as 40 MHz, when {SS SCS, RMSI SCS} = {30 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 48 | 1 | 4 |
| 2 | Pattern 1 | 48 | 2 | 4 |
| 3 | Pattern 1 | 48 | 3 | 4 |
| 4 | Pattern 1 | 96 | 1 | 0 |
| 5 | Pattern 1 | 96 | 1 | 56 |
| 6 | Pattern 1 | 96 | 2 | 0 |
| 7 | Pattern 1 | 96 | 2 | 56 |
| 8 | Pattern 1 | 96 | 3 | 0 |
| 9 | Pattern 1 | 96 | 3 | 56 |
| 10 | Reserved | | | |
| 11 | Reserved | | | |
| 12 | Reserved | | | |
| 13 | Reserved | | | |
| 14 | Reserved | | | |
| 15 | Reserved | | | |
| 16 | Reserved | | | |

TABLE 14B

RMSI CORESET configuration at least for bands with min CH BW as 40 MHz, when {SS SCS, RMSI SCS} = {30 kHz, 30 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 4 |
| 3 | Pattern 1 | 24 | 3 | 0 |
| 4 | Pattern 1 | 24 | 3 | 4 |
| 5 | Pattern 1 | 48 | 1 | 0 |
| 6 | Pattern 1 | 48 | 1 | 28 |
| 7 | Pattern 1 | 48 | 2 | 0 |
| 8 | Pattern 1 | 48 | 2 | 28 |
| 9 | Pattern 1 | 48 | 3 | 0 |
| 10 | Pattern 1 | 48 | 3 | 28 |
| 11 | Reserved | | | |
| 12 | Reserved | | | |
| 13 | Reserved | | | |
| 14 | Reserved | | | |
| 15 | Reserved | | | |
| 16 | Reserved | | | |

In a fourth example, if for a NR band, the min CH BW=40 MHz, and SS SCS is determined as 30 kHz. For this band, if the SS raster is defined as 23040 kHz (64 PRBs in SS SCS), the CORESET configuration can be different from the above tables, since the frequency offset indication can be different when using different SS raster. A summary of the frequency offset (PRB level) configuration scheme is shown in TABLE 15.

Note that in the discussion, the max TX BW is 40 MHz, and if the min UE BW is defined as 20 MHz, the configurations for 192 PRBs of RMSI CORESET BW with 15 kHz RMSI SCS, and for 96 PRBs of RMSI CORESET BW with 30 kHz RMSI SCS are not supported.

TABLE 15

Examples of configuration of ΔF2 for TDM case

| SCS_SS (kHz) | SCS_RMSI (kHz) | CORESET BW (PRB) | Carrier BW (PRB) | # config | Offset values ΔF2 (PRB) |
|---|---|---|---|---|---|
| 30 | 15 | 48 | 216 | 1 | 4 |
| 30 | 15 | 96 | 216 | 2 | 0, 56 |
| 30 | 15 | 192 | 216 | 6 | 14, 39, 64, 89, 114, 139 |
| 30 | 30 | 24 | 106 | 1 | 2 |
| 30 | 30 | 48 | 106 | 2 | 0, 28 |
| 30 | 30 | 96 | 106 | 6 | 11, 22, 33, 44, 55, 66 |

In this example for SCS_CORESET=15 kHz, if carrier BW is 40 MHz, which is 106 PRBs in SS numerology and 216 in RMSI numerology, and RMSI CORESET BW is 48 PRBs, the Indication Range can be the same as SS raster (e.g. 64 PRBs in SS SCS and 128 PRBs in RMSI SCS), and Δf2=169 PRBs, so N_ΔF2=1, i.e., 1 configurations are sufficient to configure the PRB-level frequency offset between the edges of SS block and RMSI CORESET, and the possible values can be 4 PRBs in term of the RMSI CORESET numerology.

In such example for SCS_CORESET=15 kHz, if carrier BW is 40 MHz, which is 106 PRBs in SS numerology and 216 in RMSI numerology, and RMSI CORESET BW is 96 PRBs, the Indication Range can be the same as SS raster (e.g. 64 PRBs in SS SCS and 128 PRBs in RMSI SCS), and Δf2=121 PRBs, so N_ΔF2=2, i.e., 2 configurations are sufficient to configure the PRB-level frequency offset between the edges of SS block and RMSI CORESET, and the possible values can be 0, 56 PRBs in term of the RMSI CORESET numerology.

In such example for SCS_CORESET=15 kHz, if carrier BW is 40 MHz, which is 106 PRBs in SS numerology and 216 in RMSI numerology, and RMSI CORESET BW is 192 PRBs, the Indication Range can be the same as SS raster (e.g. 64 PRBs in SS SCS and 128 PRBs in RMSI SCS), and $\Delta f2=25$ PRBs, so $N\_\Delta F2=6$, i.e., 7 configurations are sufficient to configure the PRB-level frequency offset between the edges of SS block and RMSI CORESET, and the possible values can be X, X+25, X+50, X+75, X+100, X+125PRBs in term of the RMSI CORESET numerology, where X can be 14 or 15.

In such example for SCS_CORESET=30 kHz, if carrier BW is 40 MHz, which is 106 PRBs in both SS and RMSI numerology, and RMSI CORESET BW is 24 PRBs, the Indication Range can be the same as SS raster (e.g. 64 PRBs in SS SCS), and $\Delta f2=83$ PRBs, so $N\_\Delta F2=1$, i.e., 1 configuration is sufficient to configure the PRB-level frequency offset between the edges of SS block and RMSI CORESET, and the possible value can be 2 PRBs in term of the RMSI CORESET numerology.

In such example for SCS_CORESET=30 kHz, if carrier BW is 40 MHz, which is 106 PRBs in both SS and RMSI numerology, and RMSI CORESET BW is 48 PRBs, the Indication Range can be the same as SS raster (e.g. 64 PRBs in SS SCS), and $\Delta f2=59$ PRBs, so $N\_\Delta F2=2$, i.e., 2 configurations are sufficient to configure the PRB-level frequency offset between the edges of SS block and RMSI CORESET, and the possible values can be 0, 28 PRBs in term of the RMSI CORESET numerology.

In such example for SCS_CORESET=30 kHz, if carrier BW is 40 MHz, which is 106 PRBs in both SS and RMSI numerology, and RMSI CORESET BW is 96 PRBs, the Indication Range can be the same as SS raster (e.g. 64 PRBs in SS SCS), and $\Delta f2=11$ PRBs, so $N\_\Delta F2=6$, i.e., 6 configurations are sufficient to configure the PRB-level frequency offset between the edges of SS block and RMSI CORESET, and the possible values can be X+11, X+22, X+33, X+44, X+55, X+66 PRBs in term of the RMSI CORESET numerology, where X can be 0 or −1.

One example of the CORESET configuration (frequency PRB offset combined with different choice of number of symbols for CORESET) for bands with 40 MHz min CH BW and 30 kHz SS SCS can be summarized in TABLE 16A and TABLE 16B, where the two tables are determined for different combination of {SCS_SS, SCS_RMSI}, e.g. TABLE 16A is for {SS SCS, RMSI SCS}={30 kHz, 15 kHz}, and TABLE 16B is for {SS SCS, RMSI SCS}={30 kHz, 30 kHz}. Note that the min UE BW is assumed to be 20 MHz for this band (e.g. configurations for 192 PRBs of RMSI CORESET BW with 15 kHz RMSI SCS, and for 96 PRBs of RMSI CORESET BW with 30 kHz RMSI SCS are not supported). Also note that the tables can also be utilized for other bands if the sync raster is same or smaller than the one for bands with 40 MHz min CH BW.

TABLE 16A

RMSI CORESET configuration at least for bands with min CH BW as 40 MHz, when {SS SCS, RMSI SCS} = {30 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 48 | 1 | 4 |
| 2 | Pattern 1 | 48 | 2 | 4 |
| 3 | Pattern 1 | 48 | 3 | 4 |
| 4 | Pattern 1 | 96 | 1 | 0 |
| 5 | Pattern 1 | 96 | 1 | 56 |
| 6 | Pattern 1 | 96 | 2 | 0 |
| 7 | Pattern 1 | 96 | 2 | 56 |
| 8 | Pattern 1 | 96 | 3 | 0 |
| 9 | Pattern 1 | 96 | 3 | 56 |
| 10 | Reserved | | | |
| 11 | Reserved | | | |
| 12 | Reserved | | | |
| 13 | Reserved | | | |
| 14 | Reserved | | | |
| 15 | Reserved | | | |
| 16 | Reserved | | | |

TABLE 16B

RMSI CORESET configuration at least for bands with min CH BW as 40 MHz, when {SS SCS, RMSI SCS} = {30 kHz, 30 kHz}.

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 2 |
| 2 | Pattern 1 | 24 | 3 | 2 |
| 3 | Pattern 1 | 48 | 1 | 0 |
| 4 | Pattern 1 | 48 | 1 | 28 |
| 5 | Pattern 1 | 48 | 2 | 0 |
| 6 | Pattern 1 | 48 | 2 | 28 |
| 7 | Pattern 1 | 48 | 3 | 0 |
| 8 | Pattern 1 | 48 | 3 | 28 |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |
| 16 | Reserved | | | |

In a fifth example, if for a NR band, the min CH BW=20 MHz, and SS SCS is determined as 30 kHz. For this band, if the SS raster is defined as 10080 kHz (28 PRBs in SS SCS), the CORESET configuration can be different from the above tables, since the frequency offset indication can be different when using different SS raster. A summary of the frequency offset (PRB level) configuration scheme is shown in TABLE 17.

TABLE 17

Examples of configuration of ΔF2 for TDM case

| SCS_SS (kHz) | SCS_RMSI(kHz) | CORESET BW (PRB) | Carrier BW (PRB) | # config | Offset values ΔF2 (PRB) |
|---|---|---|---|---|---|
| 30 | 15 | 48 | 106 | 1 | 4 |
| 30 | 15 | 96 | 106 | 6 | 0, 11, 22, 33, 44, 55 |
| 30 | 30 | 24 | 51 | 1 | 2 |
| 30 | 30 | 48 | 51 | 7 | 2, 6, 10, 14, 18, 22, 26 |

In this example for SCS_CORESET=15 kHz, if carrier BW is 20 MHz, which is 51 PRBs in SS numerology and 106 in RMSI numerology, and RMSI CORESET BW is 48 PRBs, the Indication Range can be the same as SS raster (e.g. 28 PRBs in SS SCS and 56 PRBs in RMSI SCS), and Δf2=59 PRBs, so N_ΔF2=1, i.e., 1 configuration is sufficient to configure the PRB-level frequency offset between the edges of SS block and RMSI CORESET, and the possible values can be 4 PRBs in term of the RMSI CORESET numerology.

In such example for SCS_CORESET=15 kHz, if carrier BW is 20 MHz, which is 51 PRBs in SS numerology and 106 in RMSI numerology, and RMSI CORESET BW is 96 PRBs, the Indication Range can be the same as SS raster (e.g. 28 PRBs in SS SCS and 56 PRBs in RMSI SCS), and Δf2=11 PRBs, so N_ΔF2=6, i.e., 6 configurations are sufficient to configure the PRB-level frequency offset between the edges of SS block and RMSI CORESET, and the possible values can be X, X+11, X+22, X+33, X+44, X+55 PRBs in term of the RMSI CORESET numerology, where X can be 0 or 1.

In such example for SCS_CORESET=30 kHz, if carrier BW is 20 MHz, which is 51 PRBs in SS and RMSI numerology, and RMSI CORESET BW is 24 PRBs, the Indication Range can be the same as SS raster (e.g. 28 PRBs in SS SCS and RMSI SCS), and Δf2=28 PRBs, so N_ΔF2=1, i.e., 1 configuration is sufficient to configure the PRB-level frequency offset between the edges of SS block and RMSI CORESET, and the possible values can be 2 PRBs in term of the RMSI CORESET numerology.

In such example for SCS_CORESET=30 kHz, if carrier BW is 20 MHz, which is 51 PRBs in SS and RMSI numerology, and RMSI CORESET BW is 48 PRBs, the Indication Range can be the same as SS raster (e.g. 28 PRBs in SS SCS and RMSI SCS), and Δf2=4 PRBs, so N_ΔF2=7, i.e., 7 configurations are sufficient to configure the PRB-level frequency offset between the edges of SS block and RMSI CORESET, and the possible values can be 2, 6, 10, 14, 18, 22, 26 PRBs in term of the RMSI CORESET numerology.

One example of the CORESET configuration (frequency PRB offset combined with different choice of number of symbols for CORESET) for bands with 20 MHz min CH BW and 30 kHz SS SCS can be summarized in TABLE 18A and TABLE 18B, where the two tables are determined for different combination of {SCS_SS, SCS_RMSI}, e.g. TABLE 18A is for {SS SCS, RMSI SCS}={30 kHz, 15 kHz}, and TABLE 18B is for {SS SCS, RMSI SCS}={30 kHz, 30 kHz}. For one example, X=1 in TABLE 18A. For another example, X=3 in TABLE 18B.

TABLE 18A

RMSI CORESET configuration at least for bands with min CH BW as 20 MHz, when {SS SCS, RMSI SCS} = {30 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 48 | 1 | 4 |
| 2 | Pattern 1 | 48 | 2 | 4 |
| 3 | Pattern 1 | 48 | 3 | 4 |
| 4 | Pattern 1 | 96 | 1 | 0 |
| 5 | Pattern 1 | 96 | 1 | 11 |
| 6 | Pattern 1 | 96 | 1 | 22 |
| 7 | Pattern 1 | 96 | 1 | 33 |
| 8 | Pattern 1 | 96 | 1 | 44 |
| 9 | Pattern 1 | 96 | 1 | 55 |
| 10 | Pattern 1 | 96 | 2 | 0 |
| 11 | Pattern 1 | 96 | 2 | 11 |
| 12 | Pattern 1 | 96 | 2 | 22 |
| 13 | Pattern 1 | 96 | 2 | 33 |
| 14 | Pattern 1 | 96 | 2 | 44 |
| 15 | Pattern 1 | 96 | 2 | 55 |
| 16 | Reserved | | | |

TABLE 18B

RMSI CORESET configuration at least for bands with min CH BW as 20 MHz, when {SS SCS, RMSI SCS} = {30 kHz, 30 kHz}.

| Config. Index | Multiplexing Pattern | CORESET BW in PRB | Number of Symbols for CORESET | Frequency Offset in PRB of RMSI CORESET numerology |
|---|---|---|---|---|
| 1 | Pattern 1 | 24 | 2 | 2 |
| 2 | Pattern 1 | 24 | 3 | 2 |
| 3 | Pattern 1 | 48 | 2 | 2 |
| 4 | Pattern 1 | 48 | 2 | 6 |
| 5 | Pattern 1 | 48 | 2 | 10 |
| 6 | Pattern 1 | 48 | 2 | 14 |
| 7 | Pattern 1 | 48 | 2 | 18 |
| 8 | Pattern 1 | 48 | 2 | 22 |
| 9 | Pattern 1 | 48 | 2 | 26 |
| 10 | Pattern 1 | 48 | X | 2 |
| 11 | Pattern 1 | 48 | X | 6 |
| 12 | Pattern 1 | 48 | X | 10 |
| 13 | Pattern 1 | 48 | X | 14 |
| 14 | Pattern 1 | 48 | X | 18 |
| 15 | Pattern 1 | 48 | X | 22 |
| 16 | Pattern 1 | 48 | X | 26 |

In a sixth example, if for a NR band, the min CH BW=20 MHz, and SS SCS is determined as 30 kHz. For this band, if the SS raster is defined as 8640 kHz (24 PRBs in SS SCS), the CORESET configuration can be different from the above tables, since the frequency offset indication can be different when using different SS raster. A summary of the frequency offset (PRB level) configuration scheme is shown in TABLE 19.

TABLE 19

Examples of configuration of ΔF2 for TDM case

| SCS_SS (kHz) | SCS_RMSI(kHz) | CORESET BW (PRB) | Carrier BW (PRB) | # config | Offset values ΔF2 (PRB) |
|---|---|---|---|---|---|
| 30 | 15 | 48 | 106 | 1 | 4 |
| 30 | 15 | 96 | 106 | 5 | 6, 17, 28, 39, 50 |
| 30 | 30 | 24 | 51 | 1 | 2 |
| 30 | 30 | 48 | 51 | 6 | 4, 8, 12, 16, 20, 24 |

In such example for SCS_CORESET=15 kHz, if carrier BW is 20 MHz, which is 51 PRBs in SS numerology and 106 in RMSI numerology, and RMSI CORESET BW is 48 PRBs, the Indication Range can be the same as SS raster (e.g. 24 PRBs in SS SCS and 48 PRBs in RMSI SCS), and Δf2=59 PRBs, so N_ΔF2=1, i.e., 1 configuration is sufficient to configure the PRB-level frequency offset between the edges of SS block and RMSI CORESET, and the possible values can be 4 PRBs in term of the RMSI CORESET numerology.

In such example for SCS_CORESET=15 kHz, if carrier BW is 20 MHz, which is 51 PRBs in SS numerology and 106 in RMSI numerology, and RMSI CORESET BW is 96 PRBs, the Indication Range can be the same as SS raster (e.g. 24 PRBs in SS SCS and 48 PRBs in RMSI SCS), and Δf2=11 PRBs, so N_ΔF2=5, i.e., 5 configurations are sufficient to configure the PRB-level frequency offset between the edges of SS block and RMSI CORESET, and the possible values can be 6, 17, 28, 39, 50 PRBs in term of the RMSI CORESET numerology.

In such example for SCS_CORESET=30 kHz, if carrier BW is 20 MHz, which is 51 PRBs in SS and RMSI numerology, and RMSI CORESET BW is 24 PRBs, the Indication Range can be the same as SS raster (e.g. 24 PRBs in SS SCS and RMSI SCS), and Δf2=28 PRBs, so N_ΔF2=1, i.e., 1 configuration is sufficient to configure the PRB-level frequency offset between the edges of SS block and RMSI CORESET, and the possible values can be 2 PRBs in term of the RMSI CORESET numerology.

In such example for SCS_CORESET=30 kHz, if carrier BW is 20 MHz, which is 51 PRBs in SS and RMSI numerology, and RMSI CORESET BW is 48 PRBs, the Indication Range can be the same as SS raster (e.g. 24 PRBs in SS SCS and RMSI SCS), and Δf2=4 PRBs, so N_ΔF2=6, i.e., 6 configurations are sufficient to configure the PRB-level frequency offset between the edges of SS block and RMSI CORESET, and the possible values can be 4, 8, 12, 16, 20, 24 PRBs in term of the RMSI CORESET numerology.

One example of the CORESET configuration (frequency PRB offset combined with different choice of number of symbols for CORESET) for bands with 20 MHz min CH BW and 30 kHz SS SCS can be summarized in TABLE 20 and TABLE 20B, where the two tables are determined for different combination of {SCS_SS, SCS_RMSI}, TABLE 20A is for {SS SCS, RMSI SCS}={30 kHz, 15 kHz}, and TABLE 20B is for {SS SCS, RMSI SCS}={30 kHz, 30 kHz}. For one example, X=1 in TABLE 20A. For another example, X=3 in TABLE 20B.

TABLE 20A

RMSI CORESET configuration at least for bands with min CH BW as 20 MHz, when {SS SCS, RMSI SCS} = {30 kHz, 15 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 48 | 1 | 4 |
| 2 | Pattern 1 | 48 | 2 | 4 |
| 3 | Pattern 1 | 48 | 3 | 4 |
| 4 | Pattern 1 | 96 | 1 | 6 |
| 5 | Pattern 1 | 96 | 1 | 17 |
| 6 | Pattern 1 | 96 | 1 | 28 |
| 7 | Pattern 1 | 96 | 1 | 39 |
| 8 | Pattern 1 | 96 | 1 | 50 |
| 9 | Pattern 1 | 96 | 2 | 6 |
| 10 | Pattern 1 | 96 | 2 | 17 |
| 11 | Pattern 1 | 96 | 2 | 28 |
| 12 | Pattern 1 | 96 | 2 | 39 |
| 13 | Pattern 1 | 96 | 2 | 50 |
| 14 | | Reserved | | |
| 15 | | Reserved | | |
| 16 | | Reserved | | |

TABLE 20B

RMSI CORESET configuration at least for bands with min CH BW as 20 MHz, when {SS SCS, RMSI SCS} = {30 kHz, 30 kHz}

| Config. Index | Multiplexing Pattern | CORESET BW in PRB | Number of Symbols for CORESET | Frequency Offset in PRB of RMSI CORESET numerology |
|---|---|---|---|---|
| 1 | Pattern 1 | 24 | 2 | 2 |
| 2 | Pattern 1 | 24 | 3 | 2 |
| 3 | Pattern 1 | 48 | 2 | 4 |
| 4 | Pattern 1 | 48 | 2 | 8 |
| 5 | Pattern 1 | 48 | 2 | 12 |
| 6 | Pattern 1 | 48 | 2 | 16 |
| 7 | Pattern 1 | 48 | 2 | 20 |
| 8 | Pattern 1 | 48 | 2 | 24 |
| 9 | Pattern 1 | 48 | X | 4 |
| 10 | Pattern 1 | 48 | X | 8 |
| 11 | Pattern 1 | 48 | X | 12 |
| 12 | Pattern 1 | 48 | X | 16 |
| 13 | Pattern 1 | 48 | X | 20 |
| 14 | Pattern 1 | 48 | X | 24 |
| 15 | | Reserved | | |
| 16 | | Reserved | | |

In a seventh example, if for a NR band, the min CH BW=100 MHz, and SS SCS is determined as 120 kHz. For this band, if the SS raster is defined as 51840 kHz (36 PRBs in SS SCS), the CORESET configuration can be different from the above tables, since the frequency offset indication can be different when using different SS raster. A summary of the frequency offset (PRB level) configuration scheme, for Pattern 1, is shown in TABLE 21.

TABLE 21

Examples of configuration of ΔF2 for TDM case

| SCS_SS (kHz) | SCS_RMSI(kHz) | CORESET BW (PRB) | Carrier BW (PRB) | # config | Offset values ΔF2 (PRB) |
|---|---|---|---|---|---|
| 120 | 60 | 48 | 132 | 1 | 4 |
| 120 | 60 | 96 | 132 | 2 | 10, 46 |
| 120 | 120 | 24 | 66 | 1 | 2 |
| 120 | 120 | 48 | 66 | 2 | 5, 23 |

In this example for SCS_CORESET=60 kHz and multiplexing Pattern 1, if carrier BW is 100 MHz, which is 66 PRBs in SS numerology and 132 in RMSI numerology, and RMSI CORESET BW is 48 PRBs, the Indication Range can be the same as SS raster (e.g. 36 PRBs in SS SCS and 72 PRBs in RMSI SCS), and Δf2=85 PRBs, so N_ΔF2=1, i.e., 1 configuration is sufficient to configure the PRB-level frequency offset between the edges of SS block and RMSI CORESET, and the possible values can be 4 PRBs in term of the RMSI CORESET numerology.

In such example for SCS_CORESET=60 kHz and multiplexing Pattern 1, if carrier BW is 100 MHz, which is 66 PRBs in SS numerology and 132 in RMSI numerology, and RMSI CORESET BW is 96 PRBs, the Indication Range can be the same as SS raster (e.g. 36 PRBs in SS SCS and 72 PRBs in RMSI SCS), and Δf2=37 PRBs, so N_ΔF2=2, i.e., 2 configurations are sufficient to configure the PRB-level frequency offset between the edges of SS block and RMSI CORESET, and the possible values can be 10, 46 PRBs in term of the RMSI CORESET numerology.

In such example for SCS_CORESET=120 kHz and multiplexing Pattern 1, if carrier BW is 100 MHz, which is 66 PRBs in SS and RMSI numerology, and RMSI CORESET BW is 24 PRBs, the Indication Range can be the same as SS raster (e.g. 36 PRBs in SS and RMSI SCS), and Δf2=43 PRBs, so N_ΔF2=1, i.e., 1 configuration is sufficient to configure the PRB-level frequency offset between the edges of SS block and RMSI CORESET, and the possible values can be 2 PRBs in term of the RMSI CORESET numerology.

In such example for SCS_CORESET=120 kHz and multiplexing Pattern 1, if carrier BW is 100 MHz, which is 66 PRBs in SS and RMSI numerology, and RMSI CORESET BW is 48 PRBs, the Indication Range can be the same as SS raster (e.g. 36 PRBs in SS and RMSI SCS), and Δf2=19 PRBs, so N_ΔF2=2, i.e., 2 configurations are sufficient to configure the PRB-level frequency offset between the edges of SS block and RMSI CORESET, and the possible values can be 5, 23 PRBs in term of the RMSI CORESET numerology.

In such example for multiplexing Pattern 2 and Pattern 3, two configurations (e.g. either on the top of or the bottom of SS block) are sufficient, and the PRB offset value depends on the value of ΔF1 and whether the SCSs of SS and RMSI are the same or not.

One example of the CORESET configuration (frequency PRB offset combined with different choice of number of symbols for CORESET) for bands with 100 MHz min CH BW and 120 kHz SS SCS can be summarized in TABLE 22A and TABLE 22B, where the two tables are determined for different combination of {SCS_SS, SCS_RMSI}, e.g. TABLE 22A is for {SS SCS, RMSI SCS}={120 kHz, 60 kHz}, and TABLE 22B is for {SS SCS, RMSI SCS}={120 kHz, 120 kHz}.

TABLE 22A

RMSI CORESET configuration at least for bands with min CH BW as 100 MHz, when {SS SCS, RMSI SCS} = {120 kHz, 60 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 48 | 1 | 4 |
| 2 | Pattern 1 | 48 | 2 | 4 |
| 3 | Pattern 1 | 96 | 1 | 10 |
| 4 | Pattern 1 | 96 | 1 | 46 |
| 5 | Pattern 1 | 96 | 2 | 10 |
| 6 | Pattern 1 | 96 | 2 | 46 |
| 7 | Pattern 2 | 48 | 1 | −42 if ΔF1 ≠ 0 and −41 if ΔF1 = 0 |
| 8 | Pattern 2 | 48 | 1 | 49 |
| 9 | Pattern 2 | 48 | 2 | −42 if ΔF1 ≠ 0 and −41 if ΔF1 = 0 |
| 10 | Pattern 2 | 48 | 2 | 49 |
| 11 | Pattern 2 | 96 | 1 | −42 if ΔF1 ≠ 0 and −41 if ΔF1 = 0 |
| 12 | Pattern 2 | 96 | 1 | 97 |
| 13 | Pattern 2 | 96 | 2 | −42 if ΔF1 ≠ 0 and −41 if ΔF1 = 0 |
| 14 | Pattern 2 | 96 | 2 | 97 |
| 15 | Reserved | | | |
| 16 | Reserved | | | |

TABLE 22B

RMSI CORESET configuration at least for bands with min CH BW as 100 MHz, when {SS SCS, RMSI SCS} = {120 kHz, 120 kHz}

| Config. Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 2 |
| 2 | Pattern 1 | 48 | 1 | 5 |
| 3 | Pattern 1 | 48 | 1 | 23 |
| 4 | Pattern 1 | 48 | 2 | 5 |
| 5 | Pattern 1 | 48 | 2 | 23 |
| 6 | Pattern 3 | 24 | 2 | −21 if ΔF1 ≠ 0 and −20 if ΔF1 = 0 |
| 7 | Pattern 3 | 24 | 2 | 24 |
| 8 | Pattern 3 | 48 | 2 | −21 if ΔF1 ≠ 0 and −20 if ΔF1 = 0 |
| 9 | Pattern 3 | 48 | 2 | 48 |
| 10 | Reserved | | | |
| 11 | Reserved | | | |
| 12 | Reserved | | | |
| 13 | Reserved | | | |
| 14 | Reserved | | | |
| 15 | Reserved | | | |
| 16 | Reserved | | | |

Merging Configuration Tables.

If multiple CORESET configuration tables can be supported for overlapping bands with different min CH BW, in one approach, the multiple configuration tables can be merged into one table to support both bands.

TABLE 23A to TABLE 23E are examples of merging TABLE 7A and TABLE 12A, for {SS SCS, RMSI SCS}={15 kHz, 15 kHz} to supports bands with min CH BW as 5 MHz or 10 MHz at the same time, if TABLE 7A is exclusively utilized for bands with 5 MHz min CH BW, and TABLE 12A is exclusively utilized for bands with 10 MHz min CH BW.

TABLE 23A

RMSI CORESET configuration at least for bands with min CH BW as 5 MHz or 10 MHz, when {SS SCS, RMSI SCS} = {15 kHz, 15 kHz}

| Configuration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 2 |
| 3 | Pattern 1 | 24 | 2 | 4 |
| 4 | Pattern 1 | 24 | 3 | 0 |
| 5 | Pattern 1 | 24 | 3 | 2 |
| 6 | Pattern 1 | 24 | 3 | 4 |
| 7 | Pattern 1 | 48 | 1 | 12 |
| 8 | Pattern 1 | 48 | 1 | 16 |
| 9 | Pattern 1 | 48 | 2 | 7 |
| 10 | Pattern 1 | 48 | 2 | 12 |
| 11 | Pattern 1 | 48 | 2 | 17 |
| 12 | Pattern 1 | 48 | 2 | 22 |
| 13 | Pattern 1 | 48 | 3 | 12 |
| 14 | Pattern 1 | 48 | 3 | 16 |
| 15 | Pattern 1 | 96 | 1 | 38 |
| 16 | Pattern 1 | 96 | 2 | 38 |

TABLE 23B

RMSI CORESET configuration at least for bands with min CH BW as 5 MHz or 10 MHz, when {SS SCS, RMSI SCS} = {15 kHz, 15 kHz}

| Configuration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 2 |
| 3 | Pattern 1 | 24 | 2 | 4 |
| 4 | Pattern 1 | 24 | 3 | 0 |
| 5 | Pattern 1 | 24 | 3 | 2 |
| 6 | Pattern 1 | 24 | 3 | 4 |
| 7 | Pattern 1 | 48 | 1 | 7 |
| 8 | Pattern 1 | 48 | 1 | 12 |
| 9 | Pattern 1 | 48 | 1 | 17 |
| 10 | Pattern 1 | 48 | 1 | 22 |
| 11 | Pattern 1 | 48 | 2 | 12 |
| 12 | Pattern 1 | 48 | 2 | 16 |
| 13 | Pattern 1 | 48 | 3 | 12 |
| 14 | Pattern 1 | 48 | 3 | 16 |
| 15 | Pattern 1 | 96 | 1 | 38 |
| 16 | Pattern 1 | 96 | 2 | 38 |

TABLE 23C

RMSI CORESET configuration at least for bands with min CH BW as 5 MHz or 10 MHz, when {SS SCS, RMSI SCS} = {15 kHz, 15 kHz}

| Configuration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 2 |
| 3 | Pattern 1 | 24 | 2 | 4 |
| 4 | Pattern 1 | 24 | 3 | 0 |
| 5 | Pattern 1 | 24 | 3 | 2 |
| 6 | Pattern 1 | 24 | 3 | 4 |
| 7 | Pattern 1 | 48 | 1 | 7 |
| 8 | Pattern 1 | 48 | 1 | 12 |
| 9 | Pattern 1 | 48 | 1 | 17 |
| 10 | Pattern 1 | 48 | 1 | 22 |
| 11 | Pattern 1 | 48 | 2 | 7 |
| 12 | Pattern 1 | 48 | 2 | 12 |
| 13 | Pattern 1 | 48 | 2 | 17 |
| 14 | Pattern 1 | 48 | 2 | 22 |
| 15 | Pattern 1 | 96 | 1 | 38 |
| 16 | Pattern 1 | 96 | 2 | 38 |

TABLE 23D

RMSI CORESET configuration at least for bands with min CH BW as 5 MHz or 10 MHz, when {SS SCS, RMSI SCS} = {15 kHz, 15 kHz}

| Configuration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 2 |
| 3 | Pattern 1 | 24 | 2 | 4 |
| 4 | Pattern 1 | 24 | 3 | 0 |
| 5 | Pattern 1 | 24 | 3 | 2 |
| 6 | Pattern 1 | 24 | 3 | 4 |
| 7 | Pattern 1 | 48 | 2 | 7 |
| 8 | Pattern 1 | 48 | 2 | 12 |
| 9 | Pattern 1 | 48 | 2 | 17 |
| 10 | Pattern 1 | 48 | 2 | 22 |
| 11 | Pattern 1 | 48 | 3 | 7 |
| 12 | Pattern 1 | 48 | 3 | 12 |
| 13 | Pattern 1 | 48 | 3 | 17 |
| 14 | Pattern 1 | 48 | 3 | 22 |
| 15 | Pattern 1 | 96 | 1 | 38 |
| 16 | Pattern 1 | 96 | 2 | 38 |

TABLE 23E

RMSI CORESET configuration at least for bands with min CH BW as 5 MHz or 10 MHz, when {SS SCS, RMSI SCS} = {15 kHz, 15 kHz}.

| Configuration Index | Multiplexing Pattern | CORESET BW in PRB | Number of Symbols for CORESET | Frequency Offset in PRB of RMSI CORESET numerology ΔF2 |
|---|---|---|---|---|
| 1 | Pattern 1 | 24 | 2 | 0 |
| 2 | Pattern 1 | 24 | 2 | 2 |
| 3 | Pattern 1 | 24 | 2 | 4 |
| 4 | Pattern 1 | 24 | 3 | 0 |
| 5 | Pattern 1 | 24 | 3 | 2 |
| 6 | Pattern 1 | 24 | 3 | 4 |
| 7 | Pattern 1 | 48 | 1 | 12 |
| 8 | Pattern 1 | 48 | 1 | 16 |
| 9 | Pattern 1 | 48 | 2 | 12 |
| 10 | Pattern 1 | 48 | 2 | 16 |

TABLE 23E-continued

RMSI CORESET configuration at least for bands with min CH BW as 5 MHz or 10 MHz, when {SS SCS, RMSI SCS} = {15 kHz, 15 kHz}.

| Configuration Index | Multiplexing Pattern | CORESET BW in PRB | Number of Symbols for CORESET | Frequency Offset in PRB of RMSI CORESET numerology $\Delta F2$ |
|---|---|---|---|---|
| 11 | Pattern 1 | 48 | 3 | 7 |
| 12 | Pattern 1 | 48 | 3 | 12 |
| 13 | Pattern 1 | 48 | 3 | 17 |
| 14 | Pattern 1 | 48 | 3 | 22 |
| 15 | Pattern 1 | 96 | 1 | 38 |
| 16 | Pattern 1 | 96 | 2 | 38 |

TABLE 24A is an example of merging TABLE 14A and TABLE 20A, for {SS SCS, RMSI SCS}={30 kHz, 15 kHz} to supports bands with min CH BW as 40 MHz or 20 MHz at the same time, if TABLE 14A is exclusively utilized for bands with 40 MHz min CH BW, and TABLE 20A is exclusively utilized for bands with 20 MHz min CH BW.

TABLE 24A

RMSI CORESET configuration at least for bands with min CH BW as 20 MHz or 40 MHz, when {SS SCS, RMSI SCS} = {30 kHz, 15 kHz}

| Configuration Index | Multiplexing Pattern | CORESET BW in PRB | Number of Symbols for CORESET | Frequency Offset in PRB of RMSI CORESET numerology $\Delta F2$ |
|---|---|---|---|---|
| 1 | Pattern 1 | 48 | 1 | 4 |
| 2 | Pattern 1 | 48 | 2 | 4 |
| 3 | Pattern 1 | 48 | 3 | 4 |
| 4 | Pattern 1 | 96 | 1 | 6 |
| 5 | Pattern 1 | 96 | 1 | 17 |
| 6 | Pattern 1 | 96 | 1 | 28 |
| 7 | Pattern 1 | 96 | 1 | 39 |
| 8 | Pattern 1 | 96 | 1 | 50 |
| 9 | Pattern 1 | 96 | 2 | 6 |
| 10 | Pattern 1 | 96 | 2 | 17 |
| 11 | Pattern 1 | 96 | 2 | 28 |
| 12 | Pattern 1 | 96 | 2 | 39 |
| 13 | Pattern 1 | 96 | 2 | 50 |
| 14 | | Reserved | | |
| 15 | | Reserved | | |
| 16 | | Reserved | | |

TABLE 24B is an example of merging TABLE 14B and TABLE 20B, for {SS SCS, RMSI SCS}={30 kHz, 30 kHz} to supports bands with min CH BW as 40 MHz or 20 MHz at the same time, if TABLE 14B is exclusively utilized for bands with 40 MHz min CH BW, and TABLE 20B is exclusively utilized for bands with 20 MHz min CH BW. For one example, X=1 in TABLE 24A. For another example, X=3 in TABLE 24B.

TABLE 24B

RMSI CORESET configuration at least for bands with min CH BW as 20 MHz when {SS SCS, RMSI SCS} = {30 kHz, 30 kHz}

| Configuration Index | Multiplexing Pattern | CORESET BW in PRB | Number of Symbols for CORESET | Frequency Offset in PRB of RMSI CORESET numerology |
|---|---|---|---|---|
| 1 | Pattern 1 | 24 | 2 | 0 |
| 2 | Pattern 1 | 24 | 2 | 4 |
| 3 | Pattern 1 | 24 | 3 | 0 |
| 4 | Pattern 1 | 24 | 3 | 4 |
| 5 | Pattern 1 | 48 | 2 | 4 |
| 6 | Pattern 1 | 48 | 2 | 8 |
| 7 | Pattern 1 | 48 | 2 | 12 |
| 8 | Pattern 1 | 48 | 2 | 16 |
| 9 | Pattern 1 | 48 | 2 | 20 |
| 10 | Pattern 1 | 48 | 2 | 24 |
| 11 | Pattern 1 | 48 | X | 4 |
| 12 | Pattern 1 | 48 | X | 8 |
| 13 | Pattern 1 | 48 | X | 12 |
| 14 | Pattern 1 | 48 | X | 16 |
| 15 | Pattern 1 | 48 | X | 20 |
| 16 | Pattern 1 | 48 | X | 24 |

Enhancement to Configuration for Measurement Purpose.

In one embodiment, for every combination of CORESET BW and number of CORESET symbols, the configuration of center alignment of SS block and RMSI CORESET_BW can be added for multiplexing pattern 1, if it is not included in that table and reserved configuration is still available for that table. The purpose of adding the center alignment of SS block and RMSI CORESET BW is for better measurement using signals in SS block (e.g. SSS), although this configuration is not essential (e.g. the total number of configurations may exceed the theoretical minimum number of configurations).

In one example, $\Delta F2=14$ can be added to TABLE 7B for "CORESET_BW"=24 PRBs combined with the "Multiplexing Pattern"=Pattern 1 and the "Number of Symbols for CORESET"=1, 2, or 3, using 1 of the reserved configurations.

In one example, $\Delta F2=19$ can be added to TABLE 7B for "CORESET_BW"=48 PRBs combined with the "Multiplexing Pattern"=Pattern 1 and the "Number of Symbols for CORESET"=1, 2, and 3, using 3 of the reserved configurations.

In another example, $\Delta F2=4$ can be added to TABLE 7C for "CORESET BW"=48 PRBs combined with the "Multiplexing Pattern"=Pattern 1 and the "Number of Symbols for CORESET"=1, 2, or 3, using 3 of the reserved configurations.

In yet another example, $\Delta F2=4$ can be added to TABLE 7E for "CORESET BW"=48 PRBs combined with the "Multiplexing Pattern"=Pattern 1 and the "Number of Symbols for CORESET"=1, 2, and 3, using 3 of the reserved configurations.

In yet another example, $\Delta F2=2$ can be added to TABLE 7F for "CORESET BW"=24 PRBs combined with the "Multiplexing Pattern"=Pattern 1 and the "Number of Symbols for CORESET"=2, using 1 of the reserved configurations.

In yet another example, $\Delta F2=8$ can be added to TABLE 7G for "CORESET BW"=96 PRBs combined with the "Multiplexing Pattern"=Pattern 1 and the "Number of Symbols for CORESET"=1, and 2, using 2 of the reserved configurations.

In yet another example, $\Delta F2=4$ can be added to TABLE 7H for "CORESET BW"=48 PRBs combined with the "Multiplexing Pattern"=Pattern 1 and the "Number of Symbols for CORESET"=1, and 2, using 2 of the reserved configurations.

In yet another example, ΔF2=28 can be added to TABLE 14A for "CORESET BW"=96 PRBs combined with the "Multiplexing Pattern"=Pattern 1 and the "Number of Symbols for CORESET"=1, 2, and 3, using 3 of the reserved configurations.

In yet another example, ΔF2=2 can be added to TABLE 14B for "CORESET BW"=24 PRBs combined with the "Multiplexing Pattern"=Pattern 1 and the "Number of Symbols for CORESET"=2, and 3, using 2 of the reserved configurations.

In yet another example, ΔF2=14 can be added to TABLE 14C for "CORESET BW"=48 PRBs combined with the "Multiplexing Pattern"=Pattern 1 and the "Number of Symbols for CORESET"=1, 2, and 3, using 3 of the reserved configurations.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for control information configuration in a wireless communication system, the UE comprising:
    a transceiver configured to receive, from a base station (BS), a master information block (MIB) over a physical broadcasting channel (PBCH); and
    a processor operably connected to the transceiver, the processor configured to determine a frequency offset from the received MIB, wherein:
        the frequency offset is determined based on a lowest RE of a synchronization signal/physical broadcast channel (SS/PBCH) block and a lowest RE of control resource set (CORESET) for remaining minimum system information (RMSI),
        the frequency offset includes a resource block (RB) level frequency offset and a resource element (RE) level frequency offset,
        the RB level frequency offset is jointly configured, for a combination of a subcarrier spacing (SCS) of the SS/PBCH block and a SCS of the CORESET, using a first field of 4 bits, with a multiplexing pattern of the SS/PBCH block and the CORESET, a bandwidth (BW) of the CORESET, and a number of symbols for the CORESET, and
        the RE level frequency offset is configured using a second field of the 4 bits.

2. The UE of claim 1, wherein the multiplexing pattern of the SS/PBCH block and the CORESET comprises at least one of:
    a first multiplexing pattern such that the SS/PBCH block and the CORESET occur in different time instances, a bandwidth of the SS/PBCH block overlapping with a bandwidth of the CORESET;
    a second multiplexing pattern such that the SS/PBCH block and the CORESET occur in different time instances, the bandwidth of the SS/PBCH block not overlapping with the bandwidth of the CORESET; or
    a third multiplexing pattern such that the SS/PBCH block and the CORESET occur in a same time instance, the bandwidth of the SS/PBCH block not overlapping with the bandwidth of the CORESET.

3. The UE of claim 2, wherein, for the first multiplexing pattern:
    for $SCS_{SS}$=15 kHz, $SCS_{CORESET}$=15 kHz, $BW_{CORESET}$=24 RBs, the configuration of the RB level frequency offset is determined as one from 0, 2, or 4 RBs;
    for $SCS_{SS}$=15 kHz, $SCS_{CORESET}$=15 kHz, $BW_{CORESET}$=48 RBs, the configuration of the RB level frequency offset is determined as one from 12 or 16 RBs;
    for $SCS_{SS}$=15 kHz, $SCS_{CORESET}$=15 kHz, $BW_{CORESET}$=96 RBs, the configuration of the RB level frequency offset is determined as 38 RBs;
    for $SCS_{SS}$=15 kHz, $SCS_{CORESET}$=30 kHz, $BW_{CORESET}$=24 RBs, the configuration of the RB level frequency offset is determined as one from 6, 7, or 8 RBs;
    for $SCS_{SS}$=15 kHz, $SCS_{CORESET}$=30 kHz, $BW_{CORESET}$=48 RBs, the configuration of the RB level frequency offset is determined as one from 18 or 20 RBs;
    for $SCS_{SS}$=30 kHz, $SCS_{CORESET}$=15 kHz, $BW_{CORESET}$=48 RBs, the configuration of the RB level frequency offset is determined as one from 2 or 6 RBs;
    for $SCS_{SS}$=30 kHz, $SCS_{CORESET}$=15 kHz, $BW_{CORESET}$=96 RBs, the configuration of the RB level frequency offset is determined as 28 RBs;
    for $SCS_{SS}$=30 kHz, $SCS_{CORESET}$=30 kHz, $BW_{CORESET}$=24 RBs, the configuration of the RB level frequency offset is determined as one from 0, 1, 2, 3, or 4 RBs;
    for $SCS_{SS}$=30 kHz, $SCS_{CORESET}$=30 kHz, $BW_{CORESET}$=48 RBs, the configuration of the RB level frequency offset is determined as one from 12, 14, or 16 RBs;
    for $SCS_{SS}$=120 kHz, $SCS_{CORESET}$=60 kHz, $BW_{CORESET}$=48 RBs, the configuration of the RB level frequency offset is determined as one from 0 or 8 RBs;
    for $SCS_{SS}$=120 kHz, $SCS_{CORESET}$=60 kHz, $BW_{CORESET}$=96 RBs, the configuration of the RB level frequency offset is determined as 28 RBs;
    for $SCS_{SS}$=120 kHz, $SCS_{CORESET}$=120 kHz, $BW_{CORESET}$=24 RBs, the configuration of the RB level frequency offset is determined as one from 0 or 4 RBs, respectively;
    for $SCS_{SS}$=120 kHz, $SCS_{CORESET}$=120 kHz, $BW_{CORESET}$=48 RBs, the configuration of the RB level frequency offset is determined as 14 RBs;
    for $SCS_{SS}$=240 kHz, $SCS_{CORESET}$=60 kHz, $BW_{CORESET}$=96 RBs, the configuration of the RB level frequency offset is determined as one from 0 or 16 RBs; and
    for $SCS_{SS}$=240 kHz, $SCS_{CORESET}$=120 kHz, $BW_{CORESET}$=48 RBs, the configuration of the RB level frequency offset is determined as one from 0 or 8 RBs.

4. The UE of claim 2, wherein, for the second multiplexing pattern:
    for $SCS_{SS}$=120 kHz, $SCS_{CORESET}$=60 kHz, $BW_{CORESET}$=48 RBs, the configuration of the RB level frequency offset is determined as one from −42 or 49 RBs, when the configured RE level frequency offset is determined as not 0, and the configuration of the RB level frequency offset is determined as one from −41 or 49 RBs, when the configured RE level frequency offset is determined as 0;

for $SCS_{SS}$=120 kHz, $SCS_{CORESET}$=60 kHz, $BW_{CORESET}$=96 RBs, the configuration of the RB level frequency offset is determined as one from −42 or 97 RBs, when the configured RE level frequency offset is determined as not 0, and the configuration of the RB level frequency offset is determined as one from −41 or 97 RBs, when the configured RE level frequency offset is determined as 0;

for $SCS_{SS}$=240 kHz, $SCS_{CORESET}$=120 kHz, $BW_{CORESET}$=24 RBs, the configuration of the RB level frequency offset is determined as one from −42 or 25 RBs, when the configured RE level frequency offset is determined as not 0, and the configuration of the RB level frequency offset is determined as one from −41 or 25 RBs, when the configured RE level frequency offset is determined as 0; and for $SCS_{SS}$=240 kHz, $SCS_{CORESET}$=120 kHz, $BW_{CORESET}$=48 RBs, the configuration of the RB level frequency offset is determined as one from −42 or 49 RBs, when the configured RE level frequency offset is determined as not 0, and the configuration of the RB level frequency offset is determined as one from −41 or 49 RBs, when the configured RE level frequency offset is determined as 0; and for the third multiplexing pattern:

for $SCS_{SS}$=120 kHz, $SCS_{CORESET}$=120 kHz, $BW_{CORESET}$=24 RBs, the configuration of the RB level frequency offset is determined as one from −21 or 24 RBs, when the configured RE level frequency offset is determined as not 0, and the configuration of the RB level frequency offset is determined as one from −20 or 24 RBs, when the configured RE level frequency offset is determined as 0; and for $SCS_{SS}$=120 kHz, $SCS_{CORESET}$=120 kHz, $BW_{CORESET}$=48 RBs, the configuration of the RB level frequency offset is determined as one from −21 or 48 RBs, when the configured RE level frequency offset is determined as not 0, and the configuration of the RB level frequency offset is determined as one from −20 or 48 RBs, when the configured RE level frequency offset is determined as 0.

5. A base station (BS) for control information configuration in a wireless communication system, the BS comprising:

a processor configured to:
  determine a frequency offset including a resource block (RB) level frequency offset and a resource element (RE) level frequency offset, wherein the frequency offset is determined based on a lowest RE of a synchronization signal/physical broadcast channel (SS/PBCH) block and a lowest RE of a control resource set (CORESET) for remaining minimum system information (RMSI);
  jointly configure, for a combination of a subcarrier spacing (SCS) of the SS/PBCH block and a SCS of the CORESET, using a first field of 4 bits, the RB level frequency offset with a multiplexing pattern of the SS/PBCH block and the CORESET, a bandwidth (BW) of the CORESET, and a number of symbols for the CORESET,
  configure, using a second field of the 4 bits, the RE level frequency offset, and
  generate a master information block (MIB) including the configured RB level frequency offset and the configured RE level frequency offset; and a transceiver operably connected to the processor, the transceiver configured to transmit, to a user equipment (UE), the MIB over a PBCH.

6. The BS of claim 5, wherein the multiplexing pattern of the SS/PBCH block and the CORESET comprises at least one of:
  a first multiplexing pattern such that the SS/PBCH block and the CORESET occur in different time instances, a bandwidth of the SS/PBCH block overlapping with a bandwidth of the CORESET;
  a second multiplexing pattern such that the SS/PBCH block and the CORESET occur in different time instances, the bandwidth of the SS/PBCH block not overlapping with the bandwidth of the CORESET; or
  a third multiplexing pattern such that the SS/PBCH block and the CORESET occur in a same time instance, the bandwidth of the SS/PBCH block not overlapping with the bandwidth of the CORESET.

7. The BS of claim 6, wherein, for the first multiplexing pattern, the RB level frequency offset is configured from a number of configurations, the number of configurations being determined based on the SCS of the SS/PBCH block, the SCS of the CORESET, the bandwidth of the CORESET, a bandwidth of a carrier on which the SS/PBCH block is transmitted, and a minimum carrier bandwidth of the carrier on which the SS/PBCH block is transmitted, and given by:

$$[(BW_{carrier}^{min} - BW_{SS} * SCS_{SS}/SCS_{CORESET})/(BW_{carrier} - BW_{CORESET} + R_{carrier})]$$

where $BW_{carrier}^{min}$ is the minimum carrier bandwidth of the carrier, $BW_{SS}$ is the bandwidth of the SS/PBCH block, $SCS_{SS}$ is the subcarrier spacing of the SS/PBCH block, $SCS_{CORESET}$ is the subcarrier spacing of the CORESET, $BW_{carrier}$ is the bandwidth of the carrier wherein the SS/PBCH block is transmitted, $BW_{CORESET}$ is the bandwidth of the CORESET, and $R_{carrier}$ is a RB level carrier raster.

8. The BS of claim 7, wherein, for the first multiplexing pattern:
  for $SCS_{SS}$=15 kHz, $SCS_{CORESET}$=15 kHz, $BW_{CORESET}$=24 RBs, the number of configurations of the RB level frequency offset is 3, and configurations of the RB level frequency offset are 0, 2, and 4 RBs, respectively;
  for $SCS_{SS}$=15 kHz, $SCS_{CORESET}$=15 kHz, $BW_{CORESET}$=48 RBs, the number of configurations of the RB level frequency offset is 2, and the configurations of the RB level frequency offset are 12 and 16 RBs, respectively;
  for $SCS_{SS}$=15 kHz, $SCS_{CORESET}$=15 kHz, $BW_{CORESET}$=96 RBs, the number of configurations of the RB level frequency offset is 1, and the configuration of the RB level frequency offset is 38 RBs;
  for $SCS_{SS}$=15 kHz, $SCS_{CORESET}$=30 kHz, $BW_{CORESET}$=24 RBs, the number of configurations of the RB level frequency offset is 3, and the configurations of the RB level frequency offset are 6, 7, and 8 RBs, respectively;
  for $SCS_{SS}$=15 kHz, $SCS_{CORESET}$=30 kHz, $BW_{CORESET}$=48 RBs, the number of configurations of the RB level frequency offset is 2, and the configurations of the RB level frequency offset are 18 and 20 RBs, respectively;

for $SCS_{SS}$=30 kHz, $SCS_{CORESET}$=15 kHz, $BW_{CORESET}$=48 RBs, the number of configurations of the RB level frequency offset is 2, and the configurations of the RB level frequency offset are 2 and 6 RBs, respectively;

for $SCS_{SS}$=30 kHz, $SCS_{CORESET}$=15 kHz, $BW_{CORESET}$=96 RBs, the number of configurations of the RB level frequency offset is 1, and the configuration of the RB level frequency offset is 28 RBs;

for $SCS_{SS}$=30 kHz, $SCS_{CORESET}$=30 kHz, $BW_{CORESET}$=24 RBs, the number of configurations of the RB level frequency offset is 5, and the configurations of the RB level frequency offset are 0, 1, 2, 3, and 4 RBs, respectively;

for $SCS_{SS}$=30 kHz, $SCS_{CORESET}$=30 kHz, $BW_{CORESET}$=48 RBs, the number of configurations of the RB level frequency offset is 3, and the configurations of the RB level frequency offset are 12, 14, and 16 RBs, respectively;

for $SCS_{SS}$=120 kHz, $SCS_{CORESET}$=60 kHz, $BW_{CORESET}$=48 RBs, the number of configurations of the RB level frequency offset is 2, and the configurations of the RB level frequency offset are 0 and 8 RBs, respectively;

for $SCS_{SS}$=120 kHz, $SCS_{CORESET}$=60 kHz, $BW_{CORESET}$=96 RBs, the number of configurations of the RB level frequency offset is 1, and the configuration of the RB level frequency offset is 28 RBs;

for $SCS_{SS}$=120 kHz, $SCS_{CORESET}$=120 kHz, $BW_{CORESET}$=24 RBs, the number of configurations of the RB level frequency offset is 2, and the configurations of the RB level frequency offset are 0 and 4 RBs, respectively;

for $SCS_{SS}$=120 kHz, $SCS_{CORESET}$=120 kHz, $BW_{CORESET}$=48 RBs, the number of configurations of the RB level frequency offset is 1, and the configuration of the RB level frequency offset is 14 RBs;

for $SCS_{SS}$=240 kHz, $SCS_{CORESET}$=60 kHz, $BW_{CORESET}$=96 RBs, the number of configurations of the RB level frequency offset is 2, and the configurations of the RB level frequency offset are 0 and 16 RBs, respectively; and for $SCS_{SS}$=240 kHz, $SCS_{CORESET}$=120 kHz, $BW_{CORESET}$=48 RBs, the number of configurations of the RB level frequency offset is 2, and the configurations of the RB level frequency offset are 0 and 8 RBs, respectively.

9. The BS of claim 6, wherein, for the second multiplexing pattern, and for a combination of SCS of the SS/PBCH block, the SCS of the CORESET, and the bandwidth of the CORESET, the RB level frequency offset is configured from a number of configurations, the number of configurations being 2, wherein a first configuration of the RB level frequency offset is determined as $-BW_{SS}*SCS_{SS}/SCS_{CORESET}-2$ when the configured RE level frequency offset is not 0, and is determined as $-BW_{SS}*SCS_{SS}/SCS_{CORESET}-1$ when the configured RE level frequency offset is 0, and a second configuration of the RB level frequency offset is determined as $BW_{CORESET}+1$.

10. The BS of claim 9, wherein, for the second multiplexing pattern:

for $SCS_{SS}$=120 kHz, $SCS_{CORESET}$=60 kHz, $BW_{CORESET}$=48 RBs, the first and second configurations of the RB level frequency offset are −42 and 49 RBs, respectively, when the configured RE level frequency offset is not 0, and the first and second configurations of the RB level frequency offset are −41 and 49 RBs, respectively, when the configured RE level frequency offset is 0;

for $SCS_{SS}$=120 kHz, $SCS_{CORESET}$=60 kHz, $BW_{CORESET}$=96 RBs, the first and second configurations of the RB level frequency offset are −42 and 97 RBs, respectively, when the configured RE level frequency offset is not 0, and the first and second configurations of the RB level frequency offset are −41 and 97 RBs, respectively, when the configured RE level frequency offset is 0;

for $SCS_{SS}$=240 kHz, $SCS_{CORESET}$=120 kHz, $BW_{CORESET}$=24 RBs, the first and second configurations of the RB level frequency offset are −42 and 25 RBs, respectively, when the configured RE level frequency offset is not 0, and the first and second configurations of the RB level frequency offset are −41 and 25 RBs, respectively, when the configured RE level frequency offset is 0; and for $SCS_{SS}$=240 kHz, $SCS_{CORESET}$=120 kHz, $BW_{CORESET}$=48 RBs, the first and second configurations of the RB level frequency offset are −42 and 49 RBs, respectively, when the configured RE level frequency offset is not 0, and the first and second configurations of the RB level frequency offset are −41 and 49 RBs, respectively, when the configured RE level frequency offset is 0.

11. The BS of claim 6, wherein:

for the third multiplexing pattern, and for a combination of SCS of the SS/PBCH block, the SCS of the CORESET, and the bandwidth of the CORESET, the RB level frequency offset is configured from a number of configurations, the number of configurations being 2, wherein a first configuration of the RB level frequency offset is determined as $-BW_{SS}-1$ when the configured RE level frequency offset is not 0, and is determined as $-BW_{SS}$ when the configured RE level frequency offset is 0; and a second configuration of the RB level frequency offset is determined as $BW_{CORESET}$.

12. The BS of claim 11, wherein, for the third multiplexing pattern:

for $SCS_{SS}$=120 kHz, $SCS_{CORESET}$=120 kHz, $BW_{CORESET}$=24 RBs, the first and second configurations of the RB level frequency offset are −21 and 24 RBs when the configured RE level frequency offset is not 0, and the first and second configurations of the RB level frequency offset are −20 and 24 RBs, respectively, when the configured RE level frequency offset is 0; and for $SCS_{SS}$=120 kHz, $SCS_{CORESET}$=120 kHz, $BW_{CORESET}$=48 RBs, the first and second configurations of the RB level frequency offset are −21 and 48 RBs when the configured RE level frequency offset is not 0, and the first and second configurations of the RB level frequency offset are −20 and 48 RBs, respectively, when the configured RE level frequency offset is 0.

13. A method of a base station (BS) for control information configuration in a wireless communication system, the method comprising:

determining a frequency offset including a resource block (RB) level frequency offset and a resource element (RE) level frequency offset, wherein the frequency offset is determined based on a lowest RE of a synchronization signal/physical broadcast channel (SS/PBCH) block and a lowest RE of control resource set (CORESET) for remaining minimum system information (RMSI);

jointly configuring, for a combination of a subcarrier spacing (SCS) of the SS/PBCH block and a SCS of the CORESET, using a first field of 4 bits, the RB level frequency offset with a multiplexing pattern of the SS/PBCH block and the CORESET, a bandwidth (BW) of the CORESET, and a number of symbols for the CORESET;

configuring, using a second field of the 4 bits, the RE level frequency offset;

generating a master information block (MIB) including the RB level frequency offset and the RE level frequency offset; and transmitting, to a user equipment (UE), the MIB over a PBCH.

14. The method of claim 13, wherein the multiplexing pattern of the SS/PBCH block and the CORESET comprises at least one of:
   a first multiplexing pattern such that the SS/PBCH block and the CORESET occur in different time instances, a bandwidth of the SS/PBCH block overlapping with a bandwidth of the CORESET;
   a second multiplexing pattern such that the SS/PBCH block and the CORESET occur in different time instances, the bandwidth of the SS/PBCH block not overlapping with the bandwidth of the CORESET; or
   a third multiplexing pattern such that the SS/PBCH block and the CORESET occur in a same time instance, the bandwidth of the SS/PBCH block not overlapping with the bandwidth of the CORESET.

15. The method of claim 14, wherein, for the first multiplexing pattern, a number of configurations of RB level frequency offsets is determined based on the SCS of the SS/PBCH block, the SCS of the CORESET, the bandwidth of the CORESET, a bandwidth of a carrier on which the SS/PBCH block is transmitted, and a minimum carrier bandwidth of the carrier on which the SS/PBCH block is transmitted, and given by:

$$[(BW_{carrier}^{min} - BW_{SS} * SCS_{SS}/SCS_{CORESET})/(BW_{carrier} - BW_{CORESET} + R_{carrier})]$$

where $BW_{carrier}^{min}$ is the minimum carrier bandwidth of the carrier, $BW_{SS}$ is the bandwidth of the SS/PBCH block, $SCS_{SS}$ is the subcarrier spacing of the SS/PBCH block, $SCS_{CORESET}$ is the subcarrier spacing of the CORESET, $BW_{carrier}$ is the bandwidth of the carrier wherein the SS/PBCH block is transmitted, $BW_{CORESET}$ is the bandwidth of the CORESET, and $R_{carrier}$ is a RB level carrier raster.

16. The method of claim 15, wherein, for the first multiplexing pattern:
   for $SCS_{SS}$=15 kHz, $SCS_{CORESET}$=15 kHz, $BW_{CORESET}$=24 RBs, the number of configurations of the RB level frequency offset is 3, and configurations of the RB level frequency offset are 0, 2, and 4 RBs, respectively;
   for $SCS_{SS}$=15 kHz, $SCS_{CORESET}$=15 kHz, $BW_{CORESET}$=48 RBs, the number of configurations of the RB level frequency offset is 2, and the configurations of the RB level frequency offset are 12 and 16 RBs, respectively;
   for $SCS_{SS}$=15 kHz, $SCS_{CORESET}$=15 kHz, $BW_{CORESET}$=96 RBs, the number of configurations of the RB level frequency offset is 1, and the configuration of the RB level frequency offset is 38 RBs;
   for $SCS_{SS}$=15 kHz, $SCS_{CORESET}$=30 kHz, $BW_{CORESET}$=24 RBs, the number of configurations of the RB level frequency offset is 3, and the configurations of the RB level frequency offset are 6, 7, and 8 RBs, respectively;
   for $SCS_{SS}$=15 kHz, $SCS_{CORESET}$=30 kHz, $BW_{CORESET}$=48 RBs, the number of configurations of the RB level frequency offset is 2, and the configurations of the RB level frequency offset are 18 and 20 RBs, respectively;
   for $SCS_{SS}$=30 kHz, $SCS_{CORESET}$=15 kHz, $BW_{CORESET}$=48 RBs, the number of configurations of the RB level frequency offset is 2, and the configurations of the RB level frequency offset are 2 and 6 RBs, respectively;
   for $SCS_{SS}$=30 kHz, $SCS_{CORESET}$=15 kHz, $BW_{CORESET}$=96 RBs, the number of configurations of the RB level frequency offset is 1, and the configuration of the RB level frequency offset is 28 RBs;
   for $SCS_{SS}$=30 kHz, $SCS_{CORESET}$=30 kHz, $BW_{CORESET}$=24 RBs, the number of configurations of the RB level frequency offset is 5, and the configurations of the RB level frequency offset are 0, 1, 2, 3, and 4 RBs, respectively;
   for $SCS_{SS}$=30 kHz, $SCS_{CORESET}$=30 kHz, $BW_{CORESET}$=48 RBs, the number of configurations of the RB level frequency offset is 3, and the configurations of the RB level frequency offset are 12, 14, and 16 RBs, respectively;
   for $SCS_{SS}$=120 kHz, $SCS_{CORESET}$=60 kHz, $BW_{CORESET}$=48 RBs, the number of configurations of the RB level frequency offset is 2, and the configurations of the RB level frequency offset are 0 and 8 RBs, respectively;
   for $SCS_{SS}$=120 kHz, $SCS_{CORESET}$=60 kHz, j $BW_{CORESET}$=96 RBs, the number of configurations of the RB level frequency offset is 1, and the configuration of the RB level frequency offset is 28 RBs;
   for $SCS_{SS}$=120 kHz, $SCS_{CORESET}$=120 kHz, $BW_{CORESET}$=24 RBs, the number of configurations of the RB level frequency offset is 2, and the configurations of the RB level frequency offset are 0 and 4 RBs, respectively;
   for $SCS_{SS}$=120 kHz, $SCS_{CORESET}$=120 kHz, $BW_{CORESET}$=48 RBs, the number of configurations of the RB level frequency offset is 1, and the configuration of the RB level frequency offset is 14 RBs;
   for $SCS_{SS}$=240 kHz, $SCS_{CORESET}$=60 kHz, $BW_{CORESET}$=96 RBs, the number of configurations of the RB level frequency offset is 2, and the configurations of the RB level frequency offset are 0 and 16 RBs, respectively; and
   for $SCS_{SS}$=240 kHz, $SCS_{CORESET}$=120 kHz, $BW_{CORESET}$=48 RBs, the number of configurations of the RB level frequency offset is 2, and the configurations of the RB level frequency offset are 0 and 8 RBs, respectively.

17. The method of claim 14, wherein:
for the second multiplexing pattern, a number of configurations of RB level frequency offsets is 2; and
a first configuration of the RB level frequency offset is determined as $-BW_{SS}*SCS_{SS}/SCS_{CORESET}-2$ when the configured RE level frequency offset is not 0, and is determined as $-BW_{SS}*SCS_{SS}/SCS_{CORESET}-1$ when the configured RE level frequency offset is 0; and a second configuration of the RB level frequency offset is determined as $BW_{CORESET}+1$.

18. The method of claim 17, wherein, for the second multiplexing pattern:

for $SCS_{SS}$=120 kHz, $SCS_{CORESET}$=60 kHz, $BW_{CORESET}$=48 RBs, the first and second configurations of the RB level frequency offset are −42 and 49 RBs, respectively, when the configured RE level frequency offset is not 0, and the first and second configurations of the RB level frequency offset are −41 and 49 RBs, respectively, when the configured RE level frequency offset is 0;

for $SCS_{SS}$=120 kHz, $SCS_{CORESET}$=60 kHz, $BW_{CORESET}$=96 RBs, the first and second configurations of the RB level frequency offset are −42 and 97 RBs, respectively, when the configured RE level frequency offset is not 0, and the first and second configurations of the RB level frequency offset are −41 and 97 RBs, respectively, when the configured RE level frequency offset is 0;

for $SCS_{SS}$=240 kHz, $SCS_{CORESET}$=120 kHz, $BW_{CORESET}$=24 RBs, the first and second configurations of the RB level frequency offset are −42 and 25 RBs, respectively, when the configured RE level frequency offset is not 0, and the first and second configurations of the RB level frequency offset are −41 and 25 RBs, respectively, when the configured RE level frequency offset is 0; and for $SCS_{SS}$=240 kHz, $SCS_{CORESET}$=120 kHz, $BW_{CORESET}$=48 RBs, the first and second configurations of the RB level frequency offset are −42 and 49 RBs, respectively, when the configured RE level frequency offset is not 0, and the first and second configurations of the RB level frequency offset are −41 and 49 RBs, respectively, when the configured RE level frequency offset is 0.

19. The method of claim 14, wherein, for the third multiplexing pattern, a number of configurations of RB level frequency offsets is 2, wherein a first configuration of the RB level frequency offset is determined as $-BW_{SS}-1$ when the configured RE level frequency offset is not 0, and is determined as $-BW_{SS}$ when the configured RE level frequency offset is 0, and wherein a second configuration of the RB level frequency offset is determined as $BW_{CORESET}$.

20. The method of claim 19, wherein, for the third multiplexing pattern:

for $SCS_{SS}$=120 kHz, $SCS_{CORESET}$=120 kHz, $BW_{CORESET}$=24 RBs, the first and second configurations of the RB level frequency offset are −21 and 24 RBs when the configured RE level frequency offset is not 0, and the first and second configurations of the RB level frequency offset are −20 and 24 RBs, respectively, when the configured RE level frequency offset is 0; and for $SCS_{SS}$=120 kHz, $SCS_{CORESET}$=120 kHz, $BW_{CORESET}$=48 RBs, the first and second configurations of the RB level frequency offset are −21 and 48 RBs when the configured RE level frequency offset is not 0, and the first and second configurations of the RB level frequency offset are −20 and 48 RBs, respectively, when the configured RE level frequency offset is 0.

\* \* \* \* \*